(12) United States Patent
Orosz et al.

(10) Patent No.: US 8,132,409 B2
(45) Date of Patent: Mar. 13, 2012

(54) SOLAR COLLECTION AND CONVERSION SYSTEM AND METHODS AND APPARATUS FOR CONTROL THEREOF

(75) Inventors: Matt Orosz, Cambridge, MA (US); Amy Mueller, Mequon, WI (US); Elizabeth Wayman, Grosse Pointe, MI (US); Headley Jacobus, College Park, MD (US); Bryan Urban, Cambridge, MA (US)

(73) Assignee: Solar Turbine Group, International, Bridgewater, MA (US)

( * ) Notice: Subject to any disclaimer, the term of this patent is extended or adjusted under 35 U.S.C. 154(b) by 580 days.

(21) Appl. No.: 12/116,389

(22) Filed: May 7, 2008

(65) Prior Publication Data

US 2008/0289334 A1 Nov. 27, 2008

Related U.S. Application Data

(60) Provisional application No. 60/928,234, filed on May 8, 2007.

(51) Int. Cl.
*F03G 6/00* (2006.01)
*B60K 16/00* (2006.01)

(52) U.S. Cl. .................. 60/641.15; 60/641.8; 60/641.11

(58) Field of Classification Search ................. 60/641.2, 60/641.8–641.15
See application file for complete search history.

(56) References Cited

U.S. PATENT DOCUMENTS

| | | | |
|---|---|---|---|
| 5,685,151 A | 11/1997 | Ross | |
| 5,685,152 A | 11/1997 | Sterling | |
| 5,974,804 A | 11/1999 | Sterling | |
| 6,301,893 B1 * | 10/2001 | Luo | 60/641.1 |
| 6,598,397 B2 | 7/2003 | Hanna et al. | |
| 6,668,555 B1 | 12/2003 | Moriarty | |
| 6,694,738 B2 * | 2/2004 | Bronicki et al. | 60/641.8 |
| 6,804,962 B1 * | 10/2004 | Prueitt | 60/641.8 |
| 6,973,789 B2 | 12/2005 | Sugarmen et al. | |
| 6,979,911 B2 | 12/2005 | Otting et al. | |
| 6,996,988 B1 * | 2/2006 | Bussard | 60/641.8 |
| 7,017,357 B2 | 3/2006 | Brasz | |
| 7,026,722 B1 | 4/2006 | Otting et al. | |
| 7,084,518 B2 | 8/2006 | Otting et al. | |
| 7,124,585 B2 | 10/2006 | Kim et al. | |
| 7,146,813 B2 | 12/2006 | Brasz et al. | |
| 7,171,812 B2 * | 2/2007 | Schubert | 60/641.15 |
| 7,240,478 B2 * | 7/2007 | Kopko | 60/39.17 |
| 7,287,380 B1 * | 10/2007 | Teng | 60/641.8 |
| 7,331,178 B2 * | 2/2008 | Goldman | 60/641.11 |

(Continued)

OTHER PUBLICATIONS

Design and Implementation of a Novel Architecture for an Integrated Solar Thermal-Biogas Co-Generation System, P3 Application submitted to Environmental Protection Agency on Feb. 21, 2006.

(Continued)

*Primary Examiner* — Hoang Nguyen
(74) *Attorney, Agent, or Firm* — Goodwin Procter LLP

(57) ABSTRACT

Systems and methods for collecting solar energy and converting it to heat, mechanical work, or electricity on a small scale and utilizing one or more system components originally adapted for use in a non-solar-power-generation application are described. Solar energy is used to heat a fluid that is part of a solar energy collector. This fluid transfers heat to the working fluid of thermodynamic engine, which converts some of the heat into mechanical work or electricity. One or more system parameters are monitored and controlled to enable improved efficiency under variable environmental conditions.

17 Claims, 44 Drawing Sheets

U.S. PATENT DOCUMENTS

| | | | |
|---|---|---|---|
| 7,735,324 | B2 | 6/2010 | Brasz et al. |
| 2003/0213245 | A1 | 11/2003 | Yates et al. |
| 2003/0213246 | A1 | 11/2003 | Coll et al. |
| 2004/0020206 | A1* | 2/2004 | Sullivan et al. ............. 60/670 |
| 2005/0171736 | A1 | 8/2005 | Kang |
| 2008/0163625 | A1 | 7/2008 | O'Brien |
| 2010/0077752 | A1* | 4/2010 | Papile ....................... 60/641.8 |

OTHER PUBLICATIONS

DM 2006 Full Proposal, Development Marketplace 2006: Innovations in Water, Sanitation, and Energy Services for Poor People, submitted to World Bank on Mar. 14, 2006.

DM 2006 Initial Proposal, 2006 Development Marketplace Global Competition—Innovations in Water, Sanitation and Energy Services for Poor People, submitted to World Bank on Nov. 30, 2005.

DM 2006 Project Completion Report dated Nov. 29, 2007.

DM 2006 Project Implementation Progress Report dated Aug. 2, 2007.

DM 2006 Project Implementation Progress Report dated Sep. 29, 2006.

DM 2006 Project Implementation Report dated Jan. 31, 2007.

DM 2006, DM Team 02286: One Page Project Summary (undated).

DM 2006, Solar-Thermal Power for Rural Villages, World Bank Development Marketplace website last accessed Apr. 3, 2007.

Ideastream Application, Innovation Showcase 2006 Deshpande Center Ideastream Symposium submitted on Feb. 28, 2006.

Popular Mechanics—MIT Team Turns Auto Parts Into Green Power for Remote Regions, http://www.popularmechanics.com/science/earth/4232571.html published on Nov. 21, 2007.

Promethean Power, Executive Summary, dated Nov. 2006.

Solar Turbine Africa—Supply Run Success and Sufferings, http://libbywayman.blogspot.com dated Nov. 21, 2006.

Solar Turbine Group, Inc., Executive Summary, submitted to MIT $1K Competition on Dec. 6, 2006.

Standard Operating Procedure, STG Solar Collector Array Construction Manual Version 1.0 (last updated Feb. 5, 2007).

STG Lesotho—Solar Microgenerator Training Manual, Version 1.0, dated Feb. 7, 2007.

* cited by examiner

SOLAR COLLECTION AND CONVERSION SYSTEM AND METHODS AND APPARATUS FOR CONTROL THEREOF

RELATED APPLICATIONS

This application incorporates by reference in its entirety and claims priority to U.S. Provisional Patent Application Ser. No. 60/928,234, entitled "Low-Cost Solar Energy Collection and Conversion System," filed on May 8, 2007.

TECHNICAL FIELD

The present invention relates generally to solar energy collectors and thermodynamic heat engines and, more specifically, to small-scale solar energy collection and conversion systems.

BACKGROUND

Organic Rankine cycles are typically used in megawatt-scale power plants, where power production and equipment are monitored at all times by human staff. At such plants, a specified turbine inlet pressure is necessary to maintain efficient operation. Constant heat input and output temperatures help maintain efficiency at the rated output. To compensate for periods of reduced or no solar insolation, one or more auxiliary heat source(s) may be utilized to maintain a constant heat input. Efficient heat rejection, and therefore, efficient operation of such plants, usually requires a near-constant low-temperature reservoir, for example a large body of water that has a temperature that does not vary significantly throughout the year.

These conditions, which help ensure efficient operation of all the components of the thermodynamic engine, generally can not be met in small power plant installations desired by and beneficial to remote communities lacking a traditional energy grid. First, employing a full-time staff member is rarely economically feasible, relative to the cost of the technology; therefore, an autonomous installation is desirable. Second, a collection and conversion cycle that can function efficiently with a variable hot side temperature would be desirable, as it would mitigate the variability attendant with using the sun as an energy source, while diminishing or eliminating the need for a supplemental heat source or an independent heat storage system. Third, rural and distributed installations are not necessarily located near an expendable cold water source; this is particularly true in areas with high solar insolation, which are likely to be arid. In such cases, it would be beneficial to have a system that can reject waste heat to the surrounding air. As the ambient air temperature fluctuates during the day and year, the ideal system would adjust its operation to maintain efficient power conversion. Last, the material cost of a solar collection and conversion system can often be prohibitive in economically disadvantaged communities; thus, a solar collection system that is made from inexpensive, readily available parts would also be desirable.

Accordingly, there is a need to provide systems and methods for collecting and converting solar energy into other forms of energy, in particular mechanical and electrical energy. Additionally, these systems should function on a small scale, and in a technically and economically feasible way.

SUMMARY OF THE INVENTION

In one aspect, the present invention relates to a solar energy collection and conversion system including a solar energy collector, a vaporizer, an expander, a condenser, and a compressor, each in fluidic communication with the immediately preceding component, and further a conduit for fluid transportation, and a controller. The solar energy collector transfers solar energy to a first fluid, thereby elevating the temperature of said first fluid; the vaporizer transfers thermal energy from the first fluid to a second fluid, thereby elevating the temperature of the second fluid, the expander converts the thermal energy of the second fluid into mechanical energy, the condenser reduces the temperature of the second fluid; and the compressor pumps the second fluid at least partially through the vaporizer. The conduit is configured to transport the first or the second fluid, or both, between two or more of the following components: the solar energy collector, the vaporizer, the expander, the condenser, and the compressor. The controller controls one or more parameters associated with at least one of the collector, the vaporizer, the expander, the condenser, and the compressor. At least one of the vaporizer, the expander, the condenser, the compressor, the conduit, and the controller contains a component adapted for use in a non-solar power generation system application. In some embodiments, the first and/or the second fluid also includes a fluid adapted for use in a non-solar power generation system application. In various embodiments, the system further includes a heat exchanger for transferring thermal energy from the second fluid to a third fluid, thereby elevating the temperature of the third fluid, which may be a portable fluid or contain a fluid used in a thermal absorption-chiller cycle. In some embodiments, the second fluid has a first state at a location proximate the compressor and a second state at a location proximate the expander; and the system may further contain a recuperator which transfers thermal energy to a first state from a second state of the second fluid. The system can also contain, downstream of the expander, a second expander. In some embodiments, the system further includes a second collector, which can be a biogas energy collector, a waste heat recovery steam generator, and/or a geothermal energy collector.

In another aspect, the invention relates to a low-cost method for converting solar energy by collecting it, using it to heat a first fluid, transferring thermal energy from the first fluid to a second fluid, converting thermal energy of the second fluid into mechanical energy, and extracting thermal energy from the second fluid, and therein pumping the second fluid through a fluidic circuit, controlling a parameter associated with at least one of the collection and conversion steps, and utilizing a component adapted for use in a non-solar power generation system application. The fluidic circuit can be open or closed. Some embodiments further include converting mechanical energy into electrical energy; and this additional step can (but does not have to) utilize a component adapted for use in a non-solar power generation system application. Moreover, the electrical energy can be stored. In various embodiments, thermal energy can be extracted from the second fluid at least in part by transferring thermal energy from the second to a third fluid, which may be a portable fluid, or contain a non-portable fluid or a fluid used in a thermal absorption-chiller cycle. In some embodiments, thermal energy can also be supplied by a non-solar source, such as waste heat from another process or energy from fuel combustion, to allow operation during unfavorable environmental conditions.

In another aspect, the invention relates to a method of manufacturing a low-cost energy conversion system by procuring at least one of a thermal fluid, a working fluid, a vaporizer, an expander, a condenser, and a compressor adapted for use in a non-solar power generation system application for use in the conversion system; and installing the at least one of a thermal fluid, a working fluid, a vaporizer, an expander, a condenser, and a compressor as a component in the low-cost energy conversion system.

In another aspect, the invention relates to a control system for maintaining a performance efficiency and non-error condition of an energy collection and generation system. This control system includes a control circuit, an input device interface for receiving information regarding a phase change boundary of the energy collection system, and an output device interface for sending a control signal from the control circuitry to at least one component of the energy collection and generation system, wherein the control signal is based at least in part on the phase change boundary. The phase change boundary can, for instance, be a proportion of a gas to a liquid at a predetermined location in the energy collection and generation system; and the location may be a vaporizer of the energy collection and generation system. In some embodiments, the phase change boundary is based on at least one of a substantially non-constant high temperature condition and a substantially non-constant low temperature condition. The substantially non-constant high temperature condition may contain a range of high temperatures, and the substantially non-constant low temperature condition may contain a range of low temperatures. In various embodiments, the control signal maintains the phase change boundary within the vaporizer of the condenser to maintain the performance efficiency of the energy collection and generation system across the range of high temperature and the range of low temperatures. In some embodiments, the input device interface is adapted to receive information from one or more sensors associated with the energy collection system, which may contain a first sensor adapted for measuring a temperature of a working fluid, and may further contain a second sensor adapted for measuring an ambient temperature. In particular embodiments, the control system further contains a calculation module for calculating optimal temperature and pressure parameters for the working fluid, or optimal temperature of the thermal fluid, based at least in part on the temperature of the working fluid and the ambient temperature.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
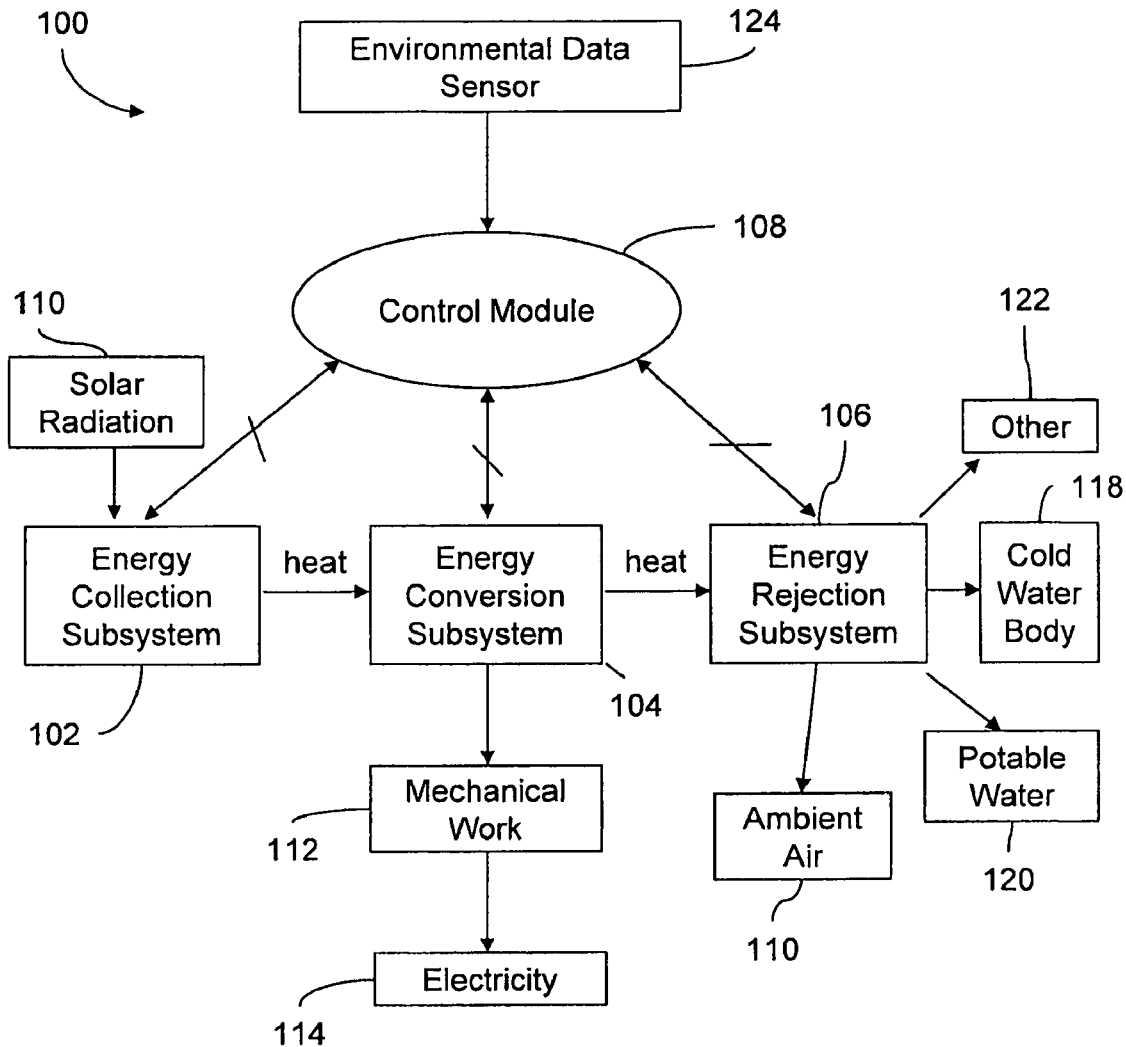
FIG. 1 is a schematic diagram of an energy collection and conversion system in accordance with one embodiment of the invention.

FIG. 1 is a schematic diagram of an energy collection and conversion system 100 in accordance with an embodiment of the invention. The system comprises an energy collection subsystem ("collector") 102, an energy conversion subsystem ("converter") 104, an energy rejection subsystem ("rejector") 106, and a control module ("controller") 108. The energy collector 102 captures solar radiation 110 and converts it to heat, which is transferred to the energy converter 104 via a first, thermal fluid. The energy converter 104 circulates a second fluid, the working fluid, and converts the heat into mechanical work 112, and optionally the mechanical work 112 further into electricity 114. Remaining heat is rejected by the energy rejector 106, in one embodiment, by transferring heat to the surrounding ambient air 116. Alternatively or additionally, the heat may be transferred to a cold water body 118. The energy rejector 106 may also recover part of the heat for use by heating a third, portable fluid 120 such as water. Other uses 122 for the rejected heat are also contemplated and are described below. The controller 108 is in communication with one or more components of one or more of the subsystems 102, 104, 106. Additional sensors 124 associated with the controller collect environmental data, such as ambient temperature. The structure and function of the individual subsystems are described in more detail below.

Figure 2A:
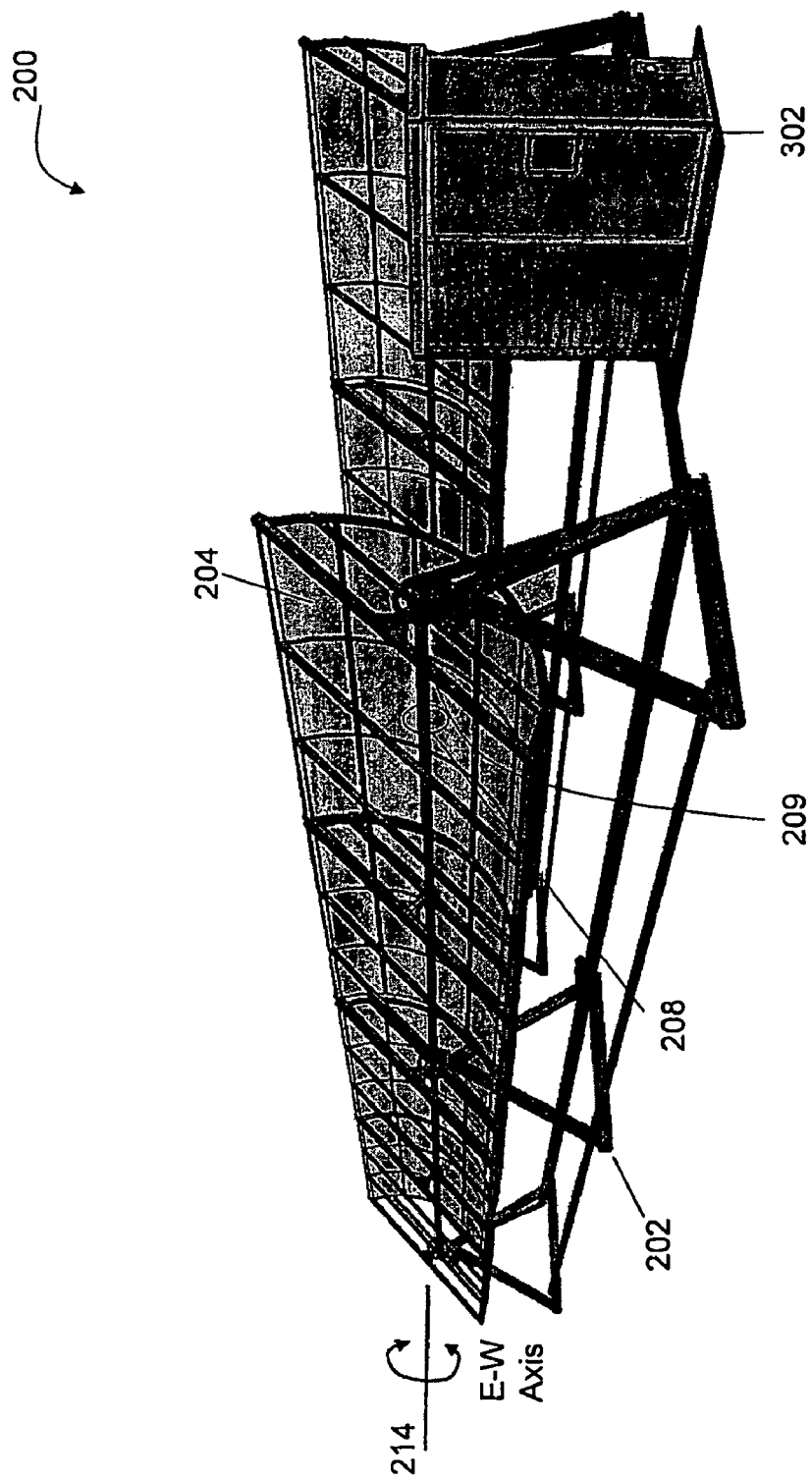
FIG. 2A is a schematic perspective view of a solar energy collector in accordance with one embodiment of the invention.
Figure 2B:
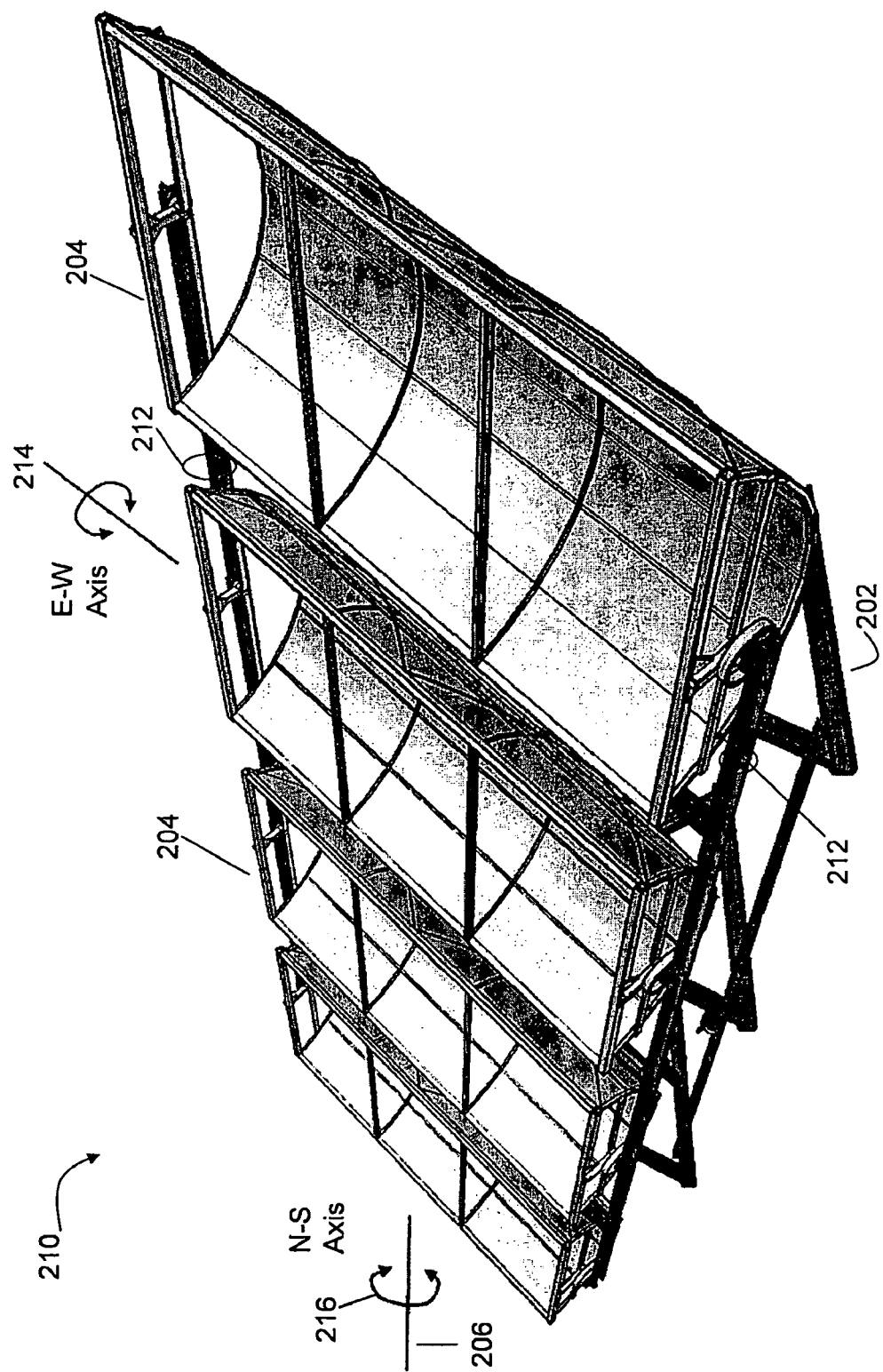
FIG. 2B is a schematic perspective view of a solar energy collector in accordance with another embodiment of the invention.

FIGS. 2A and 2B are schematic perspective views of solar energy collectors that form a major component of the collector subsystem in accordance with an embodiment of the invention. In general, the collector subsystem 102 includes a solar energy collector containing a plurality of modular parabolic trough reflectors mounted in modular support structures aligned substantially to the cardinal directions, a tracking system, and manifold of thermal fluid for receiving and transmitting thermal energy. In locations where the magnetic cardinal direction differs from the true cardinal direction, the system may be aligned to true north with reference to magnetic north by a correction factor. Orientation may vary slightly from this optimal point due to site characteristics and/or the need for minor seasonal adjustments. The collector subsystem 102 takes in energy in form of solar radiation, optionally supplemented by other energy sources such as biogas or heat recovered from diesel generator set exhaust streams, a geothermal heat source, or a waste heat recovery steam generator. In alternative embodiments, these other energy collectors may be used in addition to, or in lieu of, the solar energy collector. The collector improves the energy grade (i.e., temperature) by concentrating energy onto the manifold that contains a thermal fluid which is thereby elevated in temperature. This higher grade heat is then transferred to the working fluid of the energy converter 104 via a heat exchanger, as described in more detail below.

Figure 3A:
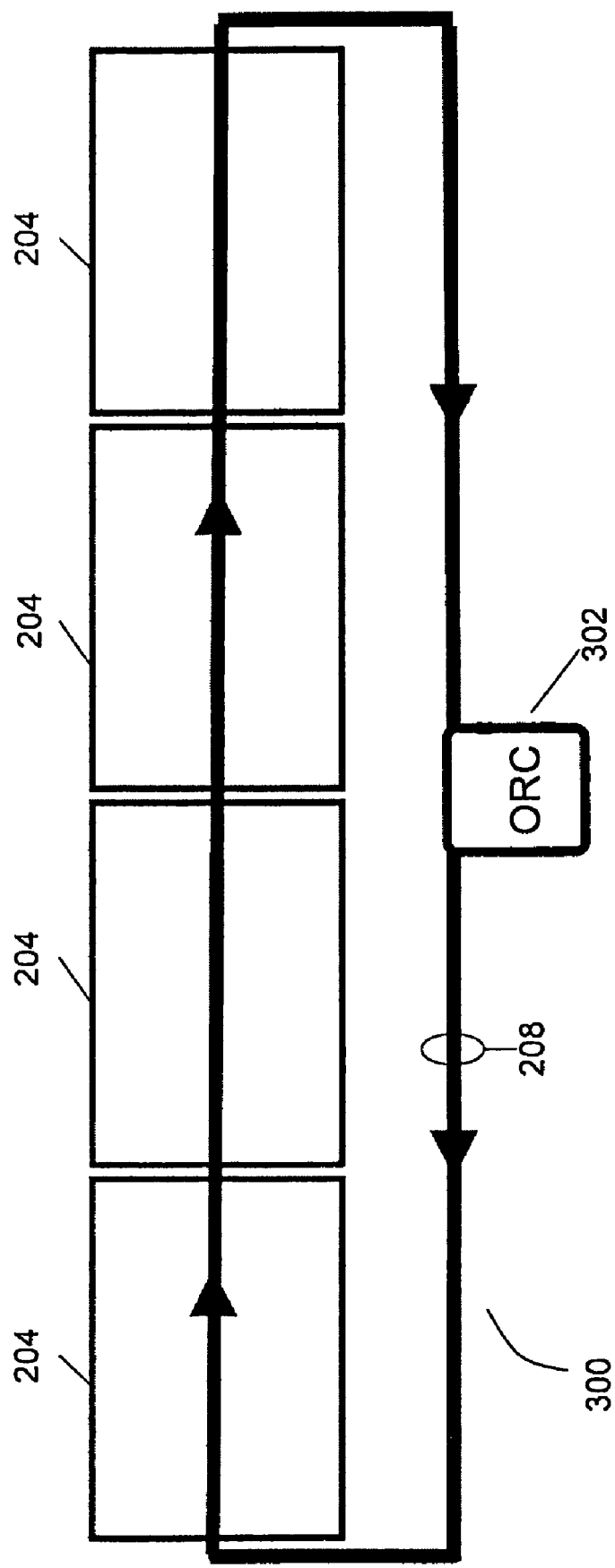
FIGS. 3A and 3B are schematic diagrams of thermal fluid flow paths for solar collectors in single-axis tracking configuration.
Figure 3B:
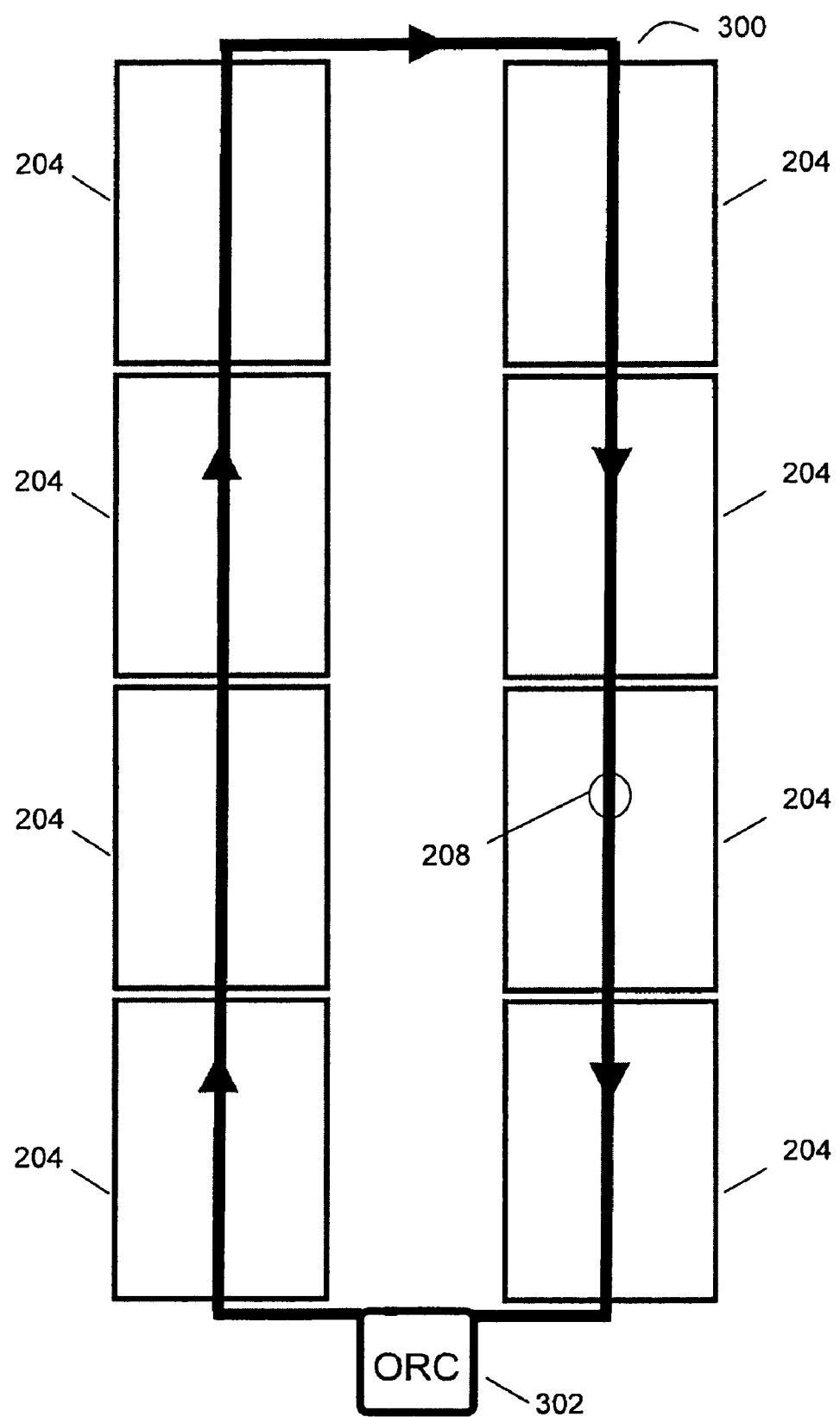

Specifically, FIG. 2A is a schematic perspective view of a solar energy collector in a single-axis tracking configuration. In single-axis configuration, a base frame module 202 is spaced to accommodate end-to-end orientation of one or more trough modules 204 with a shared axis of rotation and focal line. The trough modules 204 are mounted within the outer frame via bearing sleeves 209 near to their center of mass and focal point, which are, in certain embodiments, co-located. A static receiver tube 208 is located at the focal point of the parabolic reflectors that form the reflective surface of each trough module 204. Since the tube 208 remains static while the troughs 204 rotate, flexible joints and headers are not required. In certain embodiments of the single axis configuration, however, flexible joints and headers may be utilized to offset vibration and strain caused by wind load. As described above, the collector 200 is generally installed substantially along a north-south orientation so that the trough modules 204 may rotate from east to west 214. At low solar azimuth elevations, the single-axis configuration may have low collection efficiencies per unit aperture area, but at reduced specific cost and complexity. The piping manifold in single axis systems may be configured to add modules together in series or parallel as dictated by the specified size of the solar field, its geometry, and the optimal position of the ORC power block. Two exemplary manifold configurations are depicted in FIGS. 3A and 3B. In these basic installations, system loop 300 includes a receiver tube 208, routed through a plurality of modules 204, with the ORC power block 302 in series.

Figure 3C:
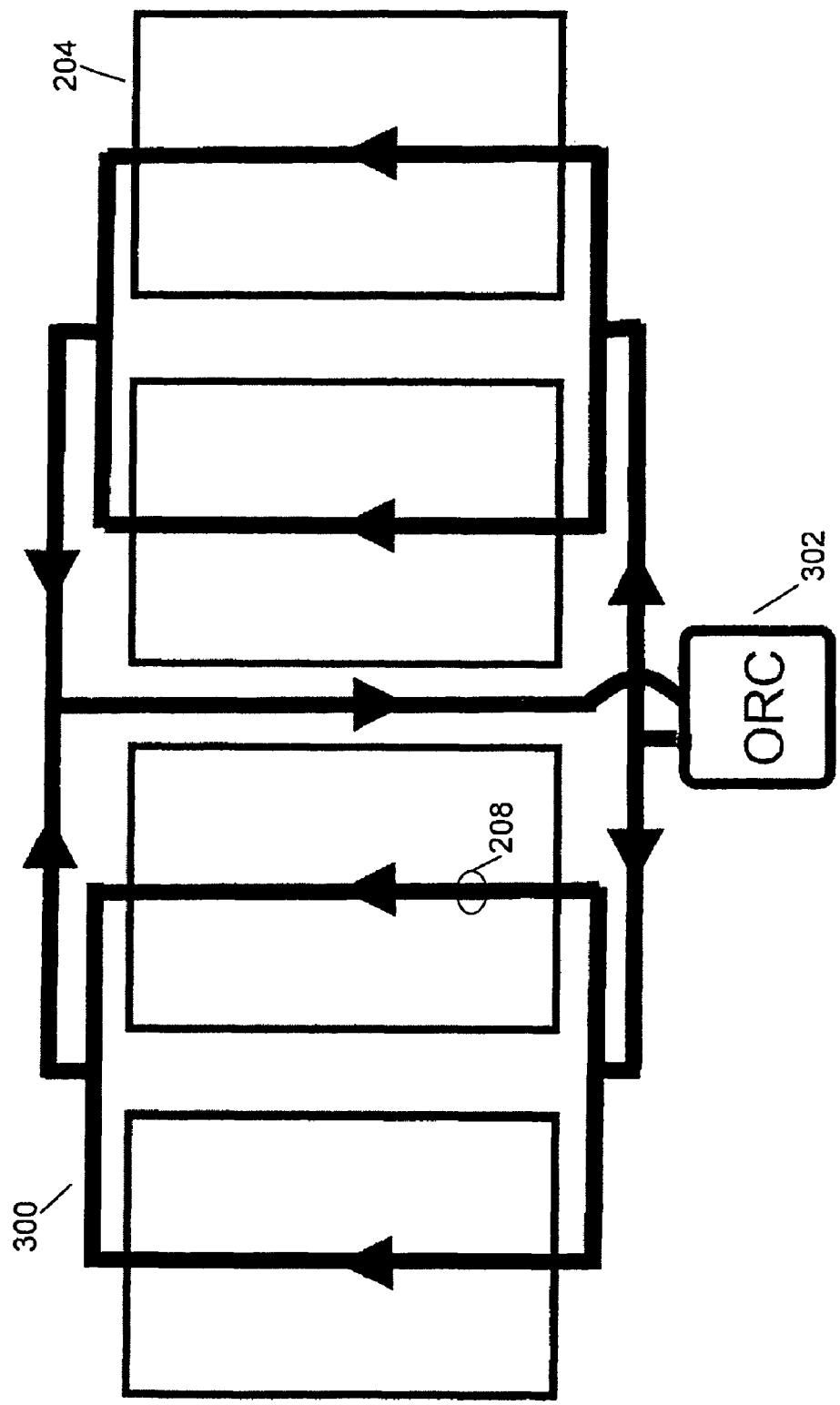
FIGS. 3C and 3D are schematic diagrams of thermal fluid flow paths for solar collectors in dual-axis tracking configuration.
Figure 3D:
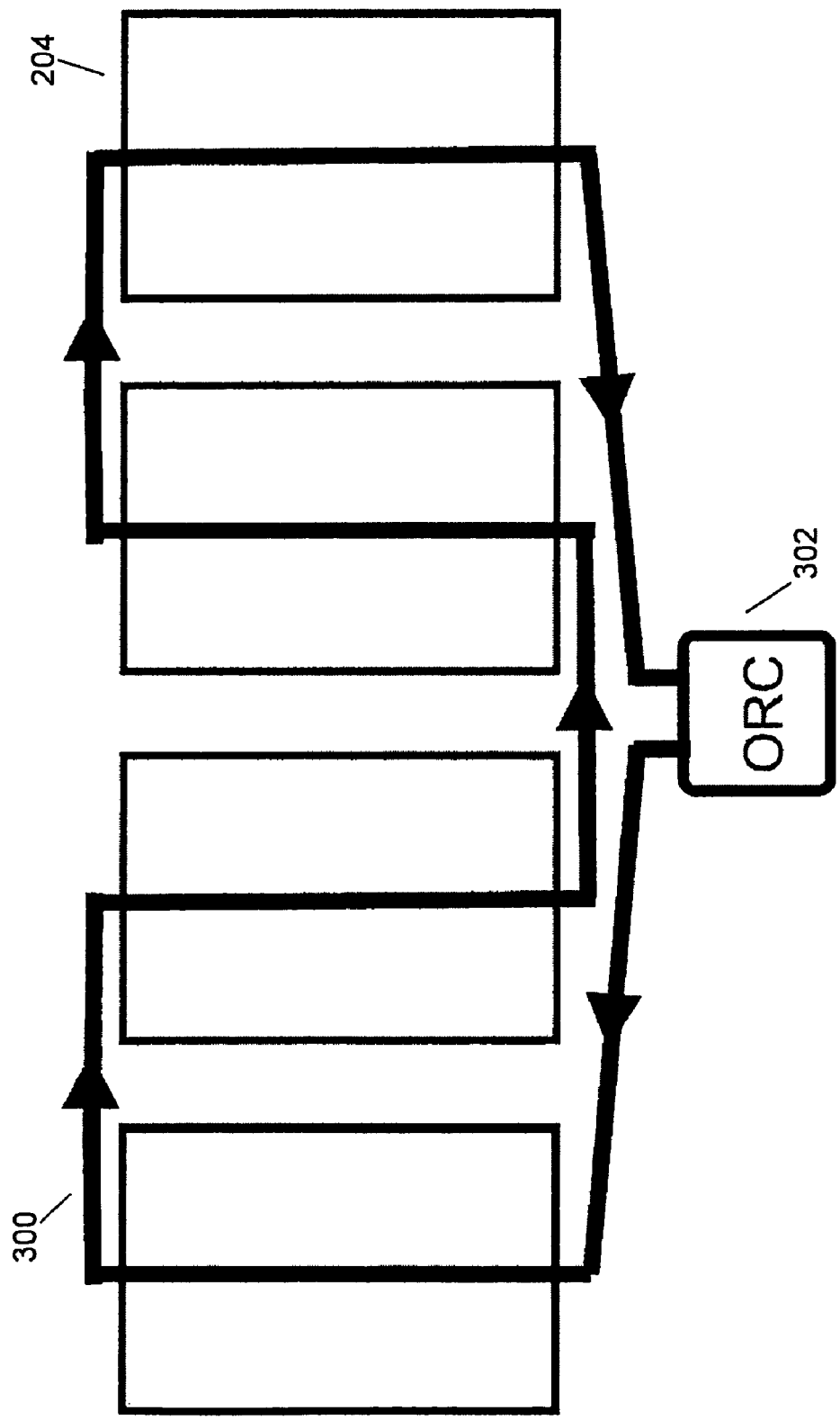

FIG. 2B illustrates a solar energy collector, with four troughs, in dual-axis tracking configuration 210. In this configuration, the base support structures 202 are more compactly spaced, and the trough modules 204 are mounted side-by-side on a support frame 212 gimbaled for an additional axis of rotation 206, which enables positioning of the troughs 204 normal to the sun's elevation, and affords greater effective collection of sunlight for a given trough at high latitudes, or as the sun's position changes seasonally. East-west tracking 214 of the troughs 204 along the north-south axis is accomplished by a centrally positioned gear motor unit with a four way pulley turning all four drive hubs, operated via the control system to maintain alignment with the sun. This system is described in more detail in FIG. 4. North-south articulation 216 around the east-west axis is accomplished either manually (as needed based on time of year), or with a separate gear motor. To provide additional stability and strain relief, each base support structure 202 is equipped with a locking frame arm (hidden in FIG. 2B) which is released during north-south tracking and locked in the interim. In this configuration, the receiver/absorber tubes (not depicted in FIG. 2B for clarity) connect to a header manifold 212 at the top and bottom of the upper gimbaled frame as shown in FIGS. 3C and 3D. The connection between this thermal loop 300 and the stationary ORC module 302 is made via flexible hoses. Parallel connection, as illustrated in FIG. 3C, requires more piping, but reduces the overall pressure drop across the collectors, thus reducing the pumping power required to move the thermal fluid. In addition, in parallel configuration a blockage or restriction in one of the tubes 208 will not lead to failure of the whole system. Another advantage of connecting the manifold in series, as shown in FIG. 3D, include a reduced length of piping necessary and potentially lower cost.

Regardless of whether a single- or dual-axis configuration is utilized, the solar collector is assembled of similar components and functions in substantially the same way to collect energy from the sun. A single array module consists of multiple parabolic troughs whose axis of rotation is about the focal point of the parabola. During the day, the troughs rotate to follow the sun such that the sun's rays fall substantially perpendicular to the top plane of the parabolic troughs, and thus the reflectors concentrate the solar radiation incident on the aperture of the troughs onto a receiver tube mounted at the focal point. Solar radiation is transformed into heat at the receiver tube, collects in the heat transfer fluid pumped through the manifold, and is delivered to the energy conversion subsystem 104.

Figure 2C:
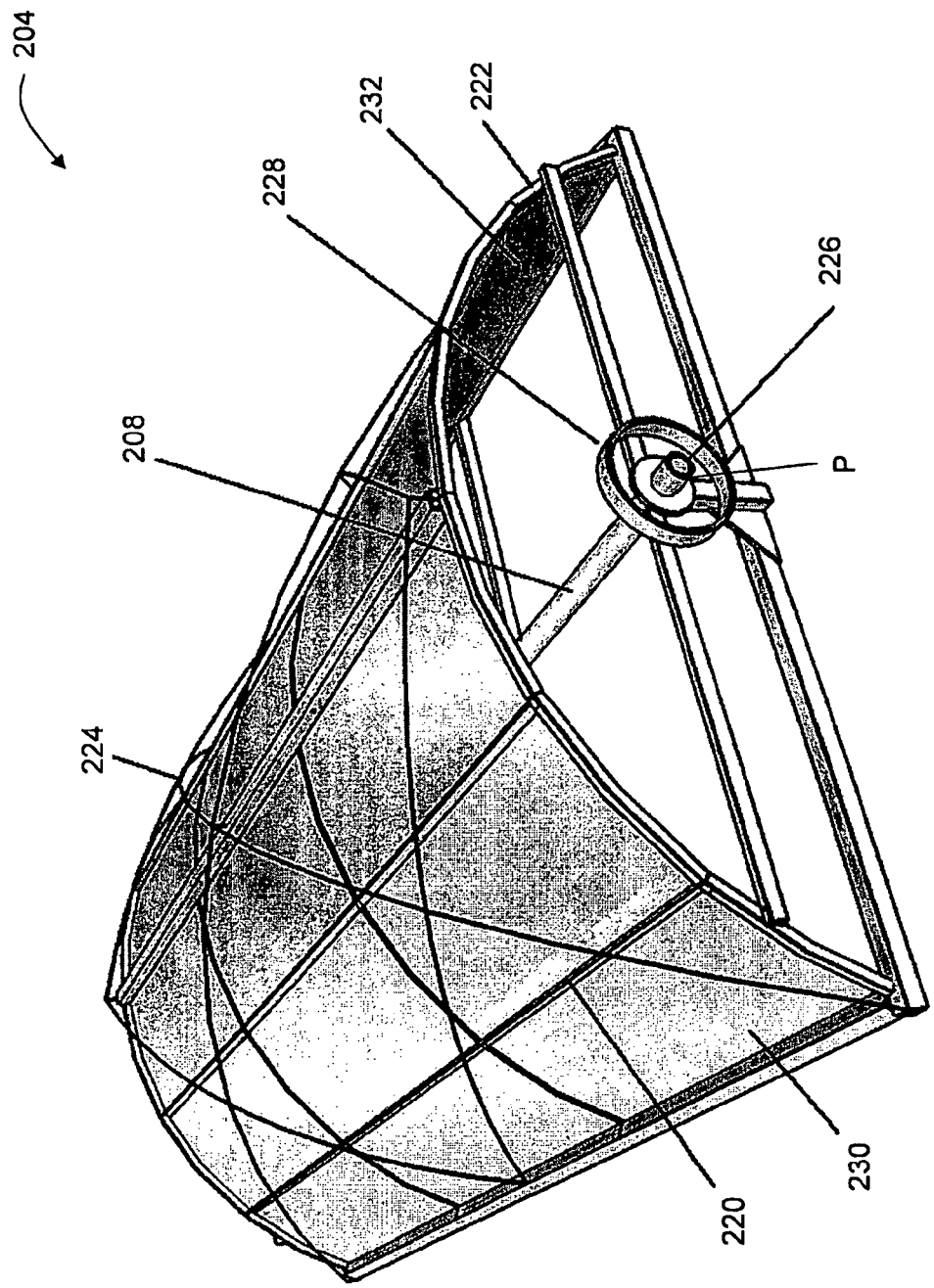
FIG. 2C is a schematic perspective view of a solar energy collector trough in accordance with one embodiment of the invention.
Figure 2D:
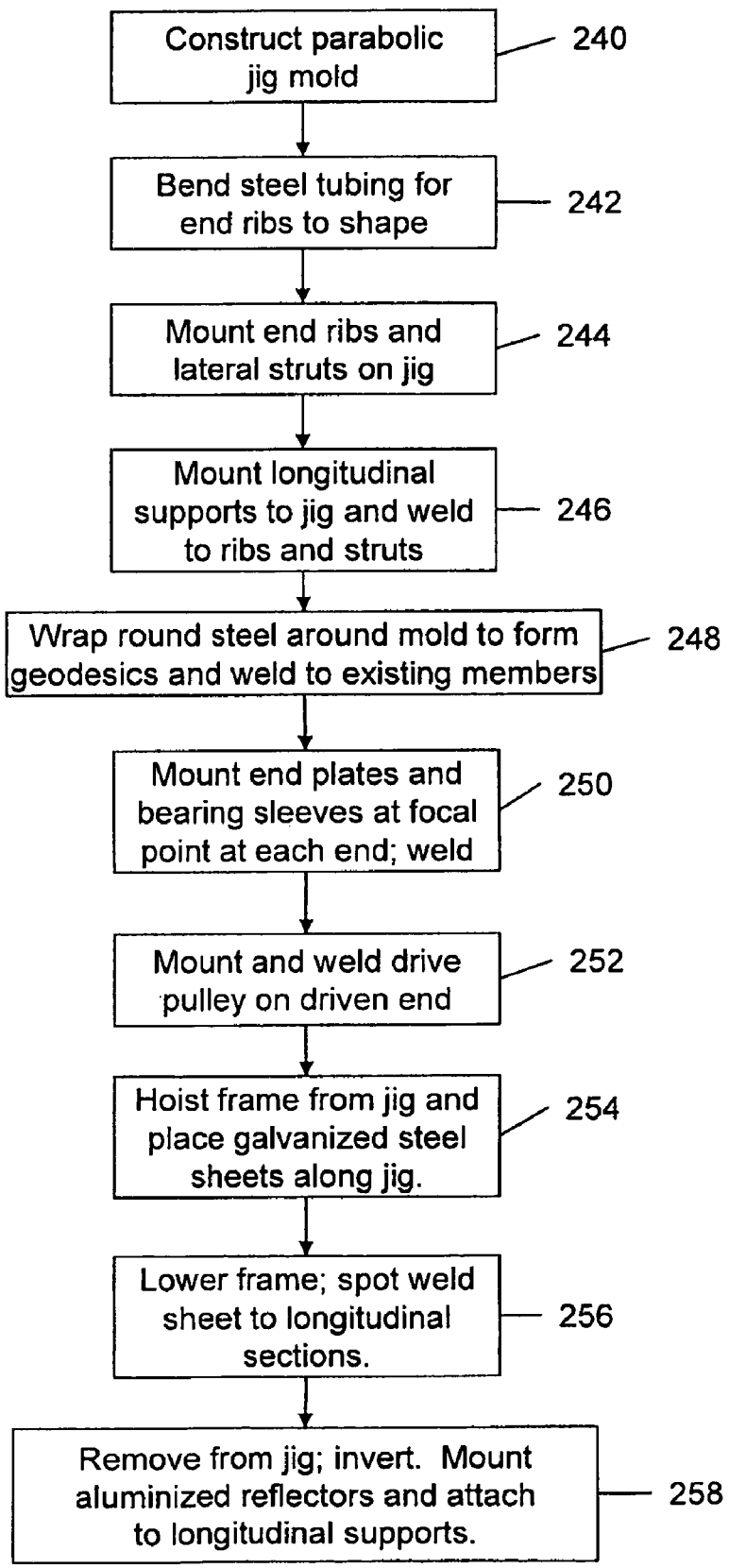
FIG. 2D is a flow chart depicting the steps of manufacturing the trough depicted in FIG. 2C in accordance with one embodiment of the invention.

FIG. 2C is a schematic perspective view of a parabolic trough module 204, which can be built according to the flow chart of FIG. 2D. The trough module 204 includes a tube steel box frame with longitudinal sections 220 and end frame member supports 222 along the parabolic coordinates, and transverse intersecting geodesic supports 224 which increase torsional stiffness. The parabolic trough module is constructed so that the center of mass, the axis of rotation, and the focal point of the parabolic geometry are at substantially the same position to minimize tracking power required, to reduce or eliminate the need for flexible joints at the receivers, and to minimize heat losses due to ambient wind conditions. In one embodiment, construction of the troughs is simplified by following the steps illustrated in FIG. 2D: constructing a parabolic jig mold (step 240), bending of steel tubing for the end ribs 222 to a parabolic shape (step 242), the deposition of the end ribs 222 and cut-to-length lateral struts onto the inverted parabolic jig (step 244), and the deposition of cut-to-length longitudinal supports onto the jig, followed by welding to the ribs and struts at the joints (step 246). Thereafter, the geodesics may be made by wrapping elastic round steel members over the parabola skeleton, and welding them to the box frame, the longitudinal supports, and each other (step 248). Hollow plain bearing sleeves 226 and end plates are mounted at the focal point P and welded to the ends of the frame (step 250), and a wheel hub 228 is welded at one end for power transmission from the tracking drive system (step 252). The plain bearings 226 are hollow to permit the passage of the receiver/absorber tube 208. The concentration ratio, i.e., the ratio of trough-to-absorber tube surface area, is determined at least in part by the choice of absorber tube. Use of typical steel piping of 50 to 100 mm diameter has yielded concentration ratios in the range of 20-45, where higher concentration ratios generally produce greater thermal efficiencies. Steel piping having different diameters are also contemplated.

After welding, the frame is hoisted from the jig, positioned upright, and a galvanized steel sheet backing 230 is affixed to the trough frame along the parabolic curvature for additional stiffness and weatherproofing to support an aluminized reflector 232 (steps 254, 256). The aluminized reflector sheet 232 is laid on top of the galvanized sheet 230 and affixed with mechanical fasteners (step 258). Quality assurance and control in fabrication is maintained by testing with a laser unit. The test device is a simple frame with footings designed to slide up and down the outer members of the box frame while providing for a laser normal to the troughs to traverse the tip-to-tip width of the parabolic reflector. This traverse can be performed at as many locations as are desired to ascertain the optical efficiency of the reflector, as indicated by the termination of the laser at the absorber tube envelope.

The quality of the parabolic geometry depends, at least in part, on the machined and geometrically true jig, selection of relatively unwarped frame elements, and prevention of warping during welding. The jig employed should have provisions for easily facilitating the clamping of frame elements during welding to promote maintaining the form of the jig. With these provisions, optical efficiencies of greater than about 95% can be achieved in on-site fabrication.

For either single- or dual-axis configuration, the support structure can be free-standing on a graded surface, or anchored or otherwise secured to one or more heavy footings or slabs. The base structure 202 is made from standardized steel sections with welded flanges for quick assembly (or disassembly). One advantage of this design is that it requires a minimal number of machine tool modifications, limited to straight cuts and bolt hole drilling. The gimbal joint utilizes plain bearings, aligned by a leveling apparatus with a pipe section to true the bearings. The modular nature of the base support structures and trough design facilitates two different deployment configurations, for either single-axis (east-to-west rotation, as depicted in FIG. 2A) or double-axis (east-to-west rotation and north-to-south rotation, as depicted in FIG. 2B) tracking. Either configuration may also include as many or as few troughs as desired, based on cost, desired capacity, or space considerations. Single-axis tracking is a simplified configuration while dual-axis tracking occupies a smaller footprint per unit effective area of collector; as mentioned, single-axis tracking can be less effective at extreme sun positions. Flexibility in configuration is a relevant consideration when optimizing the collectors for the application and site conditions.

Figure 4:
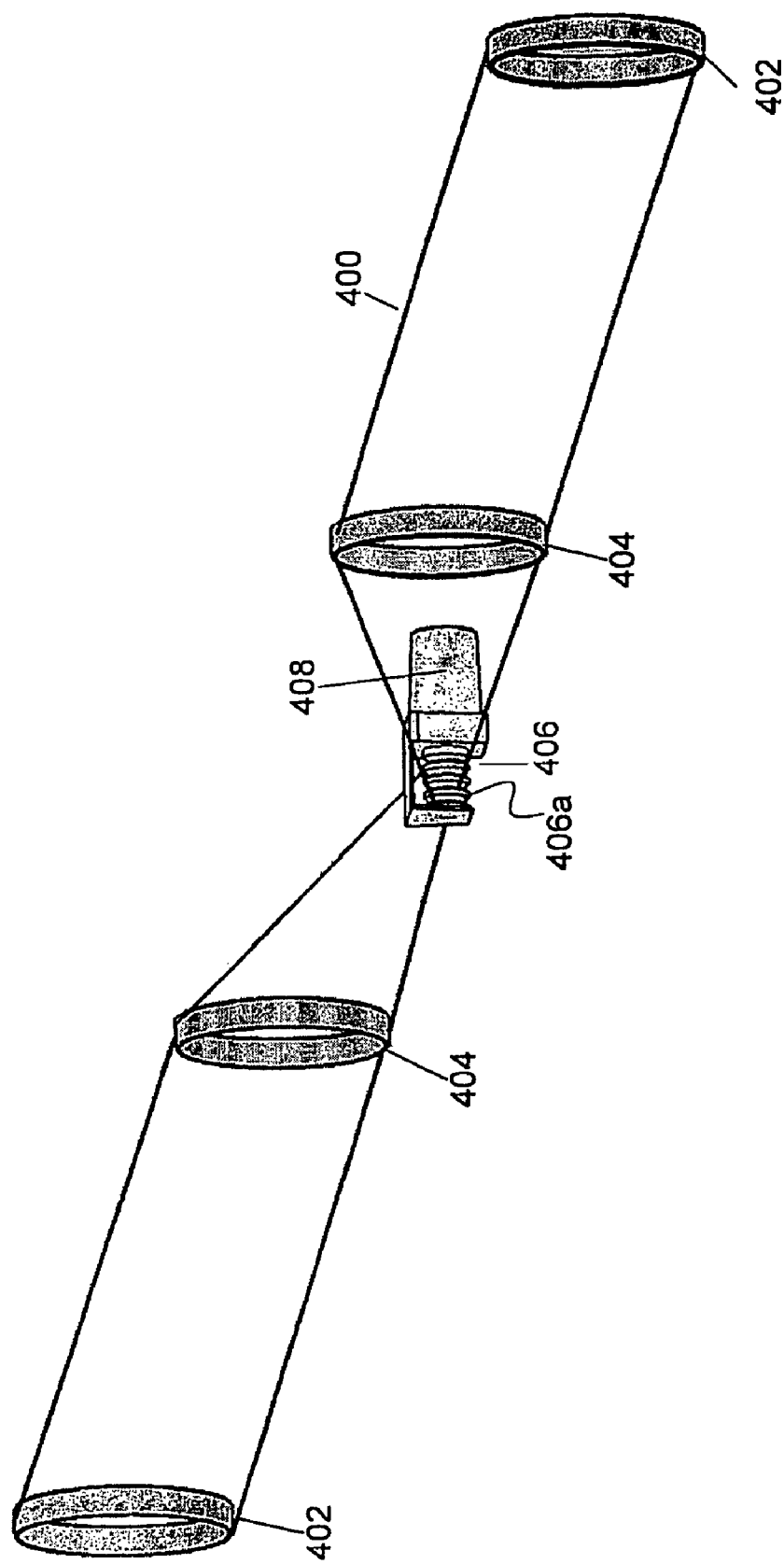
FIG. 4 is a schematic perspective view of a trough rotation system for a solar collector in accordance with one embodiment of the invention.

FIG. 4 illustrates a winch motor and transmission configuration that drives the trough rotation mechanism. The tracking systems include, in some embodiments, tensioned galvanized steel cable 400 wound around a wheel 406a of a central pulley wheel 406 so that the outer troughs 402 articulate in tandem. The two inner troughs 404 are connected by cable 400 to the four-way central pulley wheel 406 driven by a power winch 408, so that all four troughs 402, 404 can be moved in synchrony. To install the tracking system, the end troughs 402 are first connected to the inner troughs 404 with lanyards using thimbles, cable clamps, and turnbuckles. The cables 400 are tensioned with the turnbuckles so that the troughs move together, and so that, when the inner trough 404 is in alignment with the sun, the outer trough 402 is also in focus, i.e., incoming solar insolation is being reflected completely onto the absorber tube. The cables 400 are clamped and wound around the four-way pulley 406 in alternating directions before the pulley is mounted on the power winch 408, which is placed on the mounting plate at the front and center of the gimbled frame. The cables 400 from the power winch are attached to turnbuckles on lanyards from the inner troughs, and the cable length is adjusted with the turnbuckles so that both inner troughs 404 are in alignment with the sun at the same time.

The tracking system comprises a gear motor adapted from widely available winching devices (e.g., devices produced by T-MAX rated at 2500 lbs., or Chicago electric 1.5 hp 12 VDC 2000 lbs. utility winch #92860-2VGA), a single or four-way pulley (for single- or dual-axis tracking, respectively), and appropriate power transmission media, e.g., ANSI chain, aircraft cable, belts, etc., for both conveying rotational motion to the troughs and providing strain relief from off-center or wind loading.

Figure 5:
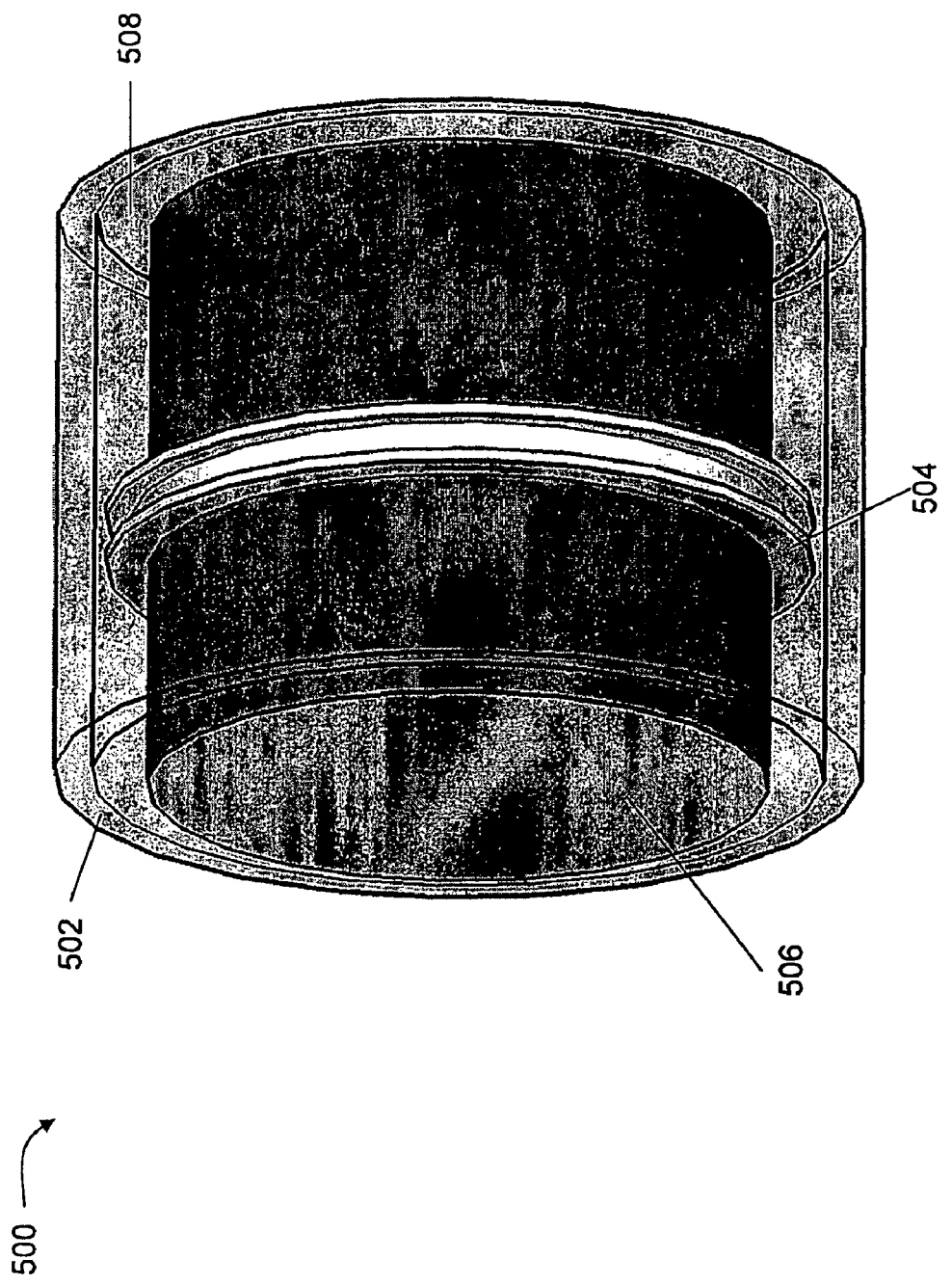
FIG. 5 is a schematic perspective view of an absorber tube in accordance with one embodiment of the invention.

The thermal manifold may be galvanized steel pipe with thermal insulation on the non-receiver sections and an optional optically transmissive glass insulation jacket on the absorbers/receiver tubes. FIG. 5 provides a schematic perspective view of such an insulated absorber tube 500. The glass jacket 502 is mounted in sections by means of bracketing. Interlocking PTFE sleeves 504 with machined grooves supporting Buna-N O-rings are interposed between the glass jacket 502 and absorber (506), at positions corresponding to the lateral struts of the trough box frame. The PTFE-Buna N seal creates a gas-permeable mechanical connection with sufficient temperature resistance on the absorber side (PTFE resists temperature up to about 320° C.), and flexibility to support the glass jacket and accommodate the differential expansion of the materials as temperatures change. Placement of the seals at the trough ends and underneath the lateral struts prevents direct exposure to concentrated solar rays and reduces the temperature and photochemical stress on the seal. The receiver annulus 508 is air-filled, and the galvanized steel absorber 506 is coated with a high-absorptivity, low-emissivity coating to improve solar absorption efficiency. While an air-filled annulus 508 produces a system with a slightly lower efficiency than an evacuated annulus, the lower cost and reduced complexity of construction make this design advantageous for distributed applications. The thermal fluid employed can be any suitable low-cost high-boiling-point fluid, e.g., pure monoethylene glycol (MEG). Other suitable fluids, such as mineral or synthetic oils including Therminol® VLT, organic fluids such as Freezium and Zitrec fluids, are contemplated. Suitable fluids may have freezing temperatures well below typical minimum temperatures (generally less than about 0° C.) and boiling temperatures greater than about 160° C. and up to about 300° C. at atmospheric pressure. In many applications of high temperature heat transfer fluids, it is common for the fluid to be pressurized to increase the boiling point, thereby increasing the maximum operational temperature. While generally less desirable due to the increased cost of high-pressure plumbing parts, pressurized thermal fluids may also be used. MEG, which freezes at −13° C. and boils above 180° C. in pure form, is an acceptable selection due to its low cost, reasonable efficiency at specified temperatures, and extensive availability.

In certain embodiments, it may be desirable that the total direct solar radiation-to-thermal efficiency of the array exceed about 50% under normal operating conditions, taking into account at least the optical efficiency, reflectivity of trough surface, emissivity of absorber tube surfaces, and convective and radiative losses from the heated thermal fluid. Under certain circumstances, the array should be capable of maintaining design temperatures of up to about 180° C. at flow rates of up to about 40 liters per minute per kilowatt of desired electrical output; however, both of these parameters are functions of system size, location, and configuration (e.g., parallel or series piping). TABLE 1 provides efficiency ranges of the various contributors to the overall efficiency of the energy collector subsystem.

TABLE 1

Efficiency parameters of a solar energy collector

| Collection Parameter | Estimated Range of Values |
|---|---|
| Optical Efficiency | 90-95% |
| Surface Reflectivity | 90-96% |
| Absorptivity of Absorber Tube Selective Coating | 70-90% |
| Emissivity of Absorber Tubes | 15-30% |
| Convective Efficiency | 75-95% |
| Total Direct Solar Radiation to Thermal Efficiency (Calculated from above) | 30-66% |

FIGS. 6A-6D are schematic diagrams of energy collection and conversion systems in accordance with embodiments of the invention. With regard to FIG. 6A, the energy conversion subsystem 104 performs the main function of the overall system, as it converts heat into other useful forms of energy. The energy converter 104 receives energy in the form of heat from the energy collection system 102, converts this heat into mechanical and electrical energy, and rejects heat via the energy rejection system 106, where it may be used to heat water, be rejected directly to the air, or both, or as the heat input to an absorption chiller cycle. In certain embodiments, subsystem 104 transfers the electrical energy generated to the control module 108 (not shown), where it is stored in batteries for later use. The operation of the energy conversion subsystem is controlled by the control module 108.

Figure 6A:
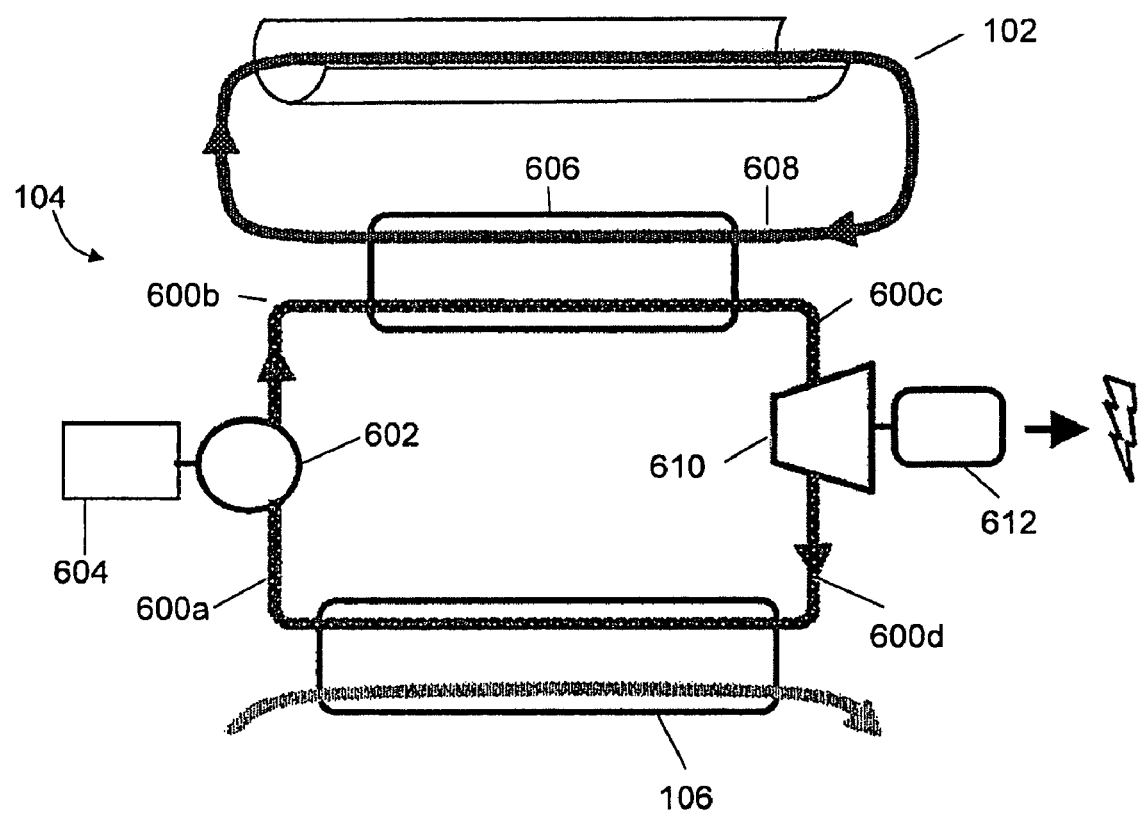
FIG. 6A-6D are schematic diagrams of energy collection and conversion systems in accordance with various embodiments of the invention.

The working fluid 600a, a low-temperature, low-pressure liquid, is pressurized as it passes through a pump or compressor 602 that may be powered by a motor 604. The resulting low-temperature, high-pressure working fluid 600b is then heated and vaporized in a vaporizer 606. The vaporizer 606 can be a heat exchanger that transfers heat from the thermal collector fluid 608 in the energy collection subsystem 102 to the working fluid 600b (as shown in FIG. 6A). Alternatively, the working fluid may also flow directly through the manifold system of the energy collecting subsystem 102, which then heats and vaporizes the working fluid 600b directly. Such a design would cause an increase in total system pressure of subsystem 102, and the components of the system would need to withstand such an increase. Regardless, the resulting high-temperature, high pressure vapor 600c performs work on an expander 610, or a series of expanders, to create rotational mechanical energy. The series of smaller expanders depicted in FIG. 6B can be significantly more cost-effective and more readily available than a single expander of the same overall performance. For example, an expander with an expansion ratio (i.e., the ratio between the specific volume of the outlet to the specific volume of the inlet, approximated by the highest and the lowest pressure of the working fluid) of around 12 could cost up to $10,000, whereas an expander triplet with the same ratio costs only about $250-1000 for used or new models. The mechanical energy provided can be used to drive pumps directly, and/or can subsequently be converted by one or more electrical generators 612 to electrical energy and stored in the batteries of the control module 108. Autonomous system function, which preserves the rotational speed of the expander modules, enables the selection of drive ratios between expander and generator modules that utilize the generator at a maximally efficient rotational speed. The electrical energy produced by the generator 612 can also be used to power the motor 604 and other components of the system, including the trough articulation motor, cooling fans, or water pumps.

While the working fluid 600 passes through the expander or series of expanders 610, its temperature and pressure decrease, resulting in a medium-temperature, low-pressure vapor or vapor-liquid mixture 600d. The choice of working fluid determines whether condensation begins during this stage; for example, with R245 as the working fluid, condensation does not occur at this stage, whereas with water as the working fluid, condensation may begin. Turbine expanders with high rotational and tip speeds may damaged by droplets of partially condensed working fluid 600 as the droplets impact upon the fast-moving blades. If partial condensation of the working fluid 600 is expected during expansion, an expander with slower rotational speed or an alternative to rotation, such as a scroll expander that nutates, should be used. The vapor or liquid-vapor mixture 600d proceeds to the energy rejection subsystem or condenser 106, where it is cooled and condensed to state 600a, which completes the cycle. FIG. 6C illustrates a system which includes a heat exchanger 614 for heating water as part of the energy rejection subsystem 106. Water is circulated through the heat exchanger 614 in the opposite direction as the working fluid 600d by a recirculation pump 618, and absorbs some of the energy of the working fluid 600. The heated water can be stored in a tank 620.

TABLE 2 provides typical temperature and pressure values of the working fluid states at locations a, b, c, d in the system shown in FIG. 6A, along with the mass flow rate, power output, and cycle efficiency of the system for various times of the year and the corresponding ambient temperature, average solar insolation, and heat input (on 37.5 square meters through an aperture at 50% thermal transfer efficiency). These values are based at least in part on the following assumptions: use of R245a as the working fluid; a pressure ratio between top pressure in state 600c and low pressure in state 600a of about 12.3; a generator efficiency of about 70%; and approximately constant parasitic losses of 220 W for operation of components that control thermal fluid circulation, tracking, cooling fans, control system, etc. Parasitic losses for the pump 604 should be calculated independently for each run based on mass flow rate.

TABLE 2

System and thermodynamic state parameters

| State | Time of year | Mid-winter | Spring/Fall | Summer | Average |
|---|---|---|---|---|---|
| | Ambient temperature [° C.] | 10 | 18 | 25 | 18 |
| | Solar insolation [W/m²] | 537 | 674 | 815 | 675 |
| | Heat input [kW] | 10 | 13 | 15 | 13 |
| 600a: condensed | Temperature [° C.] | 15 | 23 | 30 | 23 |
| | Pressure [psi] | 15 | 20 | 26 | 20 |
| 600b: pressurized | Temperature [° C.] | 16 | 24 | 32 | 24 |
| | Pressure [psi] | 185 | 246 | 320 | 250 |
| 600c: vaporized | Temperature [° C.] | 101 | 114 | 127 | 114 |
| | Pressure [psi] | 185 | 246 | 320 | 250 |
| 600d: expanded | Temperature [° C.] | 47 | 55 | 61 | 54 |
| | Pressure [psi] | 15 | 20 | 26 | 20 |
| | Mass flow rate [kg/sec] | 0.039 | 0.05 | 0.063 | 0.0507 |
| | Power output [kWe] | 0.53 | 1.29 | 1.21 | 1.0 |
| | Cycle efficiency | 5.23% | 10.21% | 7.92% | 7.79% |

The energy conversion subsystem 104 may be constructed in a recuperated configuration to increase its efficiency. FIG. 6D is a schematic diagram of such an energy converter 104 in accordance with an embodiment of the invention. A recuperator 616, which is added to the energy converter 104 in this configuration, and transfers thermal energy within the working fluid 600 from the portion in state 600d to the portion in state 600a. The working fluid 600d exits the recuperator in state 600$d_2$, which is a medium-temperature, low-pressure vapor having a temperature lower than that of state 600d. Working fluid 600a exits the recuperator in state 600$a_2$, which is a low-temperature, high-pressure liquid having a temperature higher than that of state 600a. The addition of the recuperator 616 serves to recycle some of the heat in the energy conversion subsystem 104, thereby increasing its efficiency.

TABLE 3 provides typical values of system and state parameters of the recuperative energy conversion subsystem shown in FIG. 6D for various times of the year. The underlying assumptions are the same as for TABLE 2 above. Power consumption associated with the cooling fans will generally be lower in this configuration; however, value for power consumption for the fans have not been included in the table due to those components' dependence on the specific implementation. Generally, efficiencies in TABLE 3 represent the lowest expected results for such a system.

TABLE 3

System and thermodynamic state parameters for recuperative configuration

| State | Time of year | Mid-winter | Spring/Fall | Summer | Average |
|---|---|---|---|---|---|
| | Ambient temperature [° C.] | 10 | 18 | 25 | 18 |
| | Solar insolation [W/m²] | 537 | 674 | 815 | 675 |
| | Heat input [kW] | 10 | 13 | 15 | 13 |
| 600a: condensed | Temperature [° C.] | 15 | 23 | 30 | 23 |
| | Pressure [psi] | 15 | 20 | 26 | 20 |
| 600a₂: pressurized | Temperature [° C.] | 16 | 24 | 32 | 24 |
| | Pressure [psi] | 185 | 246 | 320 | 250 |
| 600b: pressurized, post-recuperator | Temperature [° C.] | 37 | 39 | 45 | 40 |
| | Pressure [psi] | 185 | 246 | 320 | 250 |
| 600c: vaporized | Temperature [° C.] | 101 | 114 | 127 | 114 |
| | Pressure [psi] | 185 | 246 | 320 | 250 |

TABLE 3-continued

System and thermodynamic state parameters for recuperative configuration

| State | Time of year | Mid-winter | Spring/Fall | Summer | Average |
|---|---|---|---|---|---|
| 600d: expanded | Temperature [° C.] | 47 | 55 | 61 | 54 |
| | Pressure [psi] | 15 | 20 | 26 | 20 |
| 600d$_2$: expanded, post-recuperator | Temperature [° C.] | 17 | 34 | 42 | 31 |
| | Pressure [psi] | 15 | 20 | 26 | 20 |
| | Mass flow rate [kg/sec] | 0.0429 | 0.0585 | 0.0650 | 0.0555 |
| | Power output [kWe] | 0.52 | 1.27 | 1.21 | 1.0 |
| | Cycle efficiency | 5.16% | 10.09% | 7.92% | 7.72% |

Figure 6B:
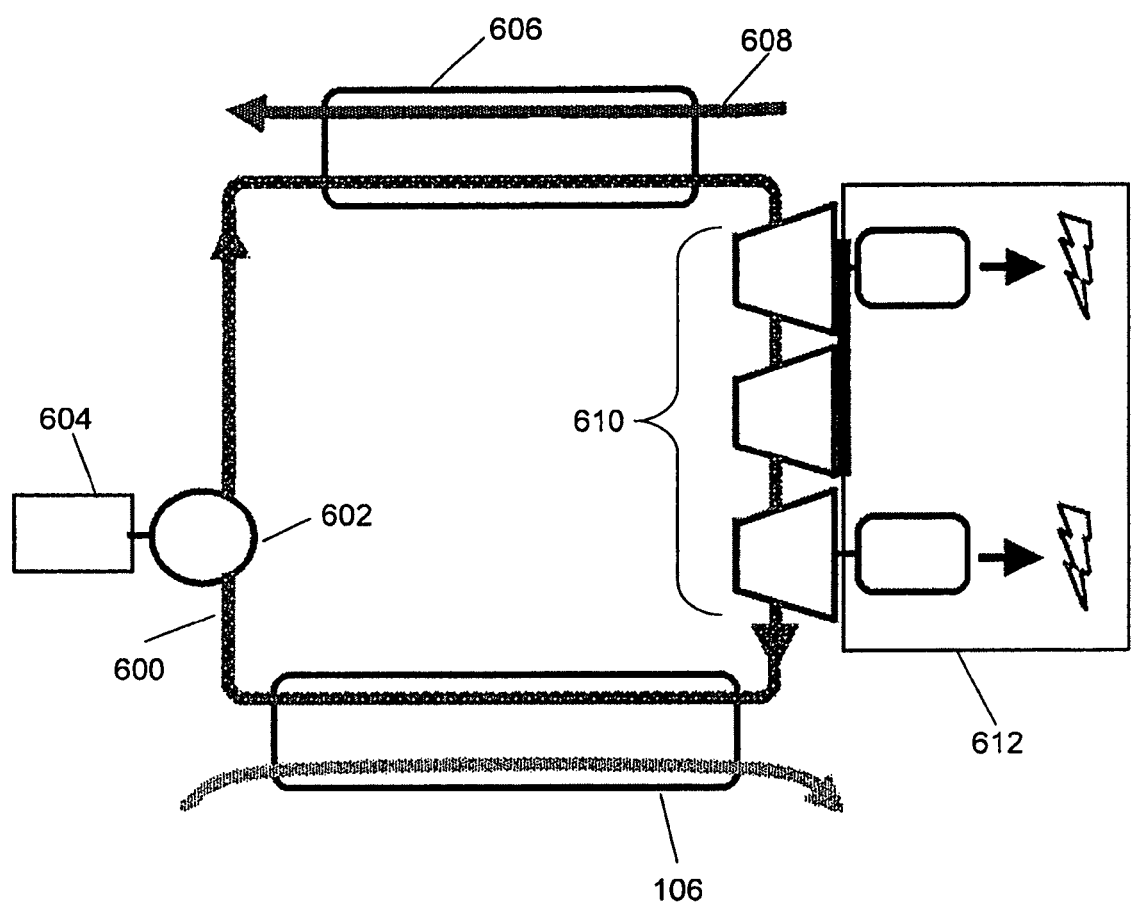
Figure 6C:
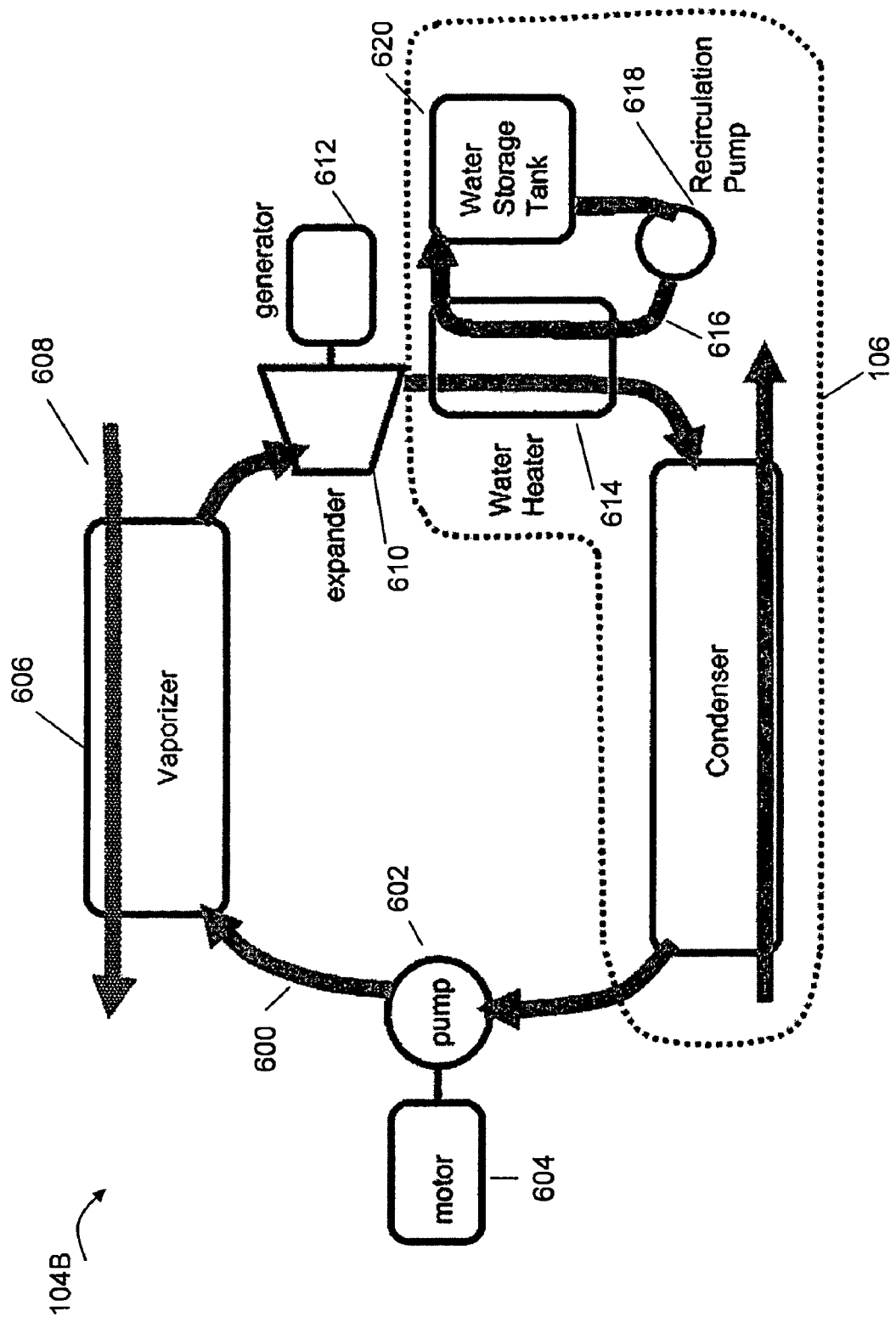
Figure 6D:
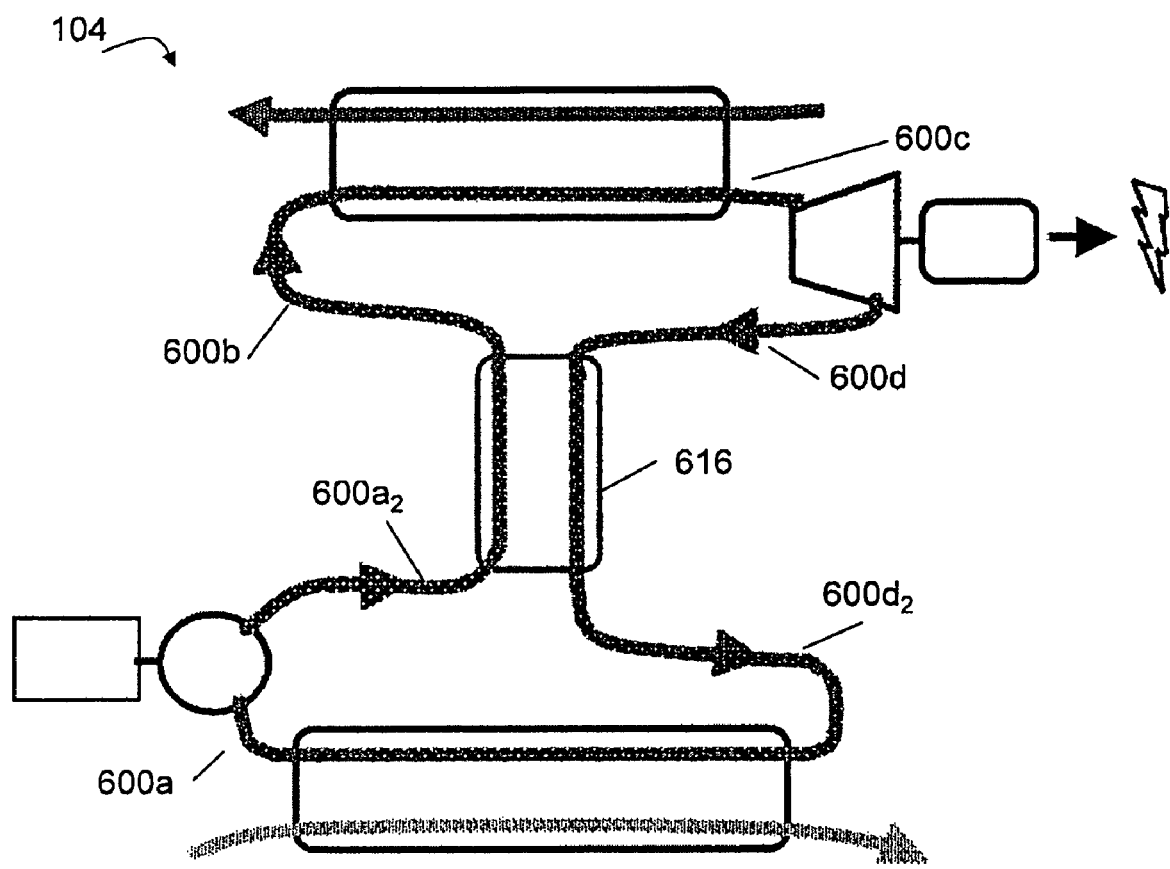
Figure 7A:
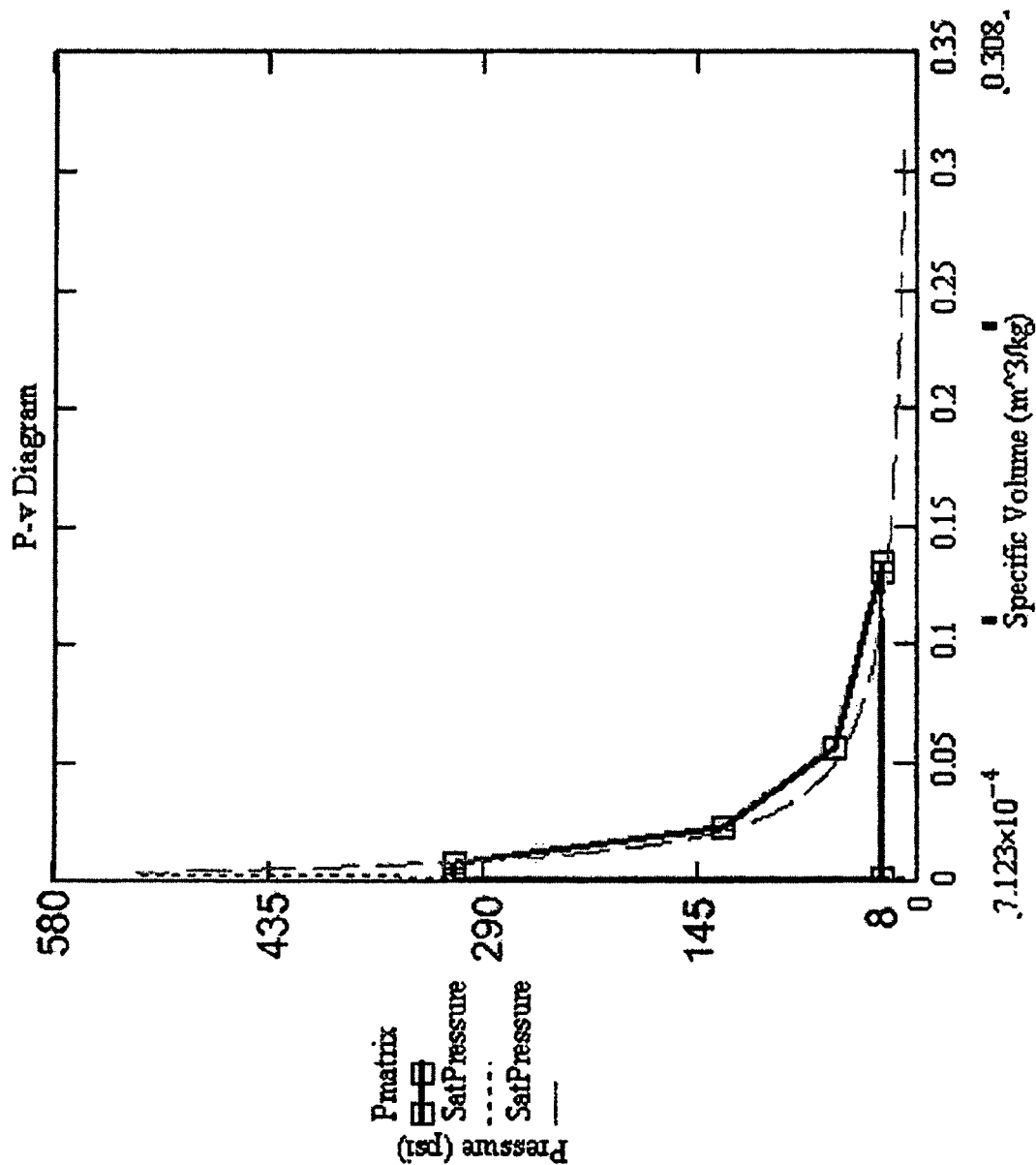
FIG. 7A is a pressure-volume state diagram of a working fluid in accordance with one embodiment of the invention.
Figure 7B:
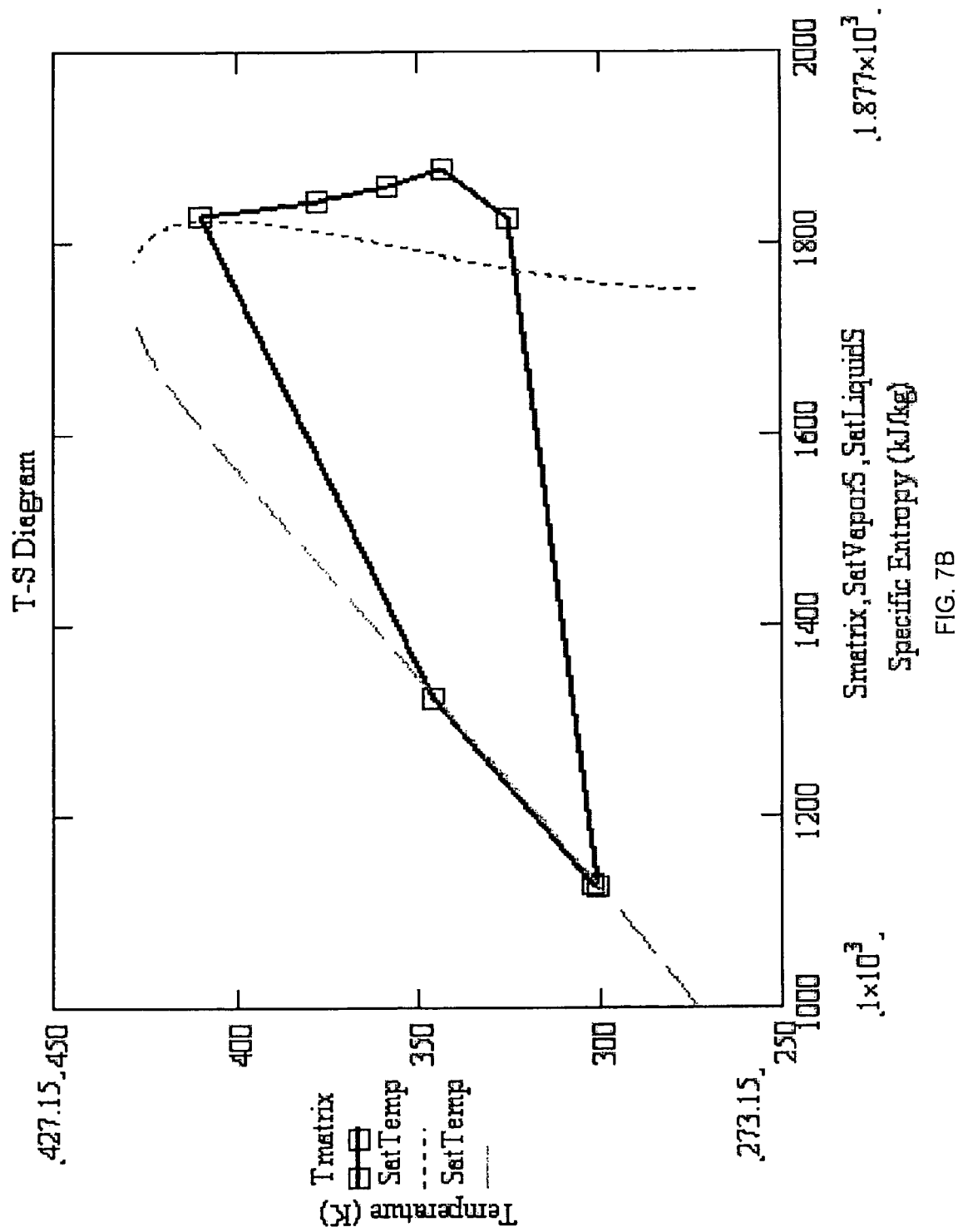
FIG. 7B is a temperature-entropy state diagram of a working fluid in accordance with one embodiment of the invention.

FIGS. 7A and 7B are thermodynamic state diagrams of the working fluid representative of an embodiment with three expanders (as depicted in FIG. 6B), a recuperator (as depicted in FIG. 6D), and a water heater (as depicted in FIG. 6C). FIG. 7A shows the fluid pressure as a function of the specific volume (i.e., inverse density). The top pressure falls in the range of about 300 psi to about 400 psi, corresponding to a high temperature of about 125° C. to about 140° C. when using R245fa. These values are chosen to allow use of mass-produced parts that are typically not rated for use at extremely high pressures or temperatures. System efficiency, which increases with an increased ratio of top-to-bottom pressure, may thus be constrained for systems in this pressure regime. FIG. 7B illustrates the relation between temperature and entropy.

The properties of the working fluid illustrated in FIGS. 7A and 7B are determined by the specific characteristics of each component of the collector 102, the converter 104, and the rejector 106. The states 600a and 600c are set by the pressure limits of the components of the converter 104 and by the capabilities of the collector 102 and the rejector, while the states 600b and 600d are set by the states 600a and 600c and the properties of the components of the converter 104. The top pressure (the pressure of the working fluid 600c) is limited to the maximum pressure tolerated by the converter 104 components. The temperature of the working fluid 600c is expected to be at or slightly above (by about 2-3 degrees C.) the saturation temperature of the working fluid 600 at the top pressure. Slight supersaturation minimizes condensation of the working fluid 600 in the expander. This working fluid temperature is generally also deliverable by the collector 102 and is thus a strong seasonal function of solar insolation. The specific volume and the entropy of the working fluid in state 600c are calculated from the temperature and pressure at this point. The bottom pressure of the working fluid 600a is set as the higher of (1) a pressure slightly above the saturation pressure of the temperature to which the rejector 106 can cool the working fluid 600 (about 2-5 degrees C. above ambient temperature for dry cooling), and (2) the pressure to which the expander can expand the working fluid less the pressure losses occurring in the rejector 106. The temperature of the working fluid 600a is slightly less (by about 1-2 degrees C.) than the saturation temperature of the pressure of the working fluid 600a. The specific entropy and the specific volume of the working fluid at state 600a can be calculated from the properties of the working fluid, the pressure, and the temperature of the working fluid 600a. The pressure of the working fluid 600d is the pressure of the fluid in state 600a increased by the pressure losses that occur in the rejector 106 (less than about 5 psi). The entropy of the working fluid 600d is controlled by the entropy in state 600c and isentropic efficiency of the expander (about 40-90%, which may differ by model). Because the isentropic efficiency of the expander is less than 100%, energy contained in the working fluid at state 600c is partially converted to entropy, which results in an increase of specific entropy between states 600c and 600d; the rest of the energy is converted to mechanical energy by the expander(s). The temperature and specific volume of the working fluid at state 600d correspond to those properties of the working fluid at the pressure and specific entropy of the working fluid at state 600d. The pressure and specific entropy of the working fluid 600b are set by the pressure and specific entropy of the working fluid 600a and the isentropic efficiency of the pump. Entropy is generated in the pump, resulting in the slight increase in specific entropy between states 600a and 600b. The specific volume and the temperature of the fluid 600b are calculated from the pressure and specific entropy of the fluid using known properties of the working fluid. These diagrams can describe a system with any power output level, determined uniquely as function of mass flow rate of the working fluid; maximum mass flow rates are chosen such that heat input from the energy collection system is transferred to the working fluid at a rate that sustains the temperatures and pressures specified for the working fluid 600c.

Figure 8:
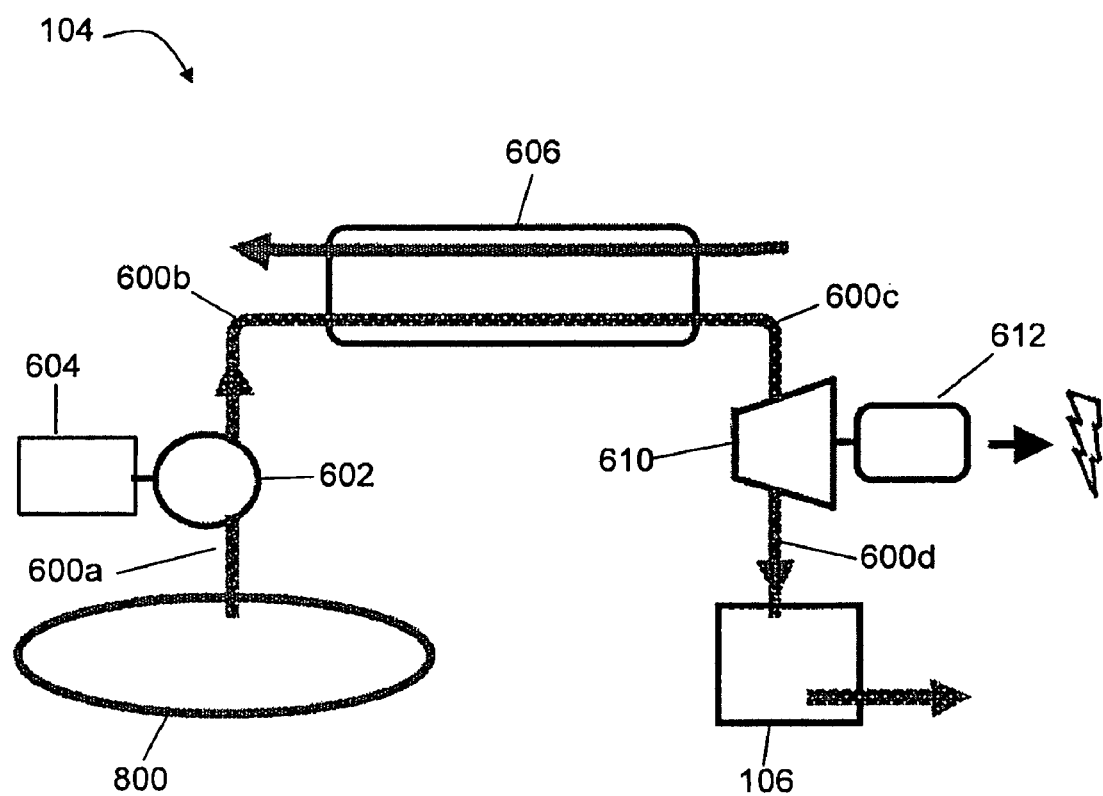
FIG. 8 is a schematic diagram of an energy conversion in accordance with another embodiment of the invention.

The energy conversion system 104 may be also implemented in an open-loop or a closed-loop configuration. The closed-loop configuration, shown in FIGS. 6A-6D above, requires that the working fluid is conserved throughout the cycle, and that no fluid enters or exits the cycle at any time. The working fluid 600 in the closed-loop configuration can be water or a synthetic fluid such as a refrigerant. In an open-loop configuration, the working fluid should be water, and may be drawn from or added to the system. FIG. 8 illustrates an energy conversion subsystem in open-loop configuration. Water is drawn from a water pool 800 and, after cycling through the states 600a-600d once, rejected into the environment.

In general, unless described differently in FIGS. 6A-6D and 8, the working fluid 600 is transported through the energy conversion subsystem 104 in a conduit in physical communication with each component of the subsystem, and with the energy collection subsystem 102 via a heat exchanger and the rejection subsystems 106 directly or via a heat exchanger. The energy rejection subsystem 106 improves the efficiency of the energy conversion subsystem 104, as it transfers lower-grade heat out of the system, thereby avoiding overheat conditions and optimizing thermodynamic efficiency. The energy rejector 106 may be a heat exchanger, wherein, for example, cold water or the working fluid of an absorption-chiller cycle refrigerator takes up heat from the vapor 600c, and/or radiators through which the working fluid 600c flows directly and which transfer heat to the surrounding air. The energy rejector 106 can also transfer heat to a large cold water body, if available. The efficiency of the rejector 106, i.e., the amount of heat it rejects per unit area of heat exchanger or radiator surface, depends on the temperature of the receiving fluid. In the case of air, the ambient temperature determines the coldest possible operating point of the system; however, the amount of power necessary to fully cool the working fluid to ambient temperature is high for most applications which the low-cost system of the present invention is suited. Therefore, the control module 108 is calibrated to cool the fluid to a temperature slightly higher than ambient, e.g. about 3-5 degrees Celsius above ambient temperature. Because the ambient air temperature changes throughout the day and year, the entire system should be designed to function under varying cycle conditions.

To facilitate local manufacture and minimize the cost of the overall system, one or more components in the energy conversion subsystem 104 or the energy rejection subsystem 106 can be mass-manufactured components from common industries, such as the automotive or heating, ventilation, and air conditioning (HVAC) industries, which are adapted for application in embodiments of this invention. For example, power steering pumps can be used to pump both the thermal and working fluids. These positive displacement pumps are designed to pump against pressures well above about 300 psi (up to 1000-2000 psi) at rates up to about 3-40 liters per minute (dependent on drive rpm), have high temperature resistance (greater than about 150° C.), and can be procured at costs from $50-$300. Some working models include the Saginaw Type "TC" and the Vickers VF-10 or VF-20; pumps from the following vehicle makes and models are all potential candidates for inclusion: VW Cabriolet (all years), Ford Mustang (1990 and later), Toyota 4runner (all years), Toyota Corolla/Matrix (2003-2006), Saab 900 (1994 and later), Mitsubishi Galant (1994 and later), AUDI A4/Passat (1997-2005), Volvo 70 Series (1993 and later), Nissan Maxima (1996 and later), Nissan Pickup Pathfinder (1993 and later), VW Golf/Jetta/Beetle (1998 and later), Mazda Protege (1990 and later), and Toyota Camry/Solara (1997 and later). Heat exchangers may be typical brazed plate heat exchangers that have high temperature (greater than about 200° C.), pressure (greater than about 435 psi), and chemical (refrigerant) resistance, but relatively low cost (less than about $4/kW energy transfer capability). For example, ITT brand BrazePack heat exchangers BP-410-10 and BP-410-30 have been used in certain embodiments of the system for the water heater and recuperator (410-10) and for the vaporizer and condenser (410-30). HVAC split unit forced air condensers, e.g., Carrier 09AWL006-20, can alternately be used as the condenser in an air-cooled design. These condensers have relatively low cost (less than about $80/kW heat rejected for a new unit) and can often be obtained second-hand or refurbished. Automotive alternators can be used as the generator unit, even when desired output potential is other than 12V through replacement of the regulator circuit. Typical alternators cost from $25-75, and simple alterations to the diode regulator can improve efficiencies by up to about 15-20% from typical values of about 60%. Higher efficiency (upwards of about 71%) alternators are also produced by Bosch (AL9960LH) and Denso (210-0466) for slightly higher cost ($250), but requiring little or no modification for improved efficiency use.

The control module 108 is an electromechanical subsystem that ensures that the system as a whole works at the highest efficiency possible under varying external conditions. It does so by controlling the system parameters of the energy collection 102, conversion 104, and rejection subsystems 106. The control module 108 also monitors the system, checks for potential system errors, initiates shut-down procedures if necessary, and provides information relating to the system state to users through an electronic display. A basic display using illuminated LEDs is a desirable low-power display for low-cost, distributed installations; however, an electronic display such as a computer touch screen can be used instead during testing phases or for installations where cost is less of a constraint.

Figure 9:
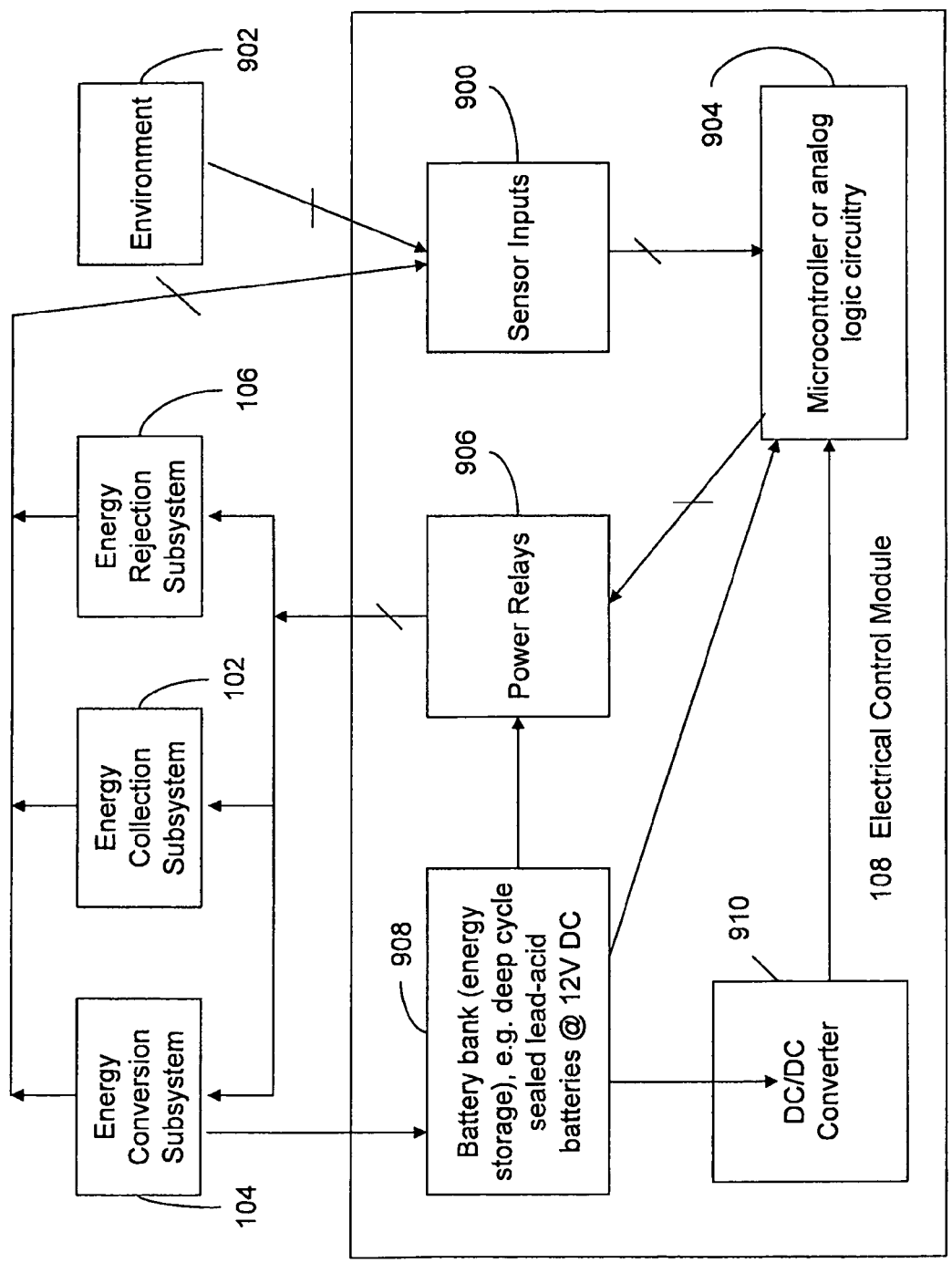
FIG. 9 is a schematic diagram of a control system for an energy collection and conversion system in accordance with one embodiment of the invention.

FIG. 9 illustrates conceptually how the various components of the control module 108 relate to the other subsystems and the environment. Sensor inputs 900 receive signals from the energy collection, conversion, and rejection subsystems 102, 104, 106, as well as from the environment 902. The analog input signals can be digitized for further processing. A microcontroller or analog logic circuit 904 uses these signals to determine which of the components of subsystems 102, 104, 106 should be turned on, and transfers corresponding output signals to the power relays 906, which distributes power from the battery bank 908 to the subsystems. Batteries may be deep cycle sealed lead-acid 12 V batteries, but other battery types are contemplated. A DC/DC converter 910 converts the battery output to the appropriate supply voltage for the microcontroller 904.

The control module 108 serves to overcome the inefficiencies that the system would otherwise experience due to the unique constraints of a small-scale solar energy collection system. Unlike megawatt-scale power plants, which have monitoring staff present at all times, small distributed units must be autonomous and maintenance free for months to years at a time. In addition, large scale power plants are designed to run at constant system parameters (e.g., the temperature and pressure of the working fluid in states 600a and 600c would, in a large-scale system have to remain constant) so that all other system parameters (pump speeds, expansion ratios, etc.) and the system efficiency also remain virtually constant. This may be difficult to achieve with small solar generation technologies. Solar input also can be intermittent, and total received insolation depends greatly on time of day, weather, season, and latitude. Locations with sufficient solar insolation are often arid environments where "wet" cooling is infeasible, and "dry"-cooling mechanisms are inherently limited by the ambient air temperature. Through active response of the solar thermal cogeneration technology to the level of solar insolation and the ambient air temperature, the energy conversion subsystem 104 can be kept within the window of most efficient functioning, avoiding potential overheat conditions, pump cavitation, or vaporizer flooding associated with fluctuating conditions. Generally, efficiency of the system is maintained by monitoring, calculating, or otherwise determining, e.g., the phase change boundary of the system working fluid, even though the system is subject to the above-identified variations in input parameters. The aspects of the control system that perform these functions are described in more detail below.

TABLE 4 provides an overview of input parameters of the control module 108, along with the subsystem with which they are associated, the purpose of measuring this parameter, and specific conditions and limitations of interest to the system control logic discussed below. For each of the energy collection 102, conversion 104, and rejection subsystems 106, the control module 108 generally monitors and controls at least one parameter in order to enable autonomous system functioning. These parameters may include, but are not limited to, (1) the temperature of the thermal fluid circulated in the energy collection subsystem 102, (2) the location of the phase change boundary (i.e., a proportion of a working fluid gas to a working fluid liquid) in at least one of the vaporizer in the energy conversion system 104 and the condenser in the energy rejection system 106, and (3) the temperature of the working fluid 300a circulated in the energy conversion subsystem. The control module additionally monitors at least one environmental parameter, typically ambient air temperature, to optimize functioning of the energy conversion subsystem 104. Monitoring additional environmental parameters, e.g. solar insolation, is useful for optimizing overall system function.

TABLE 5 provides an overview of output parameters that the control module 108 sends to the other subsystems, along with the relevant subsystem, the purpose served by the output parameter, and any specific conditions or limitations of interest to the control logic of the system. In order to optimize system efficiency, the control module relays power to components of the energy collection, energy conversion, and energy rejection subsystems as required by ambient and system conditions. Components controlled include the solar tracking circuit, which in turn controls the trough drive motor power relay, the motor driving the thermal fluid pump, the motor driving the working fluid pump, and fans and/or pump motors in the energy rejection subsystem. In the case of the working fluid pump, the motor speed is actively modulated via a pulse width modulation (PWM) mechanism to control working fluid flow rate as a function of ambient and system conditions.

TABLE 4

Input parameters of control module

| Parameter | Sub-System | Purpose | Condition of Interest |
|---|---|---|---|
| Thermal fluid temperature proximate (preceding) the vaporizer ("T_thermal") | Energy collection | Determine system ability to function based on hot side temperature | Temperature exceeds minimum necessary for system functioning |
| Working fluid level (2 sensors) | Energy conversion | Determine the location of the phase change boundary | Phase change boundary located between the two sensors |
| Pressure of working fluid proximate the vaporizer and first expander | Energy conversion | Safety | Pressure exceeds safety rating |
| Temperature of the working fluid proximate the vaporizer and first expander | Energy conversion | Safety | Temperature exceeds safety rating |
| Temperature of the working fluid proximate the condenser and the pump ("T_cold") | Energy conversion | Determine whether energy rejection system is performing adequately | Temperature exceeds maximum allowable for cold-side based on ambient temperature measurement |
| Pump Status (2 pumps) | Energy collection, Energy conversion | Safety | Pump failure |
| Battery Voltage | Energy storage | Safety | Battery voltage falls below minimum allowable level |
| Ambient air temperature | Environment | Determine optimal cold side temperature | N/A |
| Solar insolation | Environment | Determine optimal system status (on/off) | Insolation strong enough to allow system functioning |

TABLE 5

Output parameters of control module

| Parameter | Sub-System | Purpose | Condition of Interest |
|---|---|---|---|
| Thermal fluid pump power | Energy collection | Control on/off status of energy collection system | Thermal fluid temperature exceeds threshold value |
| Solar tracking circuit power | Energy collection | Control on/off status of energy collection system | No error condition |
| Working fluid pump power | Energy conversion | Control on/off status of energy conversion system | Thermal fluid temperature exceeds threshold value for sufficient length of time |
| Working fluid pump speed | Energy conversion | Control flow rate of working fluid to preserve phase change boundary in correct location | Varied continuously to preserve phase change boundary in correct location |
| Fan power | Energy rejection | Control cooling power provided by energy | Thermal fluid temperature proximate the condenser |

TABLE 5-continued

Output parameters of control module

| Parameter | Sub-System | Purpose | Condition of Interest |
|---|---|---|---|
| | | rejection system | and the pump surpasses minimum level |
| Water pump power | Energy rejection | Control amount of heat rejected to water heater stage of energy rejection system | Temperature of water in reservoir not yet exceeded target temperature |
| Warning lamp power | Control module | Alert users of error conditions | Refrigerant level low, battery level low, pump malfunction, occurrence of over pressure/over temperature shutdown |

Figure 10:
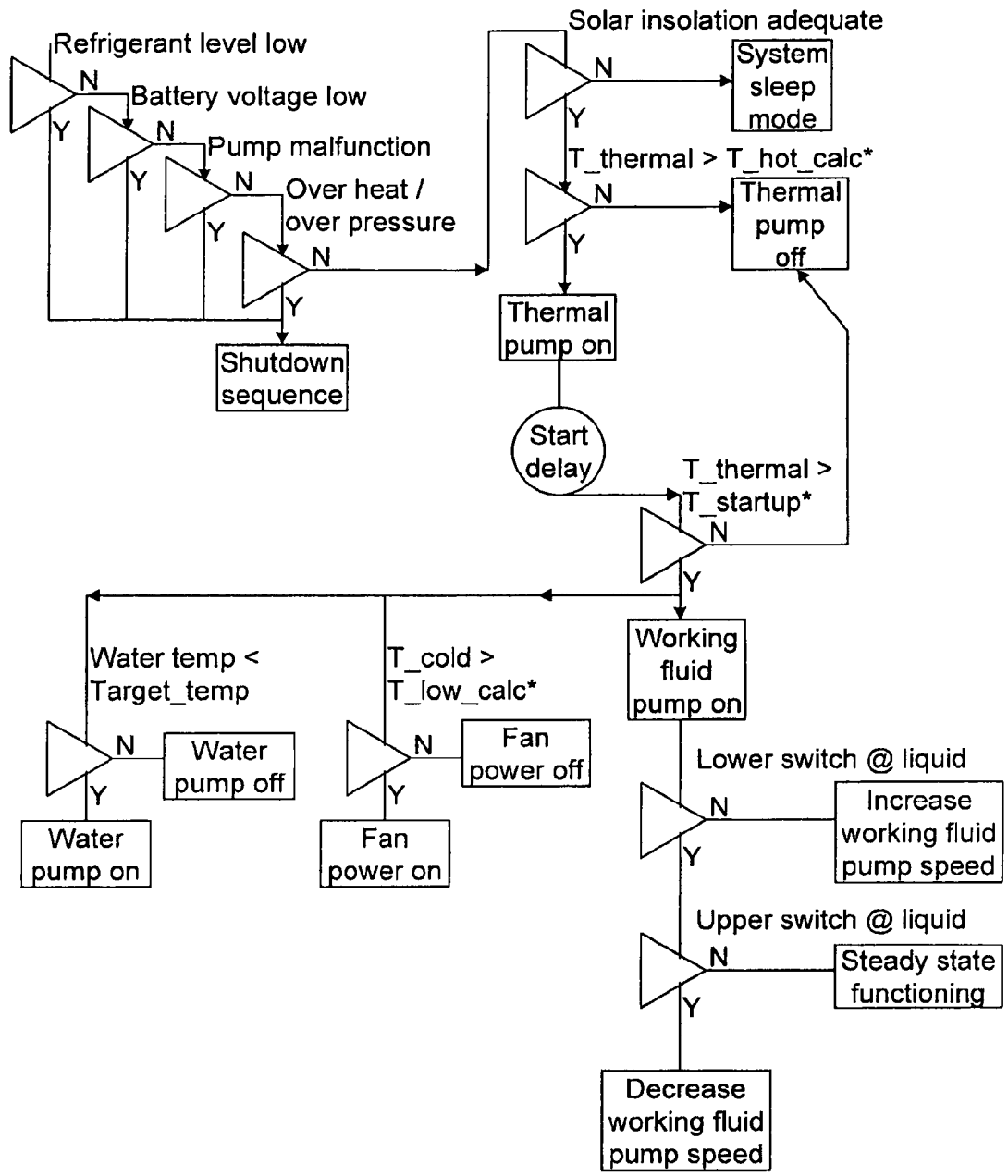
FIG. 10 is a logic flow diagram for the control system of FIG. 9.

FIG. 10 provides an overview of the system logic of a control module in accordance with various embodiments of the invention. The diagram illustrates the system control logic as it relates to input parameters, output parameters, and system state description in accordance with certain embodiments of the invention. Logic flows from top to bottom, and changes in logical state propagate immediately. Each of the nodes is described in more detail below. Solar tracking circuit power (not shown in FIG. 10) is ON except in the shutdown condition described in more detail below. All threshold values indicated refer to circuits with hysteresis; indicated values trigger the upwards transition, while the downwards transition is governed by a threshold offset by less than ten percent of the indicated value. Threshold values marked with an asterisk are variable and calculated based on ambient air temperature. Target water temperature is static and set at system construction, but can be manually changed at any time.

Figure 11:
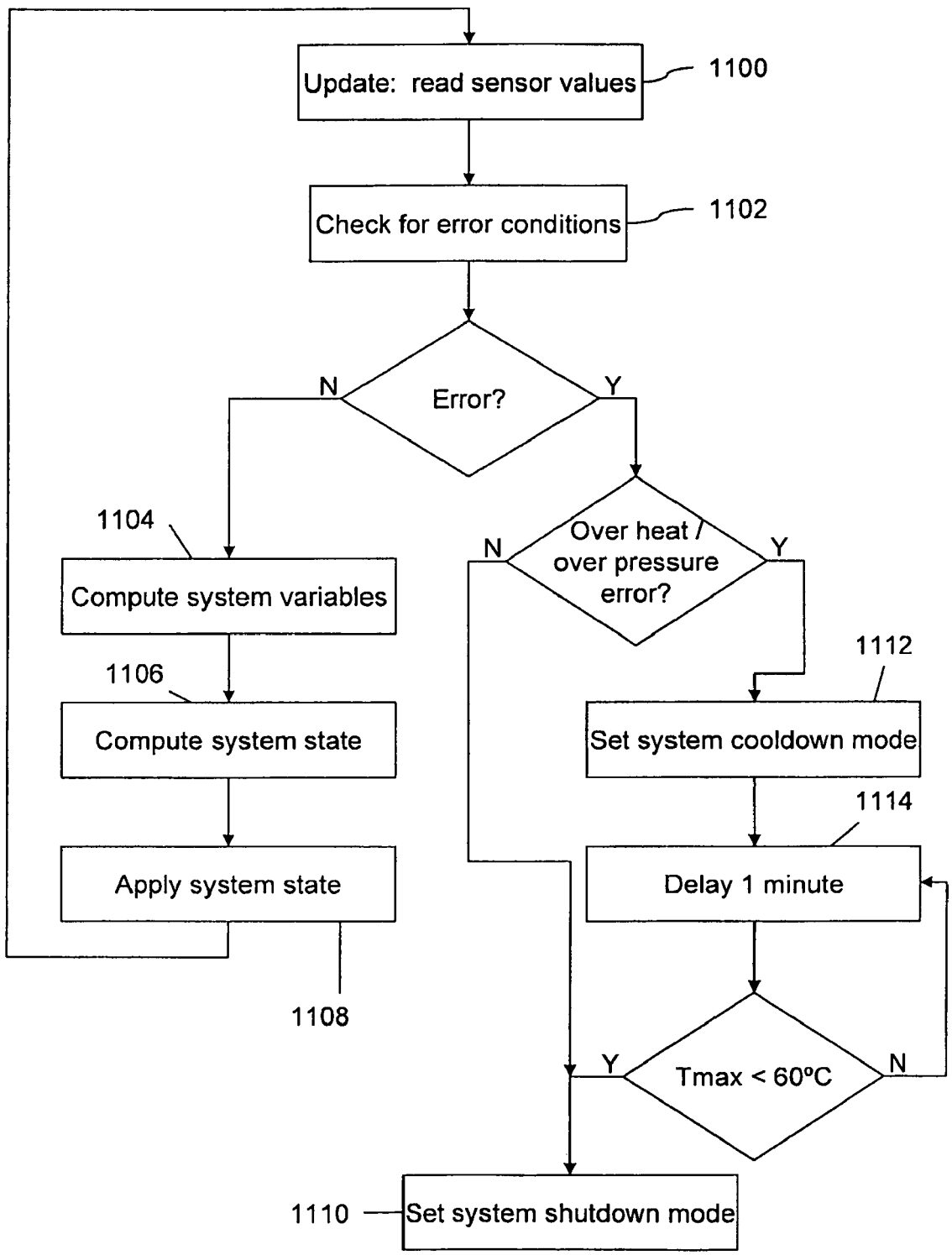
FIG. 11 is a flow diagram depicting an operational algorithm for the control system of FIG. 9.

FIG. 11 is a flow diagram illustrating the relative order of control steps in more detail. The control module frequently reads sensor values (step 1100) and checks for error conditions (step 1102). If no error occurs, the control module computes system variables (step 1104) and system state (step 1106), and applies the system state (step 1108). It then updates the sensor values (1100), thereby returning to the beginning of the control loop. If any of the error conditions is met, the system shuts down (step 1110). In the case of an overheat or overpressure error state, the system is first set to cooldown mode (step 1112), and shutdown is repeatedly delayed for a specified period of time (e.g., 1 minute) until the temperature falls below a threshold (e.g., 60° C.). In other cases, the system may be fully shut down immediately.

Figure 12A:
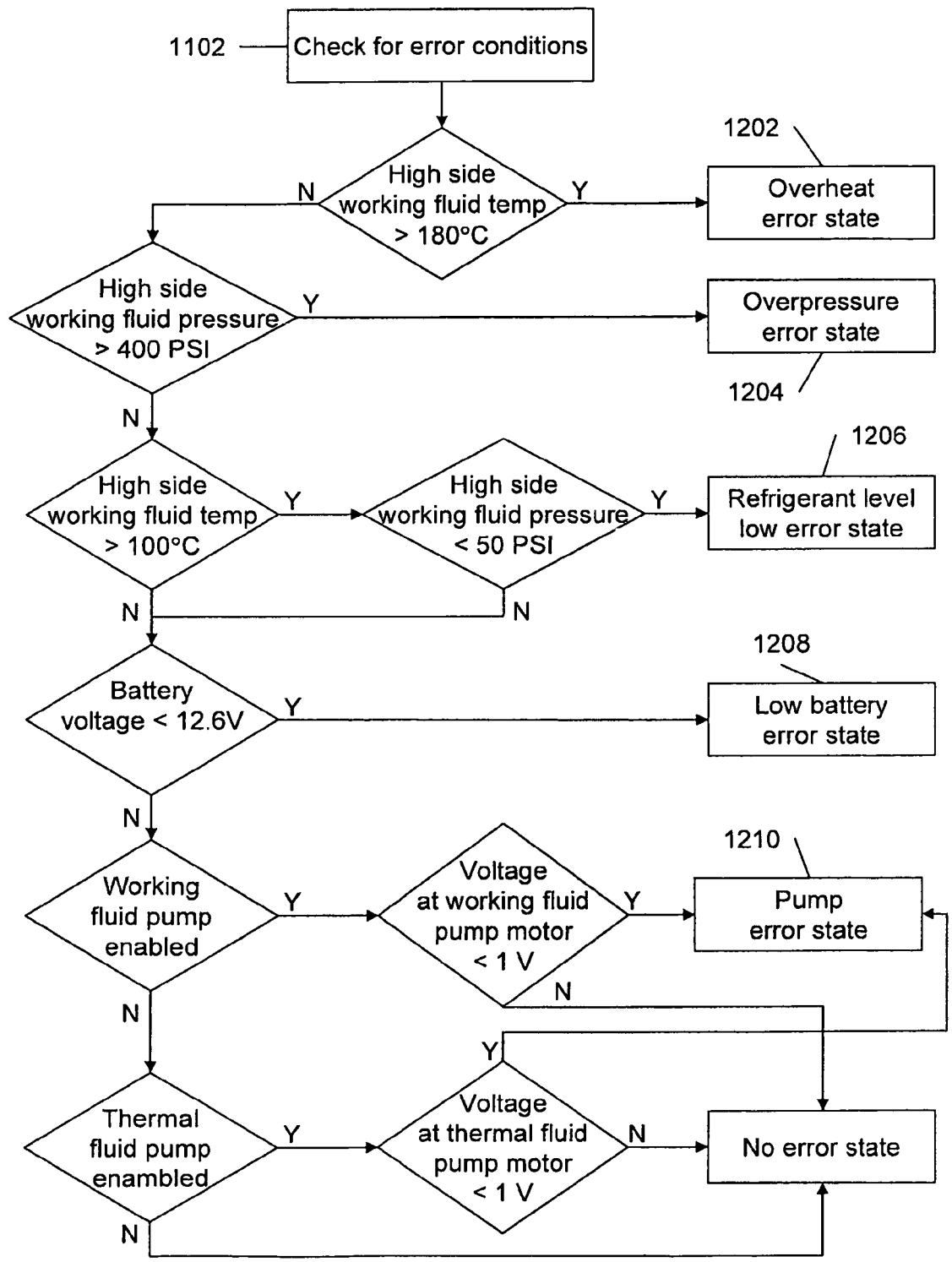
FIG. 12A is a flow diagram depicting an error condition check module of the operational algorithm of FIG. 11.

FIG. 12A details the error condition check 1102, and provides exemplary threshold values of input parameters (as listed in TABLE 4) based on which error conditions are determined. Other threshold value may also be utilized, as desired for a particular application, in the control systems depicted in FIGS. 12A-14D. If the working fluid in states 600c exceeds temperature of 180° C. or a pressure of 400 psi, the system is in overheat state 1202 or overpressure state 1204. If the high-side working fluid temperature is above 100° C. and the pressure is at the same time below 50 psi, the refrigerant level is in a too low state 1206. A battery voltage smaller than 12.6 V constitutes a battery error state 1208. If the working fluid or thermal fluid pump is enabled, but the voltage of the corresponding pump motor drops below 1V, a pump error state 1210 occurs.

Figure 12B:
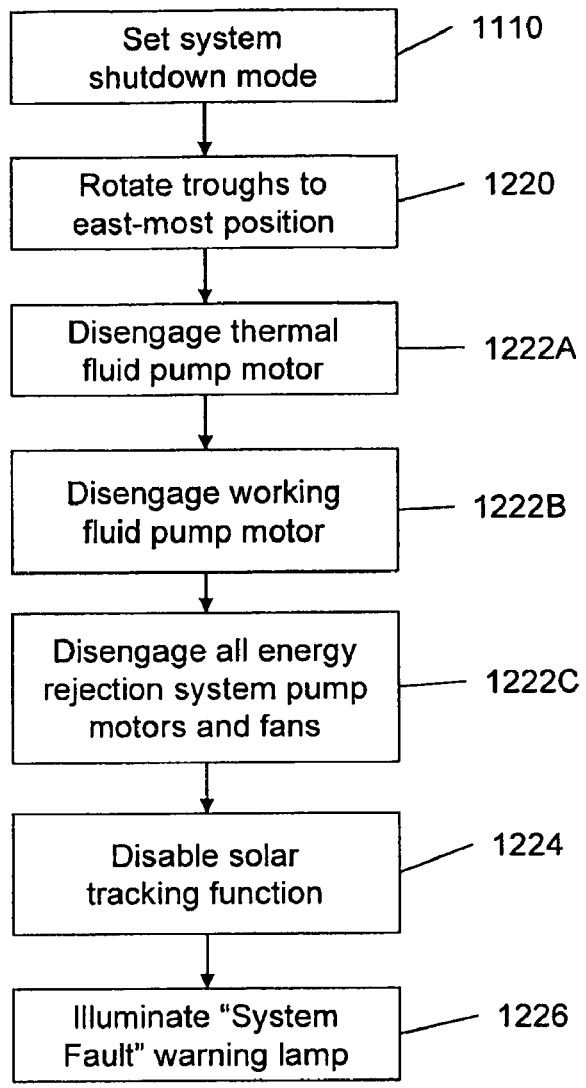
FIG. 12B is a flow diagram depicting a shutdown mode module of the operational algorithm of FIG. 11.
Figure 12C:
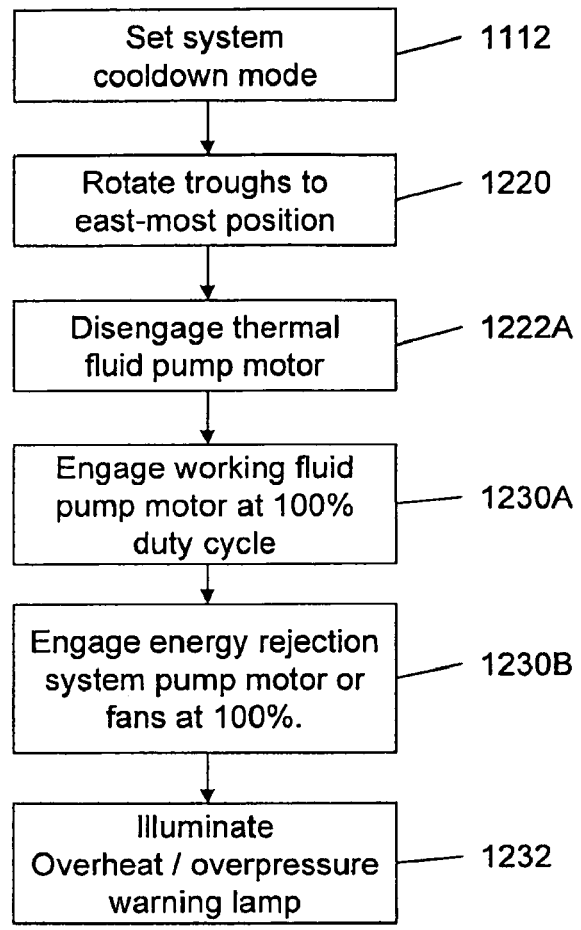
FIG. 12C is a flow diagram depicting a cooldown mode module of the operational algorithm of FIG. 11.

FIG. 12B illustrates an exemplary shutdown sequence. Once shutdown mode is set (step 1110), the solar tracking system rotates the troughs to the far eastern position (step 1220), and power is cut off from the motors driving thermal fluid and working fluid pumps, and from all pump motors and fans of the energy rejection system (steps 1222A-C). Then, the solar tracking function is disabled (step 1224), and a warning lamp indicating "system fault" is illuminated (step 1226). FIG. 12C illustrates an exemplary cooldown sequence for the overheat or overpressure error state 1202, 1204. Once cooldown mode is set (step 1112), troughs are rotated to the far eastern position (step 1220), i.e., the trough array is misaligned in order to cut heat input from the energy collection system. The thermal fluid pump motor is disengaged (step 1222A), while the working fluid pump motor and the pump motors and fans (if present) of the energy rejection system are engaged at 100% duty cycle (steps 1230A, 1230B) until an appropriately low temperature/pressure is reached in the energy conversion and energy rejection subsystems. Further, a warning lamp indicating overheat or overpressure (1202, 1204) is illuminated (step 1232).

Figure 13A:
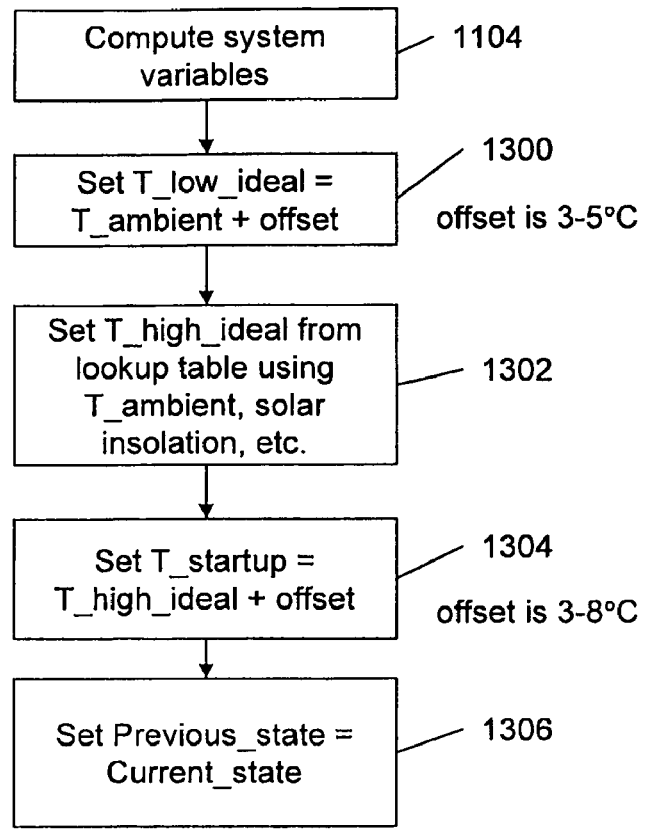
FIG. 13A is a flow diagram depicting a system variable computation algorithm of the control algorithm of FIG. 11.

If no error condition is met, the control module proceeds to compute system variables, as illustrated in FIG. 13A (step 1104). A target cold side temperature (T_low_ideal) is set, in step 1300, to be the ambient temperature plus an offset of about 3-5° C., as cooling down to the ambient temperature likely would be impractical for such a system. A target hot side temperature (T_high_ideal) is based, at least in part, on parameters such as ambient temperature and solar insolation, and is determined from a look-up table (step 1302). This temperature is the preferred sustained temperature of the fluid flowing through the vaporizer. To minimize power used to circulate thermal fluid during start-up conditions, the thermal fluid is pumped only when the temperature exceeds this threshold. A startup temperature, which provides a hotness threshold value for the thermal fluid, is set to be the target hot side temperature, plus an offset of about 3-8° C. (step 1304). Attainment of this temperature indicates that the full charge of thermal fluid has exceeded the ideal target value and that the system should sustain adequate temperatures for system functioning even after the energy conversion system is switched on and begins to remove heat from the thermal fluid via the vaporizer heat exchanger. The system state is updated in step 1306.

Figure 13B:
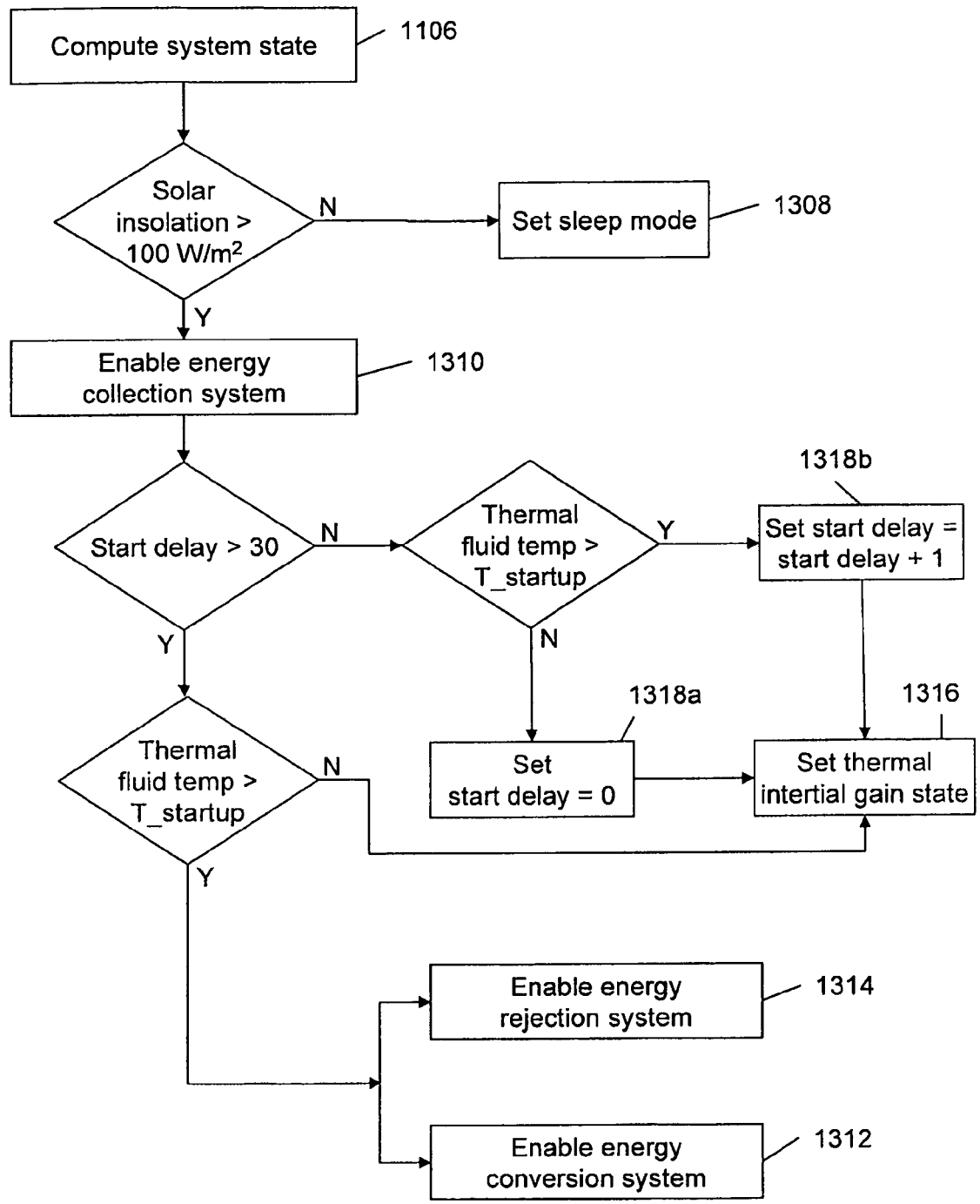
FIG. 13B is a flow diagram depicting a system state computation algorithm of the control algorithm of FIG. 11.

FIG. 13B illustrates the computation of the system state (step 1106) based on sensor input values and system variables. If solar insolation is below 100 W/m$^2$, the system enters a sleep mode to avoid unnecessary use of power in a case where insolation is inadequate for system functioning (step 1308). Otherwise, the energy collection system is enabled (step 1310), and, in particular, the thermal fluid pump is activated. When the start delay is greater than, e.g., 30 seconds, and the temperature of the thermal fluid surpasses the start temperature and remains above that threshold for a predetermined time, the system progresses into full startup mode, enabling the energy conversion and rejection subsystems (steps 1312, 1314). If the either the start delay is not larger than 30 seconds, or the temperature of the thermal fluid does not exceed the start temperature, the system is set to thermal inertial gain state (step 1316). The start delay is set to zero if the thermal fluid temperature is below the start temperature (step 1318a), and incremented up to 30 if the thermal fluid temperature is above the start temperature (step 1318b).

Figure 13C:
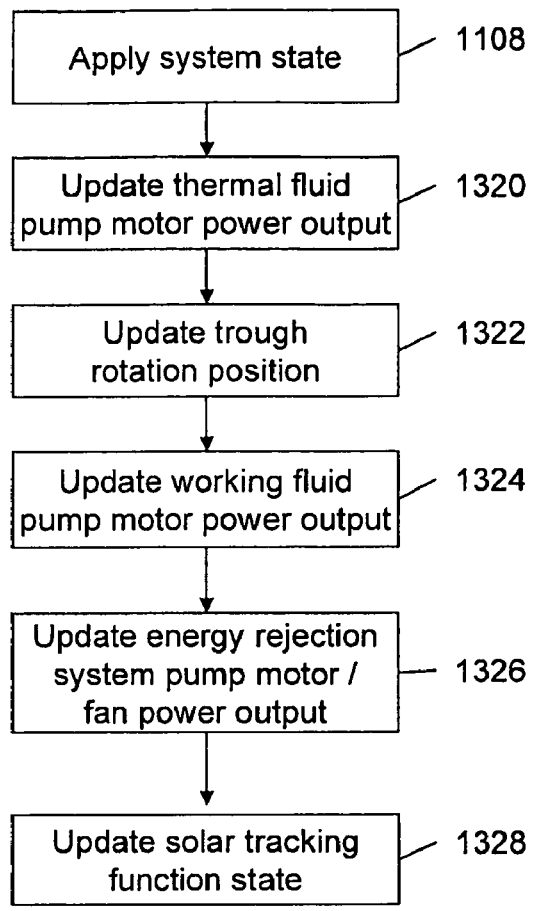
FIG. 13C is a flow diagram depicting an system state application algorithm of the control algorithm of FIG. 11.

The calculated system state is applied (step 1108), as illustrated in FIG. 13C, by updating the power output for the thermal fluid pump motor (step 1320), the trough rotation position (step 1322), the power output for the working fluid pump motor (step 1324), the power output for the pump motors and fans of the energy rejection system (1326), and the solar tracking function state (step 1328).

Figure 14A:
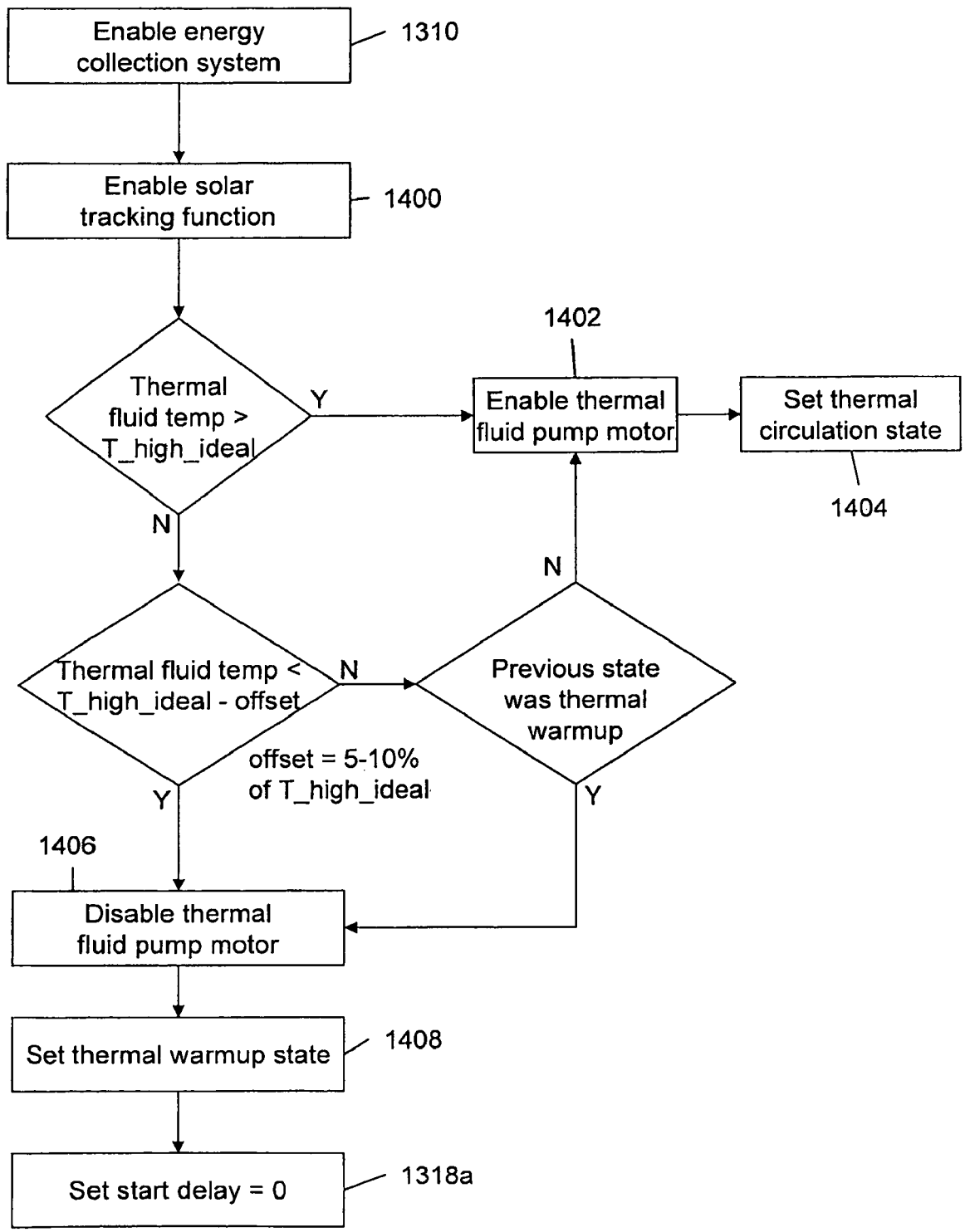
FIG. 14A is a flow depicting an energy collection subsystem control algorithm in accordance with one embodiment of the present invention.
Figure 14B:
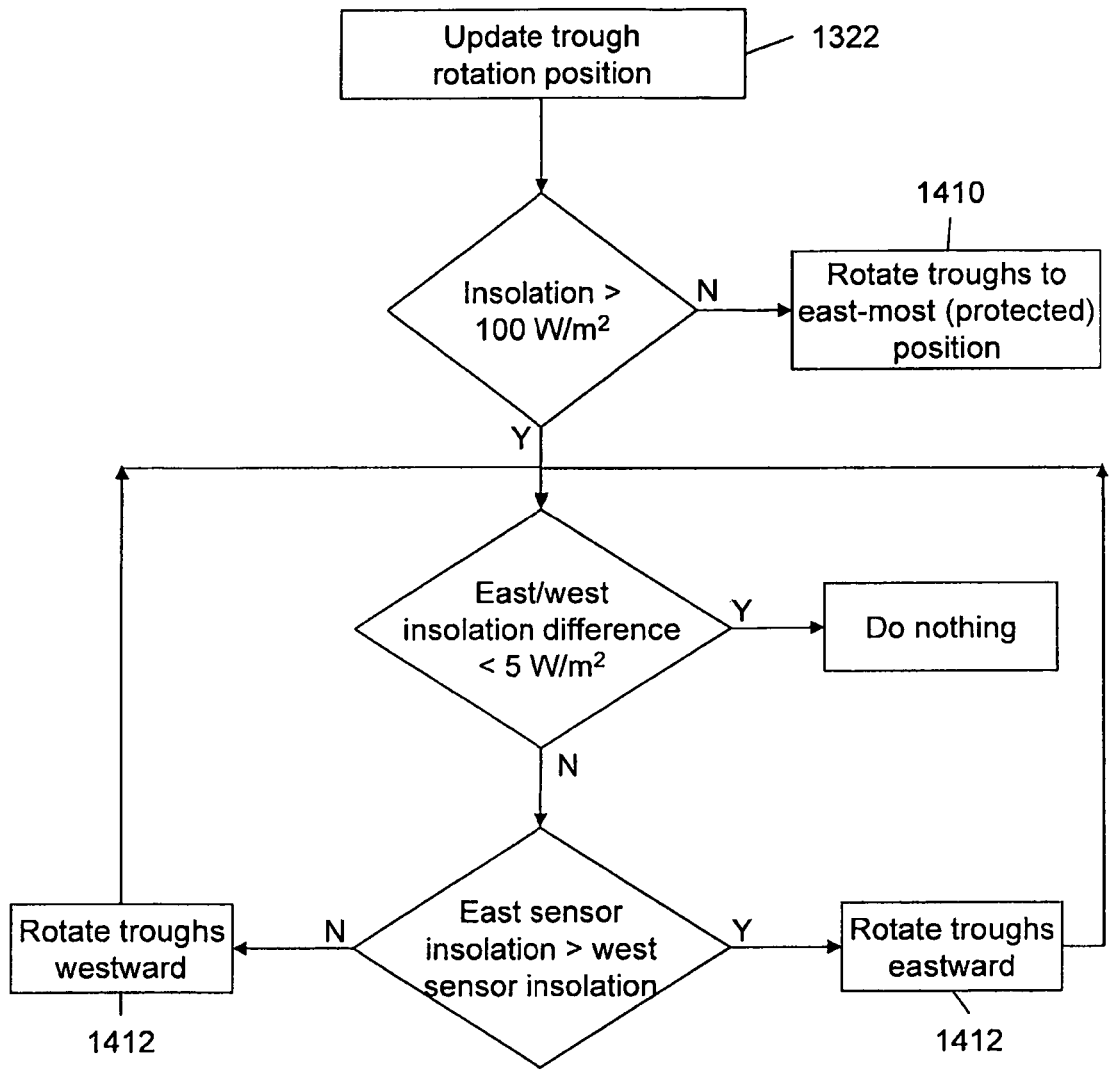
FIG. 14B is a flow diagram depicting a solar tracking control algorithm in accordance with one embodiment of the present invention.

The energy conversion efficiency is optimized through control of the subsystems, as illustrated in FIGS. 14A-D. The main control logic of the energy collection system is shown in FIG. 14A. Solar tracking function is first enabled (step 1400). If the thermal fluid temperature is above the hot side target temperature, the thermal fluid pump motor is powered (step 1402), i.e., the system assumes thermal circulation state (step 1404). If the thermal fluid temperature falls below the target hot side temperature by more than an offset of about 5-10%, the thermal fluid pump motor is disabled (1406), setting the system to thermal warm-up state (1408) and the start delay to zero (step 1318a). This built-in hysteresis provides circulation for a minimum period of time, potentially several seconds or more, allowing the fluid volume in the absorber tubes to change (i.e., flush out heated fluid and bring in cooler fluid) and minimizing power draw spikes associated with motor startup. FIG. 14B illustrates the solar tracking circuit logic. If solar insolation is below 100 W/m$^2$, the troughs are misaligned, i.e., rotated to the east-most position, for protection during inclement weather or overnight (step 1410). Otherwise, if the insolation differs by more than 5 W/m$^2$ between east and west, the troughs are rotated to face the direction of higher solar insolation (step 1412).

Figure 14C:
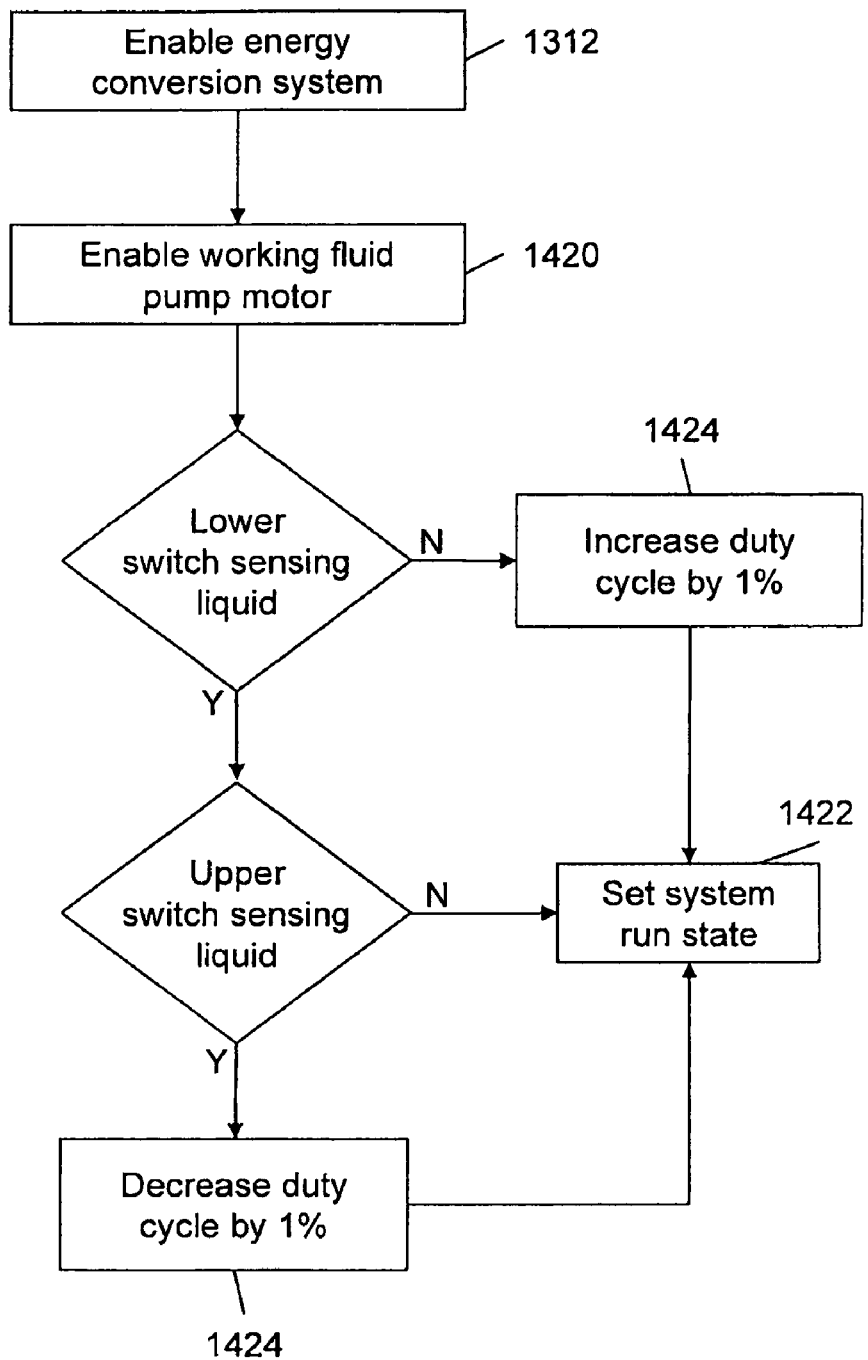
FIG. 14C is a flow diagram depicting an energy conversion subsystem control algorithm in accordance with one embodiment of the present invention.
Figure 14D:
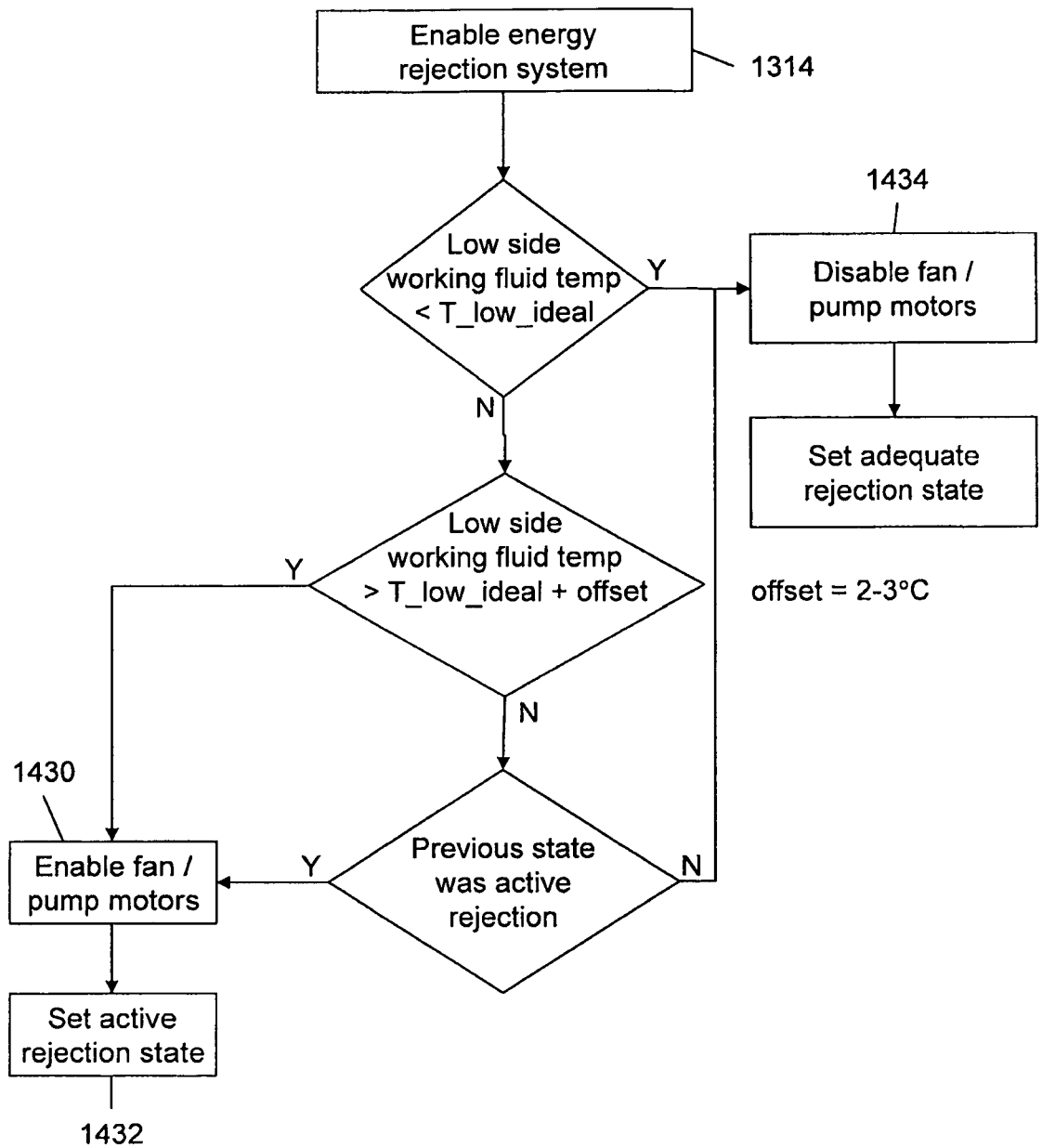
FIG. 14D is a flow diagram depicting an energy rejection subsystem control algorithm in accordance with one embodiment of the present invention.

The working fluid pump power and the energy rejection system fan and water pump powers are independently controlled by feedback loops based on input parameters measured from each subsystem, as illustrated in FIGS. 14C and 14D, respectively. The working fluid power remains ON (step 1420) until state logic upstream changes. The working pump speed is controlled based on input from two fluid level sensors. These sensors are placed physically above and below the ideal phase change boundary, such that steady state system functioning will occur when the lower switch detects liquid while the upper switch does not (step 1422). A variable speed controller is used to increase or decrease working fluid flow through increasing or decreasing working pump rotational speed to maintain this optimal state (step 1424). The state of the energy rejection system depends on the low side temperature of the working fluid. If the working fluid temperature is at least a specified offset above the target cold side temperature, pump motors and fans are powered (1430), and the subsystem is in active energy rejection state (step 1432). If the working fluid temperature is below the target cold side temperature, pump motors and fans are not powered (step 1434). Otherwise, hysteresis is used to determine power state for temperatures between these two extremes.

EXAMPLE

One particular embodiment of the invention, in the following also referred to as Microgenerator System 1 (the MS1), uses an organic Rankine cycle (ORC) in recuperative configuration and with three expansion stages to provide electricity and hot water. The system receives energy through solar collectors, and rejects waste heat to cooling water and ambient air. A control module interfacing with the ORC and solar collectors through sensors determines system operation parameters, and stores electrical energy generated in the ORC, which is in turn used to power components of the ORC and the solar collection and energy rejection systems.

In operation, the system's parabolic trough reflectors collect solar energy and concentrate it into a thermal glycol fluid. In a heat exchanger, the hot glycol transfers some of its heat to, and thereby heats and ultimately vaporizes, the cool working fluid (a refrigerant, namely R245fa) of the ORC, which passes through the heat exchanger in the opposite direction. The vaporized working fluid passes through three expander stages, each of which is a scroll compressor with flow oriented in the opposite direction to the configuration typically used. Check valves installed to promote compressor performance were necessarily removed to allow flow in this direction. When the fluid passes through the expanders, it causes them to spin. The expanders then turn alternators via a belt and pulley system, which generate electricity and charge a bank of batteries.

The fluid is condensed in three stages: first, it passes through the recuperative heat exchanger where it transfers heat to working fluid that is coming from the pump; second, it passes through a water heater heat exchanger where it heats water that will be stored for consumption; and finally, it passes through a series of radiators where it is air cooled. After condensation, the fluid is returned to the pump, which pumps it through the cool side of the recuperative heat exchanger back to the vaporizer. Both the fans moving air across the radiators and the pump motor draw energy from the battery bank.

The ORC is outfitted with instrumentation that shows pressure and temperature after vaporization, expansion, condensation, and pumping, which serves to inform engineers and technicians of the performance of the engine.

Figure 15:
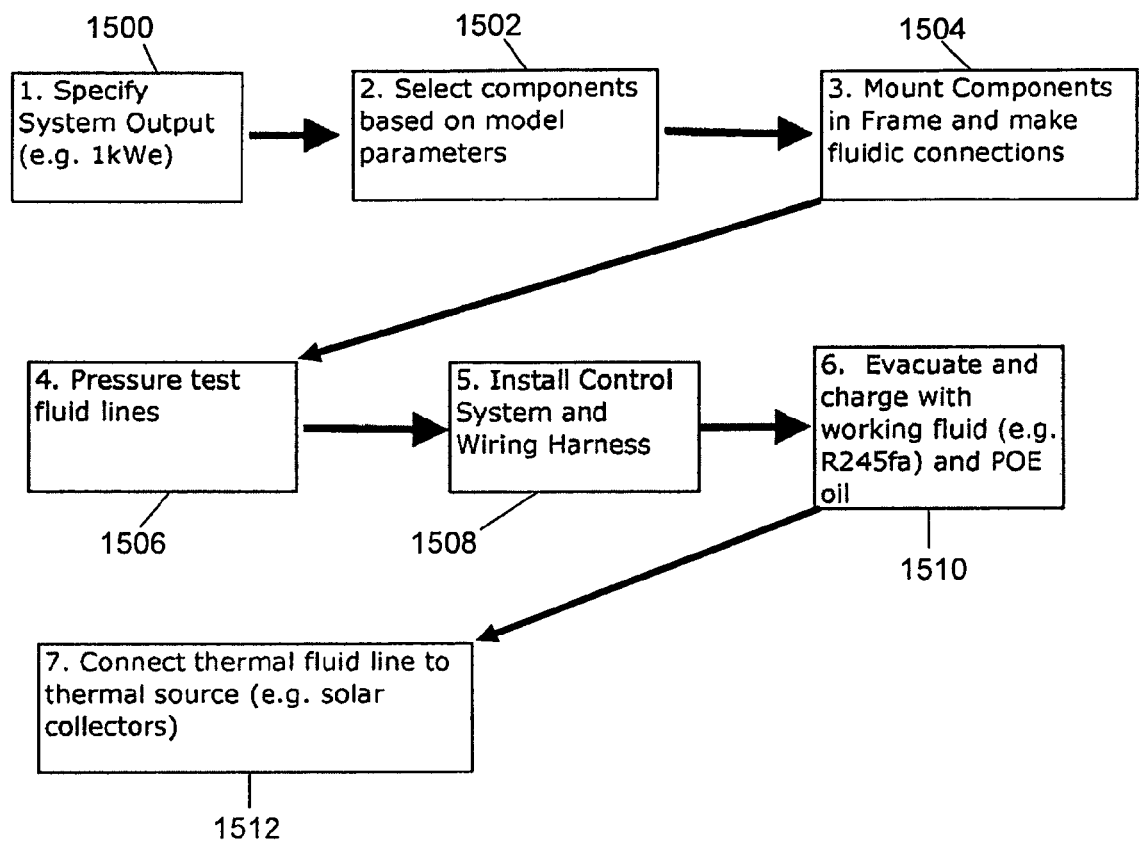
FIG. 15 is a work flow diagram illustrating the steps for constructing an energy collection and conversion system in accordance with one embodiment of the invention.

The ORC may be designed and constructed according to the work flow plan shown in FIG. 15. In a first step 1500, the power output of the system is specified by a user. Then, in step 1502, system components are selected based on model parameters, e.g., utilizing the model specifications listed in TABLE 6, below, which help ensure high thermodynamic performance at a reasonable cost. The components are subsequently mounted, and fluidic connections are made (step 1504) and pressure-tested (step 1506). Step 1508 includes the installation of control system and wiring harness, and the system is then evacuated and then charged with the working fluid (step 1510). Finally, the thermal fluid line is connected to the thermal source (e.g., the solar connectors) in step 1512. Construction of the MS 1 is described below, as are other factors considered, but not necessarily applied, during construction of similar systems.

TABLE 6

Exemplary system components with specifications

| Example System | OEM Part | Model Specification |
| --- | --- | --- |
| Vaporizer | ITT BrazePak ™ BP-430 | 15 kW thermal input |
| Expanders | Sanden TR5090 | 2.2 Expansion Ratio, Stage 1 flowrate: 30 LPM, Stage 2 flowrate 80 LPM, Stage 3 flowrate 200 LPM |
| Condenser (air-cooled) | Carrier 09AWL006-20 | 18 kW thermal rejection |
| Heater (water) | ITT BrazePak ™ BP-410 | 3 kW thermal transfer |
| Recuperator | ITT BrazePak ™ BP-410 | 3 kW thermal transfer |
| Working Fluid Pump | Saginaw TC Power Steering | 3 LPM flowrate at 300 psi |
| Thermal Fluid Pump | Vickers VF-10 Power Steering | 30 LPM flowrate at 45 psi |
| Generator | Bosch AL9960LH Alternator | 12VDC 130 A output |
| Batteries | UB 91010 AGM Sealed Lead Acid | 400 ah storage |
| Drive motors | 0.5 hp 12VDC brush motors | Working fluid pump 180 W, Glycol pump 100 W |

To prevent the working fluid from leaking into the atmosphere, the ORC must be completely sealed; therefore, prior to the assembly of the system, all components (i.e., pump, expanders, radiators, and heat exchangers) need to be leak tested up to pressures expected in typical system function. If pump or expander shafts are leaky, they need to be replaced; all other parts can alternatively be replaced or sealed. The individual components further need to be tested for proper performance of their respective functions. This includes determining the relative fluid inlets and outlets, and the directions of rotation of expanders and pumps, as well as the pump flow rates. Pump flow rates can be measured on a test mount by fitting pulleys onto the shafts of pump and motor, and coupling pump and motor with a belt that mates with the pulleys. In certain cases, a hole in the pulley is drilled out to match the diameter of the shaft, allowing the shaft to be press fitted. Alternatively, or additionally, the set screw provided in the pulley may be adjusted. The ratio of the diameter of the pump pulley to the diameter of the motor pulley will determine the pump flow rate. The desired flow rate can be set by adjusting the ratio of the diameters of pump and motor pulleys. If the pump needs to spin at the exact speed as the motor, and can spin in the opposite direction thereof, flexible shaft couplings may be used, which require fairly precise alignment between the shaft of the motor and the shaft of the pump. Pump flow rates for the MS1 are determined for the pumps of both the working fluid of the conversion system and the thermal fluid of the collector system.

Figure 16:
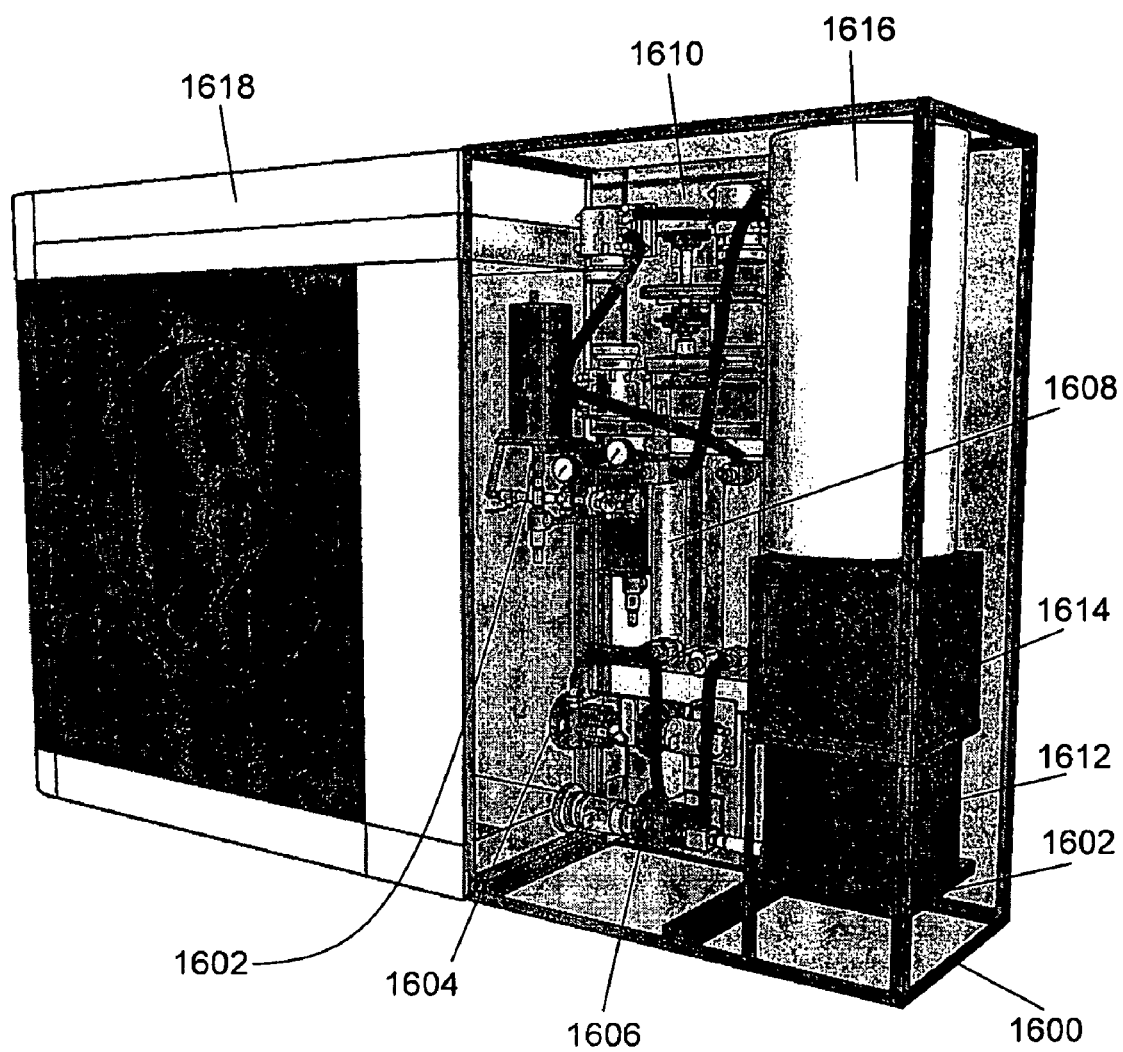
FIG. 16 is a perspective view of a system configuration in accordance with an embodiment of the invention.

An exemplary layout of the ORC, similar to that utilized in construction of the MS1, is illustrated in FIG. 16. The figure shows a supporting structure consisting of a frame 1600 and mount plates 1602, holding the glycol pump 1604, the working fluid pump 1606, the vaporizer 1608, the triple expander module 1610, the battery bank 1612 and control module 1614, the water heater 1616, and the air-cooled condenser 1614. Layout considerations include the accessibility of components and fittings for the purpose of replacement or adjustment, and the serviceability of the individual components. The frame of the construction shown in FIG. 16 is welded from 25 mm square tubing and angle iron. The various component mounts are made of aluminum plate and steel plates. Aluminum is advantageous in that it can easily be machined; however, it is more expensive than steel and may also deform over time.

Before the system is assembled, fittings are installed into the major components with a thread sealant, and the components are again leak tested. Fittings are re-sealed as necessary. The sealed components with fittings are then mounted to the frame. Flat washers are used on the bolt side to prevent deformation of the frame tubing; both flat and split washers are used on the nut side to prevent the nuts and bolts from loosening from vibrations. After mounting, the components and instrumentation are plumbed.

The ORC must be both protected from the elements and be accessible after its construction and installation. Both can be achieved by surrounding the ORC with a closed housing including doors with vents to allow for air flow ventilation. Once the ORC is fully installed, it can be plumbed to the parabolas and wired to the control system.

Figure 17:
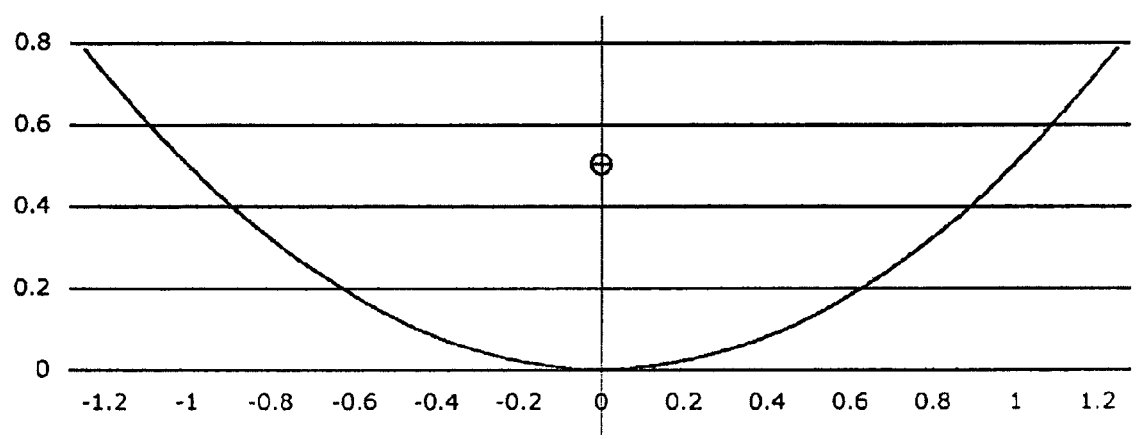
FIG. 17 is a graph depicting geometry for a trough of a solar collection system in accordance with one embodiment of the invention.

The MS1 energy collection system includes four trough solar collectors which focus incoming sunlight on a focal line, using a mirror shaped with the geometry of a parabola, i.e., according to the formula $y=x^2/4p$ (where p is the focal point), as illustrated in FIG. 17. A pipe is placed in the focal line, so fluid flowing through the pipe is heated by the concentrated sunlight. Parabolic solar trough collectors exist in many possible configurations; TABLE 7 contains the main model parameters of one embodiment.

TABLE 7

Model parameters of solar collector system

|  | Metric units | Imperial units |
| --- | --- | --- |
| Trough length | 3.20 m | 10.50 ft |
| Trough width (tip to tip) | 1.63 m | 5.33 ft |
| Focus | 0.40 m | 1.31 ft |
| Sheet length | 3.20 m | 10.50 ft |
| Concentration ratio | 36 |  |
| Width of sheet along parabola | 1.87 m | 6.14 ft |
| Absorber diameter | 0.05 m | 1.78 inches |
| Aperture area | 5.20 m² | 55.94 sq ft |
| Number of troughs | 4 |  |
| Number of arrays | 1 |  |
| Total array area | 20.80 m² | 223.77 sq ft |

The parabolic trough array includes the following subsystem level structural components: the base frame, the gimbled frame, and the parabolic troughs, as described in more detail above. In addition to the structural components, the trough array contains a cable linkage for synchronized trough movement, a thermal fluid manifold connecting the parabolic trough absorbers in series to the ORC, and a wiring harness that links the tracking sensor, tracking motor, and temperature sensor to the control system of the ORC. Construction of the parabolic trough array can be undertaken with the major structural components built in parallel, followed by assembly of all the sub-components into the super-structure. The addition of the cables, fluid manifold, tracking system and wiring harness can occur only after the super-structure has been assembled.

The construction of the triangular base frame involves cutting, drilling, welding, painting, and assembling of the various pieces. Several pieces can be built in parallel. TABLE 8 provides a list of base frame pieces and their respective dimensions in an order which, if followed during manufacture, enables efficient flow of the various pieces through the tasks that follow.

The four parabolic trough frames are built on a mould or jig of true parabolic geometry and with support for the absorber tubes at the focal point. Correct placement and orientation of the parts of these frames ensures optimal optical properties of the parabolic array. The mould may be built according to the following procedure. First, a parabolic section of plywood is manufactured by printing a sheet of paper with the correct dimensions for a 40 cm focal point parabola; taping the template to a section of plywood and carefully cutting the line with a band saw and, if necessary, rasping, planing, and sanding down to the line. The final parabolic section can be used as a template for cutting eight duplicates out of plywood,

TABLE 8

List of base frame pieces in preferable order of manufacture

| Component description | Stock type | Dimension Length (long side) | Thickness Length (short side) | Quantity | Cut Angles |
|---|---|---|---|---|---|
| Triangular base member | 120 × 55 mm C section | 1925 mm | 1865 mm | 3 | 60 degrees, 90 degrees |
| Triangular base member (bottom and side) | 120 × 55 mm C section | 2000 mm | | 6 | 90 degrees |
| Rear stop | 120 × 55 mm C section | 1225 mm | 1081 mm | 3 | 47, 75 degrees acute from long side |
| Lateral base beam | 50 × 50 mm square tubing | 5475 mm | | 2 | 90 degrees |
| Rear support member | 50 × 50 mm square tubing | 1880 mm | | 3 | 90 degrees |
| Rear support member | 50 × 50 mm square tubing | 1900 mm | | 1 | 90 degrees |
| Bearing flange | 10 mm steel plate | 100 × 200 mm | 10 mm | 6 | 90 degrees |
| RS A flange | 5 mm steel plate | 120 × 130 mm | 5 mm | 4 | 90 degrees |
| RS B flange | 5 mm steel plate | 50 × 200 mm | 5 mm | 2 | 90 degrees |

The construction of the gimbled frame also involves cutting, turning, drilling, welding, painting, and assembling the various pieces. TABLE 9 provides a list of gimbled frame pieces and their respective dimensions in an order which, if followed during manufacture, enables efficient flow of the various pieces through the tasks that follow.

and tracing the section cut of the template with the band saw. For verification of their congruence, the nine parabolic sections are then clamped together, and if necessary, the edges are planed or sanded. The parabolic sections are connected with squares cut out of plywood, and a piece of pipe through the focal point is used to align them with respect to each other.

TABLE 9

List of gimbled frame pieces in preferable order of manufacture

| Component description | Stock type | Dimension Length (long side) | Thickness Length (short side) | Quantity | Cut angles | Comment |
|---|---|---|---|---|---|---|
| Front C section | 120 × 55 mm C section | 8050 mm | | 2 | 90 degrees | Since this length is greater than the standard 6 or 6.5 m length, two pieces must be welded together to equal this amount. |
| Longitudinal beam C (LBC) section | 120 × 55 mm C section | 3400 mm | | 3 | 90 degrees | |
| Angle D flange | 120 × 55 mm C section | 55 × 60 × 120 mm | | 12 | 90 degrees | These angels are made by cutting 120 mm long pieces of C section in half. |
| Bearing flange | 10 mm steel plate | 40 × 150 mm | 10 mm | 8 | 90 degrees | |
| Tracking motor mount | 5 mm steel plate | TBD based on motor | | 1 | 90 degrees | This piece will need to be designed based on the tracking motor sourced. |
| Bearing pipe | 88 mm pipe | 295 mm | | 3 | 90 degrees | |
| Triangle Supports | 10 mm steel plate | 120 × 120 mm | 10 mm | 6 | 90, 45 degrees | 120 mm squares are cut on the diagonal to make triangles. |

With the gimbled frame correctly mounted and locked into position on the base frame, the troughs can be mounted on the gimbled frame by lifting them into position and bolting the bearings. The tracking wheels around the axles of the trough frames should all be facing towards the front of the array. With all four troughs mounted, they should slide in the bearings to allow for alignment of the four tracking wheels in plane with each other. Once this is done, the troughs can be locked in position by tightening the set screws on the bearings.

The absorber manifold consists of four 40 mm galvanized pipe sections mounted in the focal line of the parabolic troughs, connected in series by insulated flex hose and copper pipe mounted to the gimbled frame. All the NPT connections in the absorber manifold are sealed with TEFLON® tape. The absorber pipes are painted with high heat resistant black matte paint, or a special selective coating such as SOLKOTE® by SOLEC for glass tube sheathed absorbers. At the terminal ends of the thermal fluid manifold, two ball valves are threaded so that the system may be filled independent of the ORC, and so that the ORC can be removed from the fluid loop for servicing without a need to drain the whole manifold.

The thermal loop is preferably filled with pure ethylene glycol. Upon installing the ORC, more fluid may need to be added since the fluid loop of the ORC will be empty. To do so, the troughs are raised to the winter position (if using a dual-axis trough configuration); and, after pumping the fluid for a few minutes, letting the system rest for a short period of time, and topping up the glycol, the system should be bled of air.

The parabolic trough array, once constructed, should operate without daily supervision: the tracking system is designed to automatically track the sun during the day, set the parabolas facing east after sunset, and start up in the morning. The control system of the ORC will actuate the thermal loop circulation pump when conditions are right for power generation. Operating the ORC consists of periodic checks of the ORC display panel; if operation is normal, no warning lights are lit. From month to month, the array will need to be rotated about the east-west axis to follow the suns azimuth (the degrees above horizon of the sun at its zenith). The array can be rotated by loosening three locking clamps at the rear of the frame, which lock the gimbled frame to the base frame, and then by adjusting the hand winch at the front of the base frame to pull down the front of the gimbled frame. For a location such as Lesotho in South Africa, the angles in TABLE 10 can be used on a monthly basis, or else the angle can be estimated around noontime so that the gimbled frame is normal to the sun rays.

TABLE 10

Sun azimuth in Lesotho, South Africa, and corresponding trough angles by month

| Month | Sun azimuth (degrees above horizon) | Trough angle |
|---|---|---|
| January | 76.4 | 13.6 |
| February | 70.74 | 19.26 |
| March | 63.28 | 26.72 |
| April | 53.07 | 36.93 |
| May | 43.42 | 46.58 |
| June | 36.62 | 53.38 |
| July | 35.32 | 54.68 |
| August | 40.13 | 49.87 |
| September | 49.93 | 40.07 |
| October | 61.65 | 28.35 |
| November | 72.71 | 17.29 |
| December | 78.2 | 11.8 |

The control module controls the system to determine when different parts of the ORC should operate to maximize energy production (and minimize parasitic losses). The control system thus interacts with the other major subsystems (the parabolic troughs and the ORC) through their electrical components (motors, fans, etc.). For this reason, the construction and debugging of the control system is done in conjunction with construction and debugging of the other sub-systems.

Figure 18:
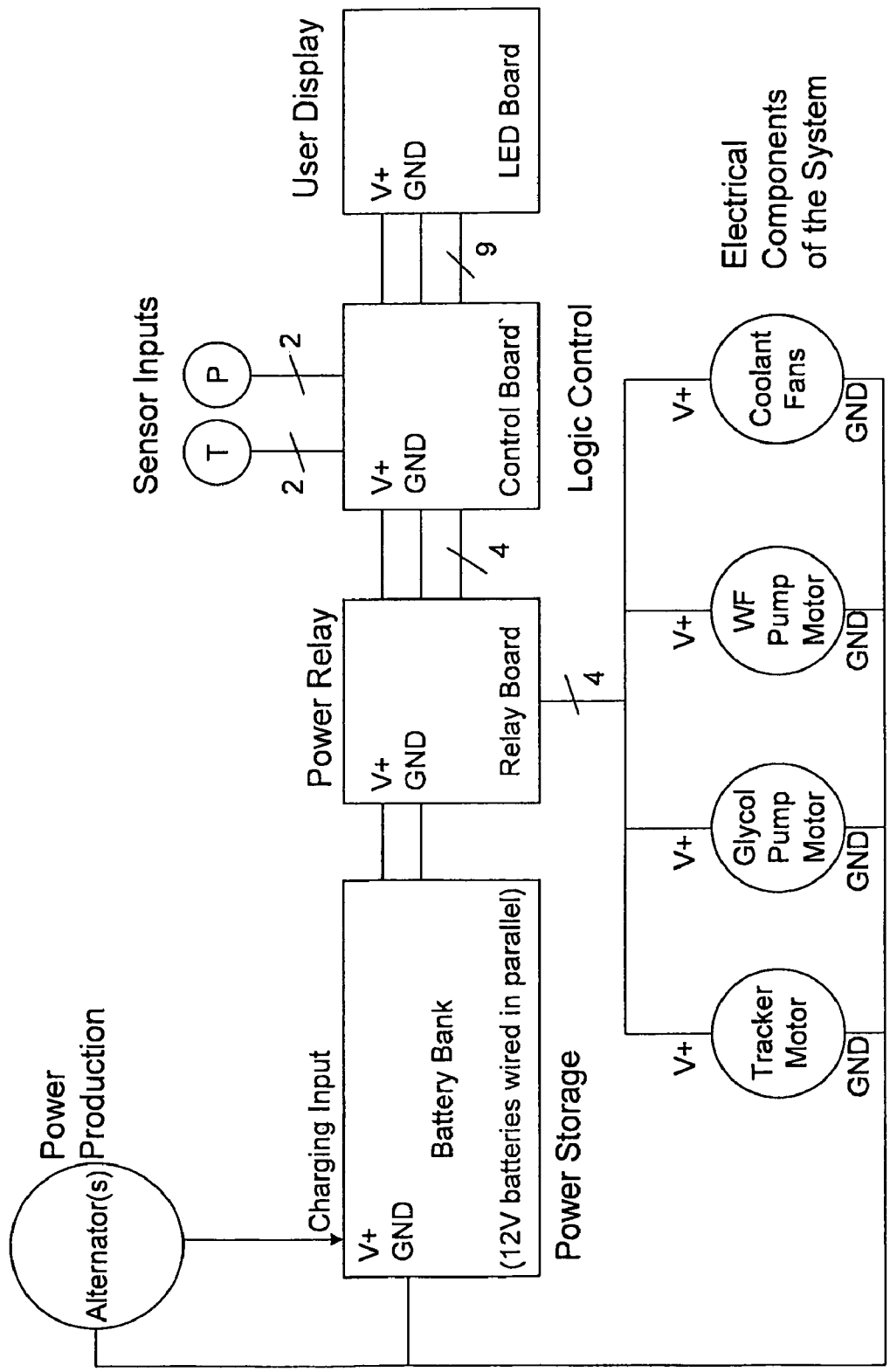
FIG. 18 is a schematic control module diagram in accordance with one embodiment of the invention.

FIG. 18 details the various components of the control module and their interaction. As a result of a conceptual overlap between control module and ORC, the figure includes electrical components also found in the ORC. The control module has components for each of the following: power production, power storage, power relay, logic control, and user display. Power is produced at the alternators and used to charge the battery bank. The relay stage distributes power from the batteries to the rest of the system. Sensor input is used by the logic control component to control the user display and the power distribution occurring in the power relay stage. The control board interfaces directly with the sensors, and the relay board interfaces directly with any electrical components of the parabolic troughs and the ORC.

For the MS1, the control module manages three motors (for turning the parabolic troughs to track the sun, for driving the glycol pump, and for driving the working fluid pump) and one fan (for the coolant loop). It may use, optionally, three sensors, e.g., a temperature sensor in the glycol loop, a temperature sensor in the refrigerant loop, and a pressure sensor in the refrigerant loop, to determine system state and control power distribution. The temperature sensor in the refrigerant loop may be omitted by careful calibration of the PWM circuit for the coolant fans.

Figure 19:
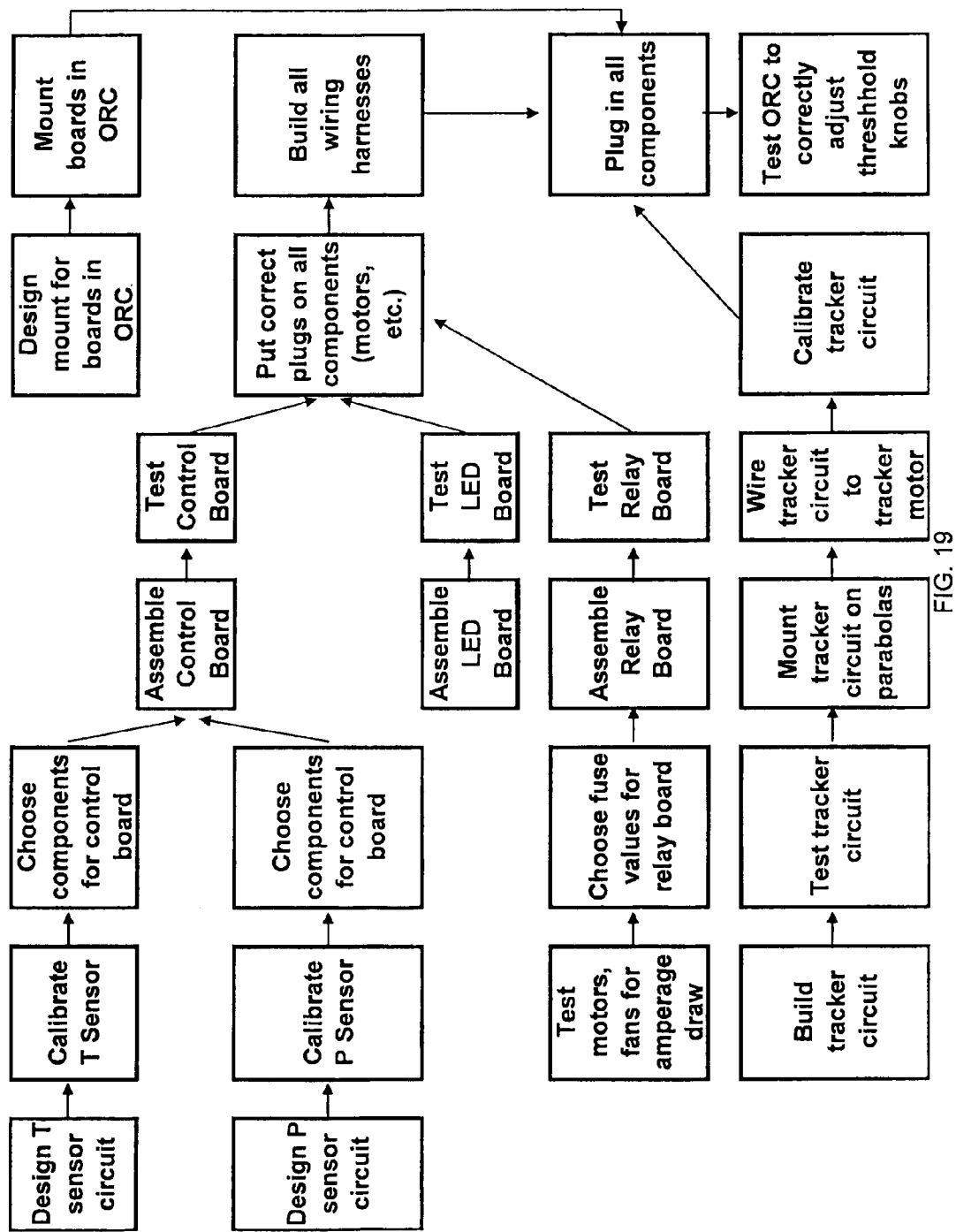
FIG. 19 is a work flow diagram illustrating steps for assembling a control module in accordance with one embodiment of the invention.

The components of the control module can be assembled, electronically connected, and tested according to the work flow diagram of FIG. 19. Therein, the paths A, B, D, E, and F may be worked through in parallel, as the associated components are virtually independent of one another.

Figure 20:
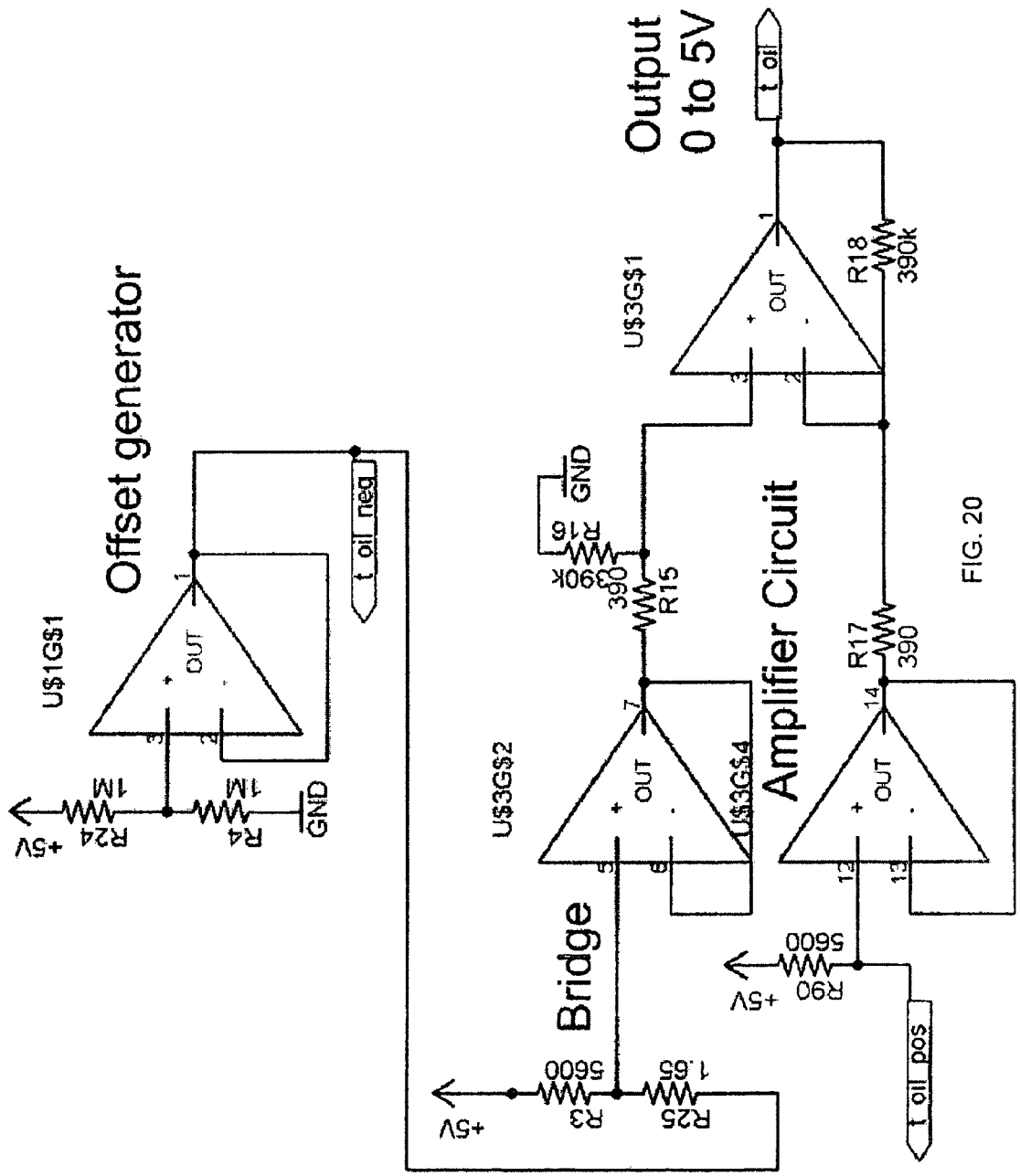
FIG. 20 is an electric circuit diagram of a temperature sensor interface in accordance with one embodiment of the invention.

Path A relates to the construction and calibration of an interface for the temperature sensor (or sensors), which converts the output signal of the sensor into a 0-5 V signal. Most temperature sensors are thermistors or thermocouples, i.e. resistors whose value changes as the temperature changes. Typically, the resistance of the sensor is very low (on the order of about 1-2 ohms), and the relationship between resistance and temperature is nonlinear. In order to overcome these two issues, a new signal is produced using a bridge circuit. The circuit used for MS1 is shown in FIG. 20. The design of this circuit depends at least on the model of sensor being used; therefore, any change in temperature sensor may require modification of this particular sub-circuit. The bridge circuit is made up of resistors R3, R25, R90, and the thermistor. The offset generator portion of the circuit re-centers the signals so that the amplifier circuit functions correctly. The rest of the circuit acts as an amplifier with gain (multiplication factor) R17/R18, which amounts to 1000 for MS1. With values as shown in the FIG. 20, input temperatures from 0 to 120 degrees C. result in output voltages within the desired range. The circuit can be used to calibrate the temperature sensor by connecting the sensor to the circuit and turning on the supply voltage, exposing the sensor to heat reservoirs of various temperatures, which can simultaneously be measured with an independent analog or digital thermometer, and reading the output voltage of the circuit, e.g., with a multimeter.

Path B relates to the construction and calibration of a circuit that converts the output of a pressure sensor into a 0-5V signal. Pressure sensors may have a range of outputs, e.g., 0-5V, 0-20 mV, or 4-20 mA. Each of these types of sensors utilize a different amplification circuit. For outputs in the 0-20 mV range, a bridge circuit is often the most appropriate. The sensor used in MS1 has a 4-20 mA output.

Path C relates to the construction of the control board, which is detailed in FIGS. 22A-F. The control board uses the sensor inputs (as built according to paths A and B) to determine which motors and/or fans should be powered at any given time, and sends the appropriate signals to the relay board. It also sends information to the LED Board to alert the user to the state of the system. Path D relates to the construction of the LED board, which displays system parameters to the user.

Figure 21:
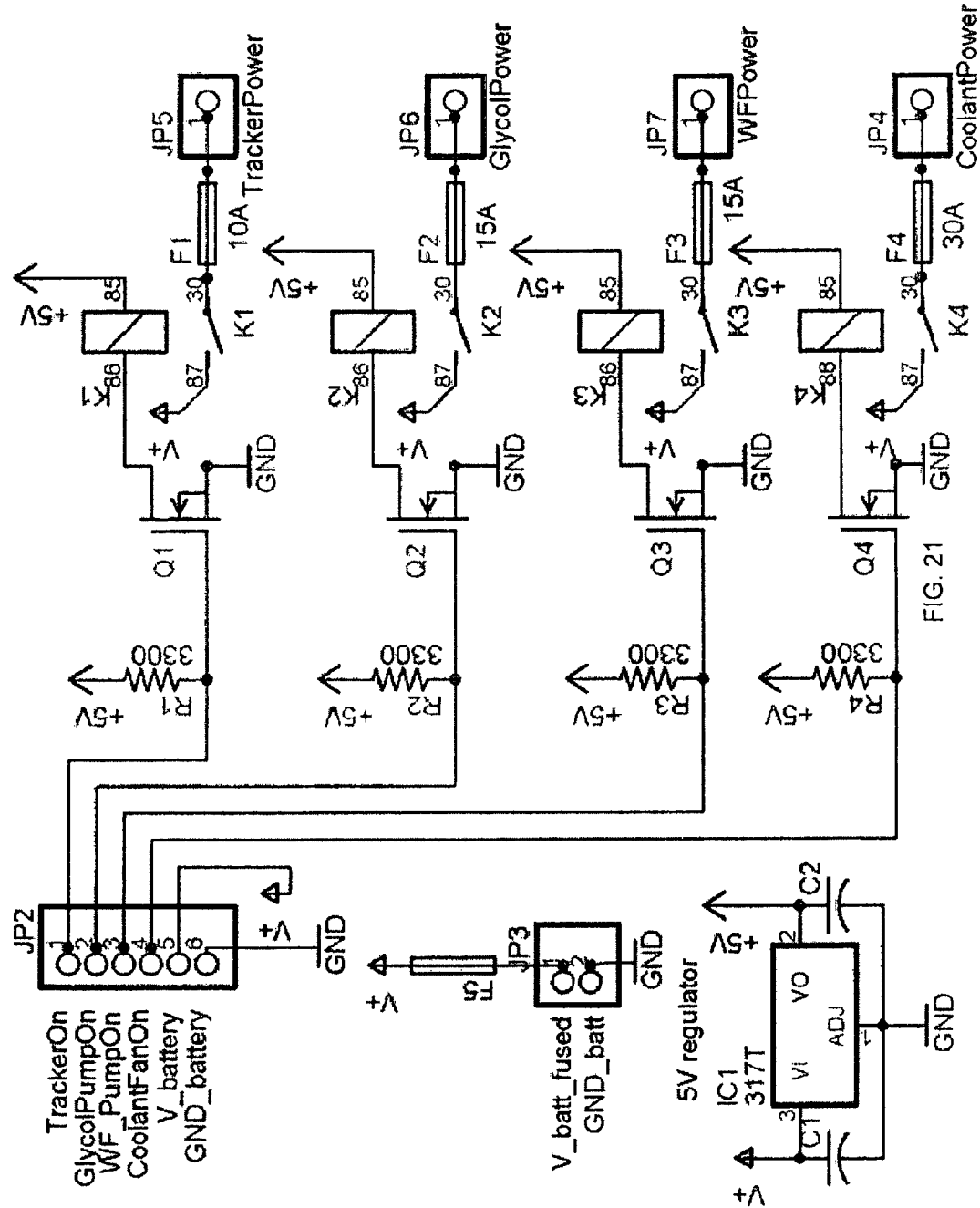
FIG. 21 is an electric circuit diagram of a relay board in accordance with one embodiment of the invention.
Figure 22A:
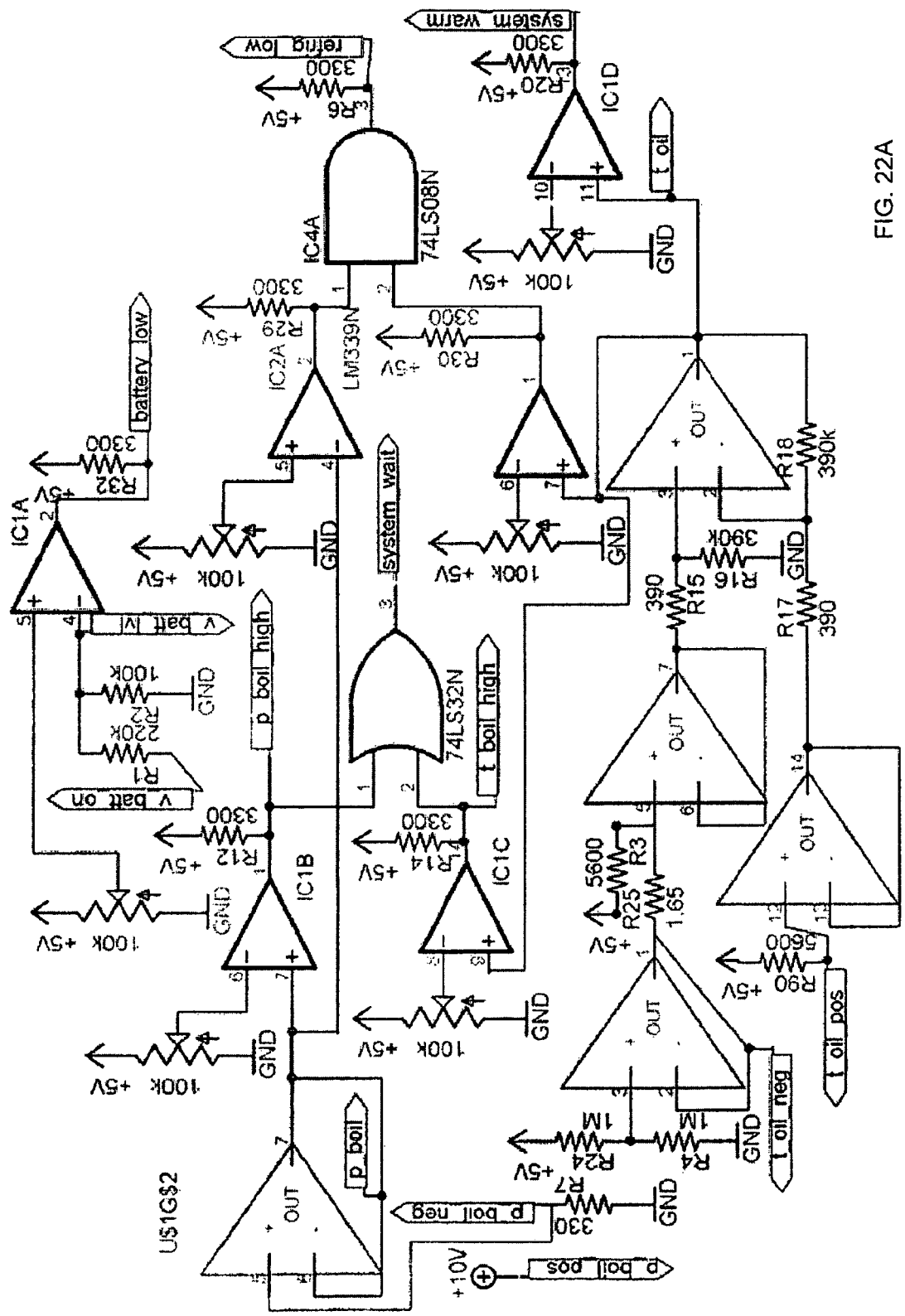
FIG. 22A-F are electric circuit diagrams of a control board in accordance with one embodiment of the invention.
Figure 22B:
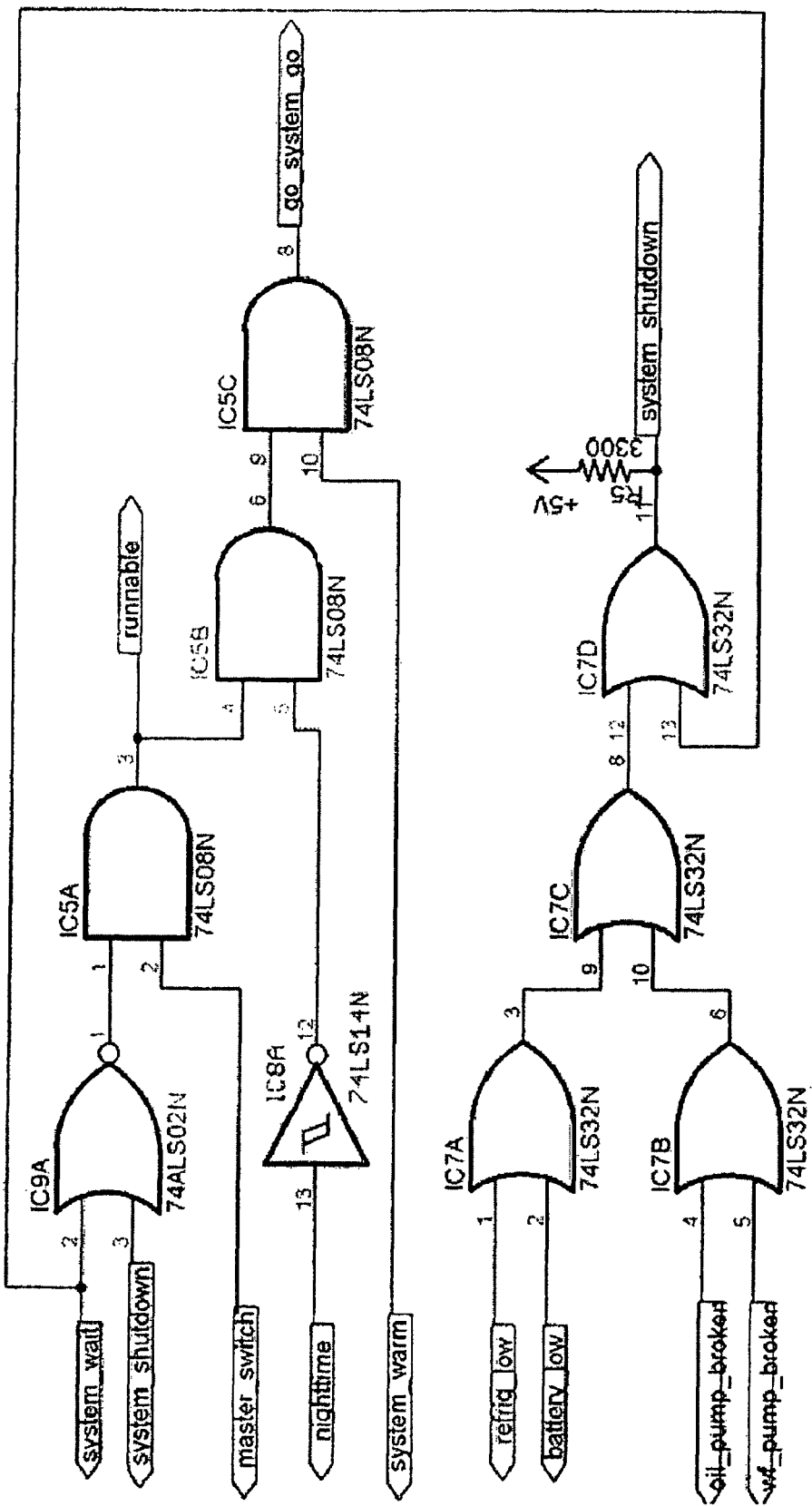
Figure 22C:
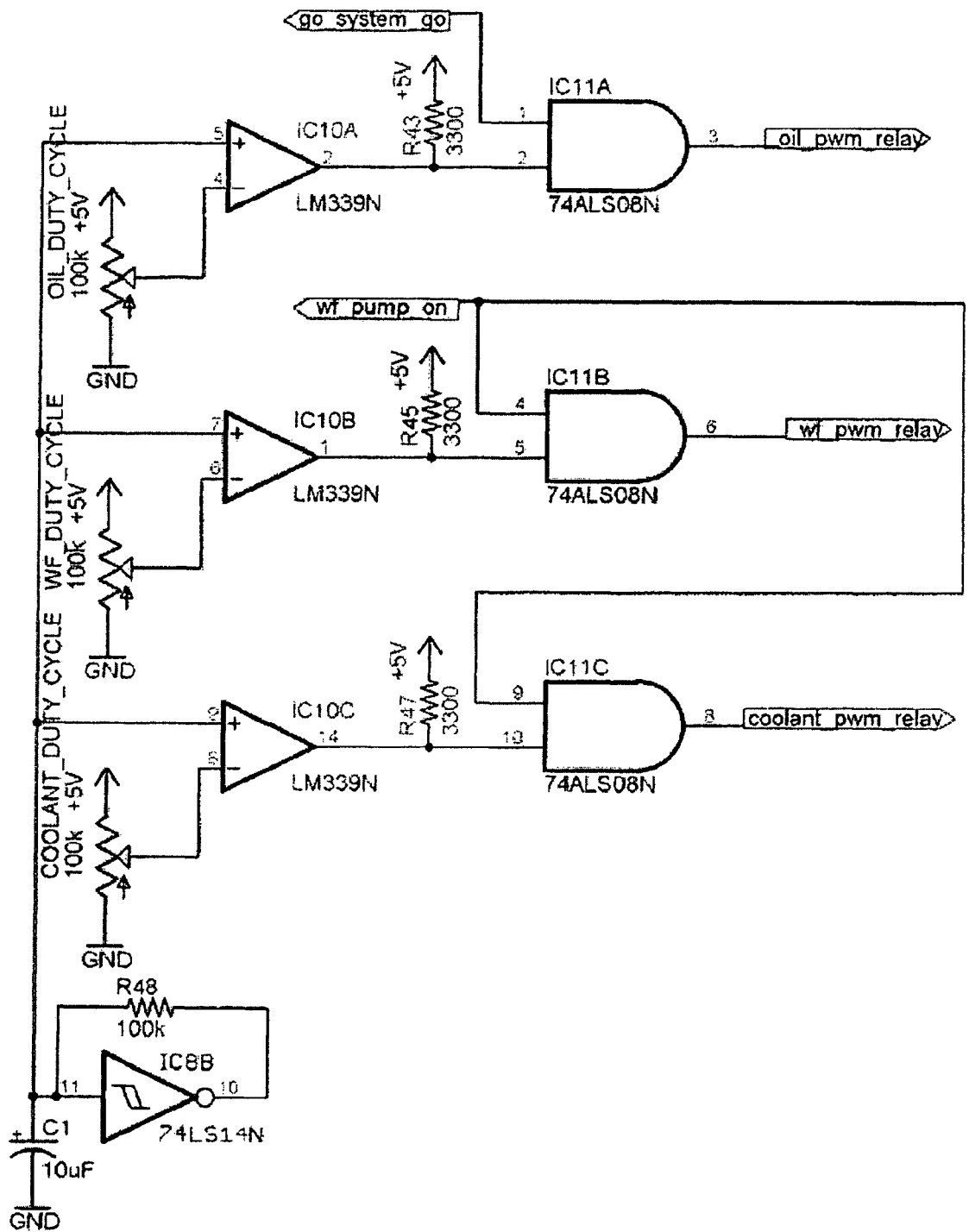
Figure 22D:
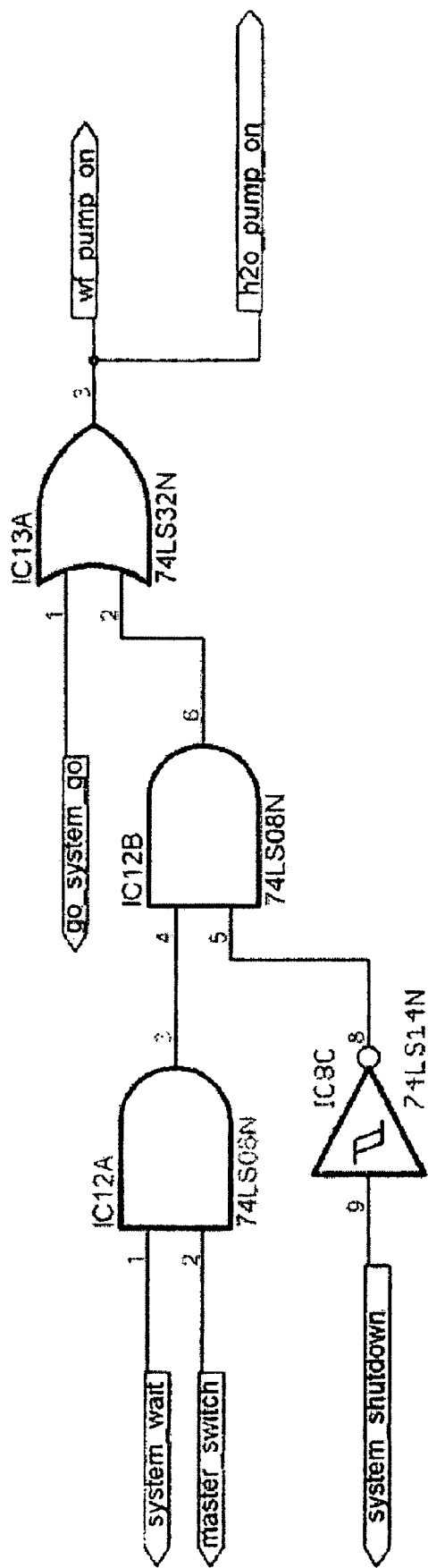
Figure 22E:
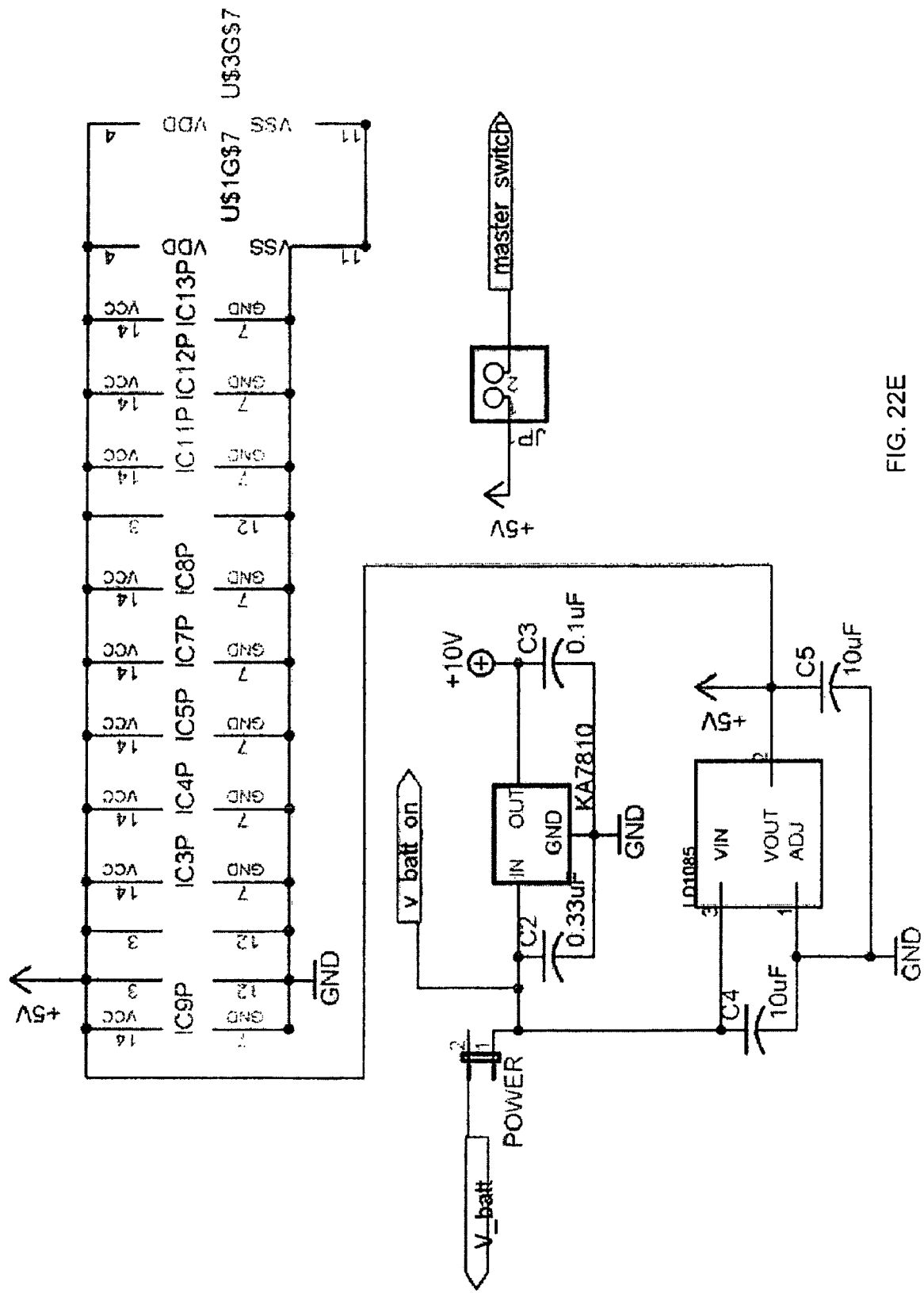
Figure 22F:
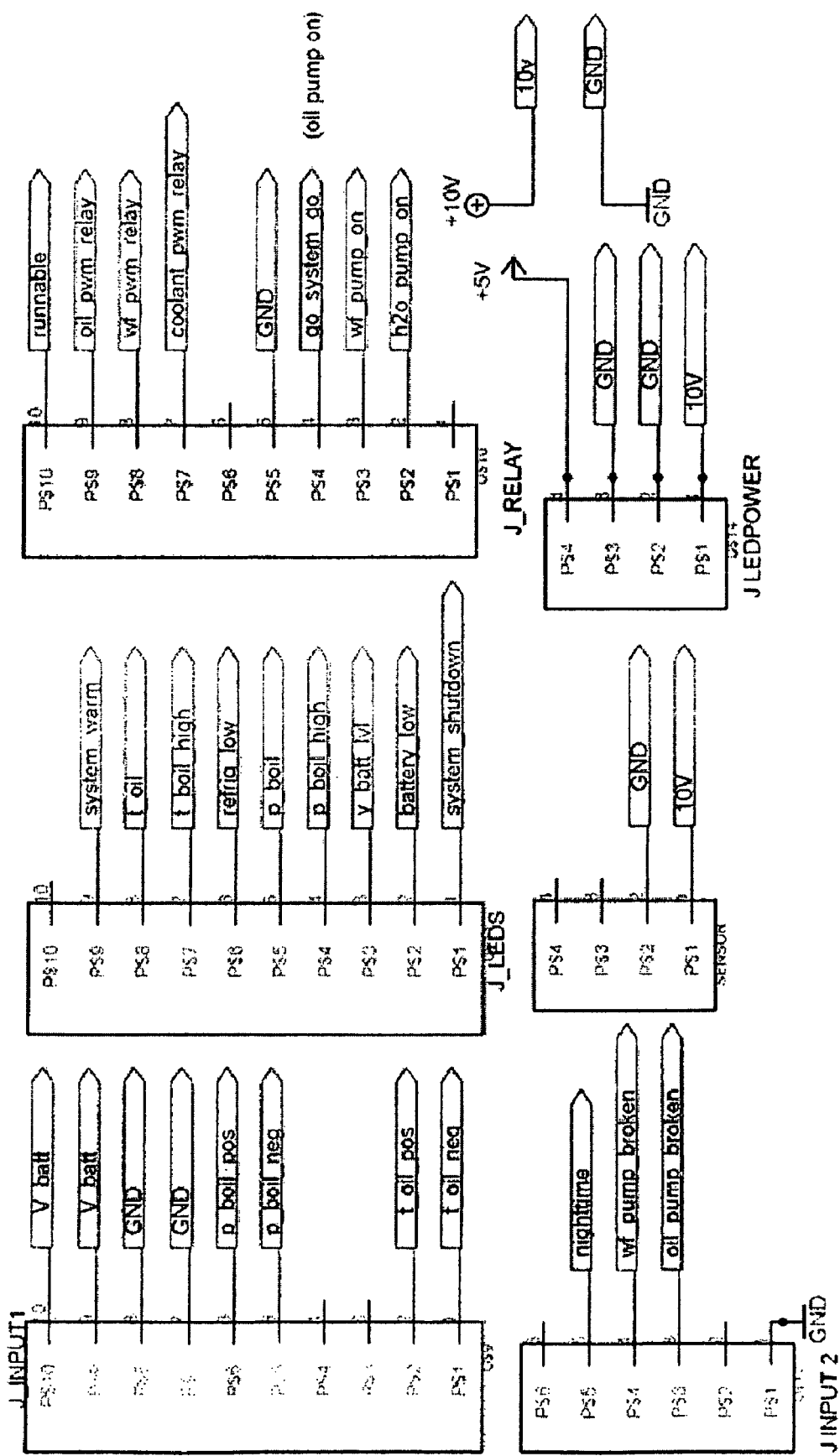

Path E relates to the construction of the relay board, used to control the flow of electricity from the batteries to the electrical components in the ORC and parabolic trough systems. A schematic of the board is provided in FIG. 21. Before the relay board can be assembled, the characteristics of the components it will be powering should be known. In particular, the amperage draw of each of the motors and fans should be determined. This can be accomplished in a test setup where the motors can drive a load approximately equal to the load they will power when the system is in operation, for example, a coupled motor-pump setup, or a setup where the load of the pump is simulated in another way.

Path F relates to the construction and installation of the tracker circuit, which controls the tracker motor that keeps the parabolic troughs in line with the sun throughout the day. Several steps are included here to describe both the electronic (soldering), electrical (wiring), and mechanical (installation) steps that must be taken. An example tracker circuit can be purchased pre-assembled, or assembly can follow the instructions given at www.redrok.com, which also include instructions for testing and debugging. The tracker circuit should be mounted in a specific direction on the parabolic troughs in order to function correctly: the "west" LED should face west, and the top surface of the tracker (where the components are mounted) should face the equator (which requires a different mounting orientation for the northern and southern hemispheres). Further, the vertical line exactly halfway between the LEDs should be perpendicular to the top plane of the parabolic trough. Meeting this condition helps ensure that the tracker tracks the parabola to the point where all of the sun's rays are being focused on the absorber pipe. The tracker can be tested by watching the tracker motor drive the parabolic troughs towards the sun. If the amount of light hitting the absorber pipe seems to be maximized at the place where the tracker stops moving, the mount is acceptable. If it stops slightly before maximum or slightly after maximum, the tracker can be tilted slightly to one side or the other until it aligns the parabolic troughs at the point of maximum light hitting the absorber pipes.

When calibrating the tracker circuit, it may be desirable to change the circuit settings until the parabolic troughs are being turned at an appropriate speed. The troughs only need to rotate very slowly throughout the day. The desired tracker setting varies, depending upon the pulley ratios between tracker motor and trough turning mechanisms. The potentiometer nearest the LEDs may be turned to change the duty cycle of the tracker motor, which sets the fraction of time during which the tracker powers the motor. By adjust the rotation of the potentiometer the troughs can be set to turn at an appropriate speed.

Path H relates to the integration of the control module with the other system components. Working fluid pump motor, thermal pump motor, coolant fan, and tracker are all connected to and powered by the relay board, which, in turn, is connected to the battery bank from which it draws energy. Pressure and temperature sensors are connected to the control board. The battery bank receives electrical energy from the alternators through, for example, 12 gauge wire. Before the system begins operation, thresholds based on plumbing conditions should be set using the potentiometers on the control board. Expected threshold values for Microgenerator System 1 are given in TABLE 11. Once the system is turned on, the calibration of the temperature and pressure sensors can be checked against the gauges installed in the system. To ensure that the shutdown conditions are set appropriately before the system is left unattended, proper system function (turning on and off at the correct temperature and pressure conditions) should be verified.

TABLE 11

Expected system threshold values

| Adjustable Threshold | Expected Value |
| --- | --- |
| T_boiler_normal | 90 C. |
| T_boiler_high | 150 C. |
| P_boiler_low | 50 psi |
| P_boiler_high | 180 psi |
| Battery low | 11.5 V |
| T_warm_enough | 80 C. |

While there have been described herein what are to be considered exemplary and preferred embodiments of the present invention, other modifications of the invention will become apparent to those skilled in the art from the teachings herein. The particular system architecture and methods of manufacture and use disclosed herein are exemplary in nature and are not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. A solar energy collection and conversion system comprising:

a solar energy collector, wherein the solar energy collector transfers solar energy to a first fluid to elevate a temperature of the first fluid;

a vaporizer in fluidic communication with the solar energy collector for transferring thermal energy from the first fluid to a second fluid flowing in a closed-loop system to elevate a temperature of the second fluid;

an expander in fluidic communication with the vaporizer for converting thermal energy of the second fluid into mechanical energy, the expander comprising a plurality of positive-displacement scroll compressors in serial communication, each scroll compressor being operated in reverse, and at least one scroll compressor being suitable for use in an HVAC system, wherein the second fluid flows serially through each of the positive-displacement scroll compressors;

a condenser in fluidic communication with the expander to reduce a temperature of the second fluid;

a compressor in fluidic communication with the condenser for pumping the second fluid at least partially through the vaporizer, wherein the second fluid comprises a first state at a location proximate the compressor and a second state at a location proximate the expander;

a conduit configured to transport at least one of the first fluid and the second fluid between at least two of the solar energy collector, the vaporizer, the expander, the condenser, and the compressor;

a controller for controlling a parameter associated with at least one of the collector, the vaporizer, the expander, the condenser, and the compressor; and a recuperator for transferring thermal energy from the second state of the second fluid to the first state of the second fluid.

2. The system of claim 1, further comprising a heat exchanger for transferring thermal energy from the second fluid to a third fluid to elevate a temperature of the third fluid.

3. A low cost method for converting solar energy, the method comprising the steps of:
 (a) collecting solar energy;
 (b) heating a first fluid with the solar energy;
 (c) transferring thermal energy from the first fluid to a second fluid flowing in a closed-loop system;
 (d) converting thermal energy from the second fluid into mechanical energy using an expander comprising a plurality of positive-displacement scroll compressors in serial communication, each scroll compressor being operated in reverse, and at least one scroll compressor being suitable for use in an HVAC system by passing the second fluid serially through the plurality of positive-displacement scroll compressors;
 (e) extracting thermal energy from the second fluid;
 (f) pumping, using a compressor, the second fluid through a fluidic circuit, the second fluid comprising a first state at a location proximate the compressor and a second state at a location proximate the expander;
 (g) transferring, using a recuperator, thermal energy from the second state of the second fluid to the first state of the second fluid; and
 (h) controlling a parameter associated with at least one of steps (a), (b), (c), (d), (e), (f), and (g).

4. The method of claim 3, further comprising the step of converting mechanical energy into electrical energy.

5. The method of claim 3, wherein the step of extracting thermal energy from the second fluid further comprises transferring thermal energy from the second fluid to a third fluid.

6. The method of claim 4, further comprising storing the electrical energy.

7. The system of claim 1, further comprising a control system for maintaining a performance efficiency and non-error condition of the solar energy collection and an energy conversion system, the control system comprising:
 a control circuit;
 an input device interface for receiving information regarding a location of a phase change boundary within the solar energy collection and conversion system, wherein the phase change boundary comprises a proportion of a gas to a liquid at a predetermined location in the solar energy collection and conversion system; and
 an output device interface for sending a control signal from the control circuitry to at least one component of the solar energy collection and conversion system, wherein the control signal is based at least in part on the location of the phase change boundary.

8. The control system of claim 7, wherein the phase change boundary is based on at least one of a substantially non-constant high temperature condition and a substantially non-constant low temperature condition.

9. The control system of claim 8, wherein the substantially non-constant high temperature condition comprises a range of high temperatures and wherein the substantially non-constant low temperature condition comprises a range of low temperatures.

10. The control system of claim 9, wherein the control signal maintains the phase change boundary within a vaporizer or a condenser of the solar energy collection and conversion system to maintain the performance efficiency of the solar energy collection and conversion system across the range of high temperatures and the range of low temperatures.

11. The control system of claim 7, wherein the input device interface is adapted to receive information from at least one sensor associated with the solar energy collection and conversion system.

12. The control system of claim 11, wherein the at least one sensor comprises a first sensor adapted for measuring a temperature of a working fluid.

13. The control system of claim 12, wherein the at least one sensor comprises a second sensor adapted for measuring an ambient temperature.

14. The control system of claim 13, further comprising a calculation module for calculating optimal temperature and pressure parameters for the working fluid or optimal temperature of a thermal fluid, based at least in part on the temperature of the working fluid and the ambient temperature.

15. The system of claim 1, wherein the solar energy collector comprises:
 a parabolic reflector; and
 at least one geodesic torsional support configured such that positions of a center of mass, an axis of rotation, and a focal point of the parabolic reflector are at a substantially similar position, thereby minimizing power required to adjust the parabolic reflector.

16. The system of claim 1, wherein the solar energy collector comprises a manifold comprising:
 an absorber for receiving light and elevating temperature of a liquid in the absorber;
 a glass jacket disposed over at least a portion of the absorber; and
 a PTFE sleeve interdisposed between the glass jacket and the absorber.

17. The system of claim 1, further comprising a plurality of generator modules, each module in communication with a respective positive-displacement scroll compressor of the expander, wherein a loading of each generator is electronically controlled such that a rotational speed of each compressor is maintained according to an expansion ratio of that compressor.

* * * * *